(12) United States Patent
    Neiser

(10) Patent No.:     US 11,130,153 B2
(45) Date of Patent:     Sep. 28, 2021

(54) FILTRATION APPARATUS AND METHOD

(71) Applicant: Paul Neiser, Mountain View, CA (US)

(72) Inventor:  Paul Neiser, Mountain View, CA (US)

( * ) Notice:   Subject to any disclaimer, the term of this patent is extended or adjusted under 35 U.S.C. 154(b) by 0 days.

(21) Appl. No.: 16/273,139

(22) Filed:    Feb. 11, 2019

(65)                Prior Publication Data

US 2019/0247885 A1     Aug. 15, 2019

Related U.S. Application Data

(60) Provisional application No. 62/710,120, filed on Feb. 9, 2018, provisional application No. 62/917,459, filed
(Continued)

(51) Int. Cl.
    *B06B 1/02*     (2006.01)
    *B06B 3/00*     (2006.01)
(Continued)

(52) U.S. Cl.
    CPC .................. *B06B 1/02* (2013.01); *B06B 1/10* (2013.01); *B06B 3/00* (2013.01); *F02K 7/10* (2013.01);
(Continued)

(58) Field of Classification Search
    CPC .. B32B 3/20; B32B 3/26; B32B 3/266; B01D 63/06; B01D 63/08; B01D 63/087;
(Continued)

(56)                References Cited

U.S. PATENT DOCUMENTS 1,329,559 A    2/1920 Tesla
1,424,932 A    8/1922 Moreau
(Continued)

FOREIGN PATENT DOCUMENTS

EP    2149710 A2    2/2010
EP    2681455       1/2014
(Continued)

OTHER PUBLICATIONS

Wang, Xiang et al., Concentration gradient generation methods based on microfluidic systems, Royal Society of Chemistry, Jul. 2017, pp. 29966-29984.
(Continued)

*Primary Examiner* — Donald J Loney
(74) *Attorney, Agent, or Firm* — Sheppard, Mullin, Richter & Hampton LLP

(57)                ABSTRACT

A filtering apparatus formed by a plurality of channel systems. Each of the channel systems include an inlet port formed on an inlet side of the plate; no more than one outlet port formed on an outlet side of the plate; and a channel formed in the plate, the channel coupled to the inlet port and to the outlet port, wherein the ratio of the product of the capture area of the inlet ports of a channel system with the first transmissivity associated with the inlet ports to the product of the capture area of the outlet ports of a channel system with the second transmissivity associated with the outlet ports is greater than one. The channel system is configured to interact with objects of interest on a scale which is smaller than a value several orders of magnitude larger than the mean free path of an object of interest. Some plate embodiments are configured to interact with particles, such as air molecules, water molecules, or aerosols. Other plate embodiments are configured to interact with waves or wavelike particles, such as electrons, photons, phonons or acoustic waves.

37 Claims, 24 Drawing Sheets

Related U.S. Application Data on Dec. 6, 2018, provisional application No. 62/710,224, filed on Feb. 12, 2018, provisional application No. 62/917,461, filed on Dec. 6, 2018, provisional application No. 62/710,608, filed on Feb. 23, 2018.

(51) Int. Cl.

| | | |
|---|---|---|
| *B06B 1/10* | (2006.01) | |
| *F03G 7/00* | (2006.01) | |
| *F02K 7/10* | (2006.01) | |
| *G02B 6/08* | (2006.01) | |
| *G02B 6/125* | (2006.01) | |
| *F04B 41/02* | (2006.01) | |
| *G02B 17/00* | (2006.01) | |
| *G02B 3/00* | (2006.01) | |
| *F25B 9/00* | (2006.01) | |
| *B32B 3/26* | (2006.01) | |
| *B01D 63/06* | (2006.01) | |
| *B01D 63/08* | (2006.01) | |

(52) U.S. Cl.
CPC ............... *F03G 7/00* (2013.01); *F04B 41/02* (2013.01); *G02B 3/0062* (2013.01); *G02B 6/08* (2013.01); *G02B 6/125* (2013.01); *G02B 17/002* (2013.01); *B01D 63/06* (2013.01); *B01D 63/08* (2013.01); *B01D 63/087* (2013.01); *B01D 2201/18* (2013.01); *B01D 2313/08* (2013.01); *B06B 2201/70* (2013.01); *B32B 3/26* (2013.01); *F25B 9/004* (2013.01); *G02B 3/0075* (2013.01); *Y10T 428/24661* (2015.01)

(58) Field of Classification Search
CPC ............... B01D 69/06; B01D 2201/18; B01D 2313/08; Y10T 428/24273; Y10T 428/24661; Y10T 428/24744; G02B 6/125; G02B 6/08; G02B 17/002; G02B 3/0062

See application file for complete search history.

(56) References Cited

U.S. PATENT DOCUMENTS

| | | | |
|---|---|---|---|
| 2,574,865 A | 11/1951 | Edwards | |
| 3,611,679 A | 10/1971 | Pall | |
| 3,790,829 A | 2/1974 | Roth | |
| 3,974,824 A | 8/1976 | Smith | |
| 3,993,564 A | 11/1976 | Novak | |
| 4,262,840 A | 4/1981 | Gronert et al. | |
| 4,285,704 A | 8/1981 | Zuzanov | |
| 4,482,365 A | 11/1984 | Roach | |
| 4,535,440 A * | 8/1985 | Mannschke | G02B 6/2804 385/32 |
| 4,850,806 A | 7/1989 | Morgan et al. | |
| 4,854,825 A | 8/1989 | Bez et al. | |
| 4,906,837 A * | 3/1990 | Doneen | G01D 5/34723 250/227.29 |
| 5,174,113 A | 12/1992 | Deville | |
| 5,441,576 A | 8/1995 | Bierschenk | |
| 5,454,472 A | 10/1995 | Benecke et al. | |
| 5,648,874 A | 7/1997 | Sawaki et al. | |
| 5,657,408 A | 8/1997 | Ferm et al. | |
| 5,738,731 A | 4/1998 | Shindo et al. | |
| 5,851,507 A | 12/1998 | Pirzada et al. | |
| 6,388,819 B1 | 5/2002 | Leidig | |
| 6,903,261 B2 | 6/2005 | Habraken et al. | |
| 7,170,112 B2 | 1/2007 | Ning | |
| 7,286,296 B2 | 10/2007 | Chaves et al. | |
| 7,444,961 B1 | 11/2008 | Ellis | |
| 7,879,123 B2 | 2/2011 | Lundquist et al. | |
| 7,993,051 B2 | 8/2011 | Arnaud | |
| 8,698,094 B1 | 4/2014 | Sears et al. | |
| 8,803,340 B2 | 8/2014 | Moddel | |
| 9,535,059 B2 | 1/2017 | Tai et al. | |
| 9,744,533 B2 | 8/2017 | Breinlinger et al. | |
| 9,815,055 B2 | 11/2017 | West et al. | |
| 10,207,315 B2 | 2/2019 | Appleby et al. | |
| 2002/0102058 A1 * | 8/2002 | Hulse | G02B 6/0005 385/45 |
| 2002/0187560 A1 | 12/2002 | Pezzuto et al. | |
| 2003/0019807 A1 | 1/2003 | Beard et al. | |
| 2004/0022506 A1 * | 2/2004 | Arkas | G02B 6/08 385/120 |
| 2005/0056311 A1 | 3/2005 | Son | |
| 2005/0088734 A1 | 4/2005 | Basu | |
| 2006/0033035 A1 | 2/2006 | Itzkovitch et al. | |
| 2007/0018764 A1 | 1/2007 | Martinez et al. | |
| 2007/0223867 A1 | 9/2007 | Hwang et al. | |
| 2008/0067396 A1 | 3/2008 | Oshima | |
| 2008/0078289 A1 | 4/2008 | Sergi et al. | |
| 2008/0106796 A1 | 5/2008 | Kawada | |
| 2008/0176174 A1 | 7/2008 | White et al. | |
| 2009/0093105 A1 | 4/2009 | Kobayashi et al. | |
| 2009/0152176 A1 | 6/2009 | Kipp et al. | |
| 2009/0272082 A1 | 11/2009 | Nahey et al. | |
| 2010/0237198 A1 | 9/2010 | Cormier | |
| 2010/0265597 A1 | 10/2010 | Shyu | |
| 2011/0257675 A1 | 10/2011 | Mackiewicz | |
| 2012/0125000 A1 | 5/2012 | Olavarria Rodriguez-Arango et al. | |
| 2012/0137652 A1 | 6/2012 | Asprey et al. | |
| 2012/0217876 A1 | 8/2012 | Diamant et al. | |
| 2012/0255913 A1 | 10/2012 | Tung et al. | |
| 2013/0087506 A1 | 4/2013 | Danov et al. | |
| 2013/0140468 A1 | 6/2013 | Chen | |
| 2013/0175171 A1 | 7/2013 | Aizel et al. | |
| 2013/0283797 A1 | 10/2013 | Bressi | |
| 2014/0003460 A1 | 1/2014 | Keyser et al. | |
| 2014/0137941 A1 | 5/2014 | Orsley | |
| 2014/0333514 A1 | 11/2014 | Dupong Skovsby | |
| 2015/0049491 A1 | 2/2015 | Venkataraman et al. | |
| 2015/0114305 A1 | 4/2015 | Goodrick | |
| 2015/0231573 A1 | 8/2015 | Sanderson | |
| 2015/0360237 A1 | 12/2015 | Hayes et al. | |
| 2016/0158708 A1 | 6/2016 | Lee et al. | |
| 2016/0359212 A1 | 8/2016 | Houle | |
| 2017/0287977 A1 | 10/2017 | Moroz | |
| 2018/0323359 A1 | 11/2018 | Li et al. | |
| 2019/0120213 A1 | 4/2019 | Pederson | |
| 2019/0186786 A1 | 6/2019 | Neiser | |
| 2019/0247863 A1 | 8/2019 | Neiser | |
| 2019/0247885 A1 | 8/2019 | Neiser | |
| 2019/0299136 A1 | 10/2019 | Neiser | |
| 2019/0352022 A1 | 11/2019 | De Biase | |

FOREIGN PATENT DOCUMENTS

| | | |
|---|---|---|
| FR | 2741161 | 5/1997 |
| GB | 837391 | 6/1960 |
| WO | 2007016800 | 2/2007 |
| WO | 2012118991 | 9/2012 |
| WO | 2014106821 | 7/2014 |
| WO | 2016191606 | 12/2016 |
| WO | 2019161297 | 8/2019 |
| WO | 2019161346 | 8/2019 |
| WO | 2020117712 | 6/2020 |

OTHER PUBLICATIONS

Goudie, Marcus J. et al., Investigation of Diffusion Characteristics through Microfluidic Channels for Passive Drug Delivery Applications, Journal of Drug Delivery, May 4, 2016, 9 pages, vol. 2016, Hindawi Publishing Corporation.

Abalde-Cela, Sara et al., Droplet microfluidics for the highly controlled synthesis of branched gold nanoparticles, Scientific Reports, Jan. 22, 2018, pp. 1-6.

Abramowitz, Mortimer et al., Concepts in Digital Imaging Technology, Hamamatsu Learning Center: Micorlens Arrays, Jan. 17,

(56) References Cited

OTHER PUBLICATIONS 2019, pp. 1-4, http://hamamatsu.magnet.fsu.edu/articles/microlensarray.html.
Elder, Ian F. et al., A Hollow Waveguide Integrated Optic QCL Beam Combiner, http://proceedings.spiedigitallibrary.org/ on Nov. 15, 2012 Terms of Use: http://spiedl.org/terms, pp. 854306-1-854306-11, Proc. of SPIE vol. 8543.
Hehlen, Markus P. et al., Solid-Stage Optical Refrigeration, Handbook on the Physics and Chemistry of Rare Earths, pp. 1-151, vol. 46.
Adbul-Majid, Sawsan et al., Photonic Integrated Interferometer Bases on Silicon-on-Insulator Nano-Scale MMI Couplers, IEEE, 2013, pp. 337, 338.
Adams, Charles S., Laser Cooling and Manipulation of Neutral Particles, to appear in: The New Optics Cambridge University Press, pp. 1-39.
Seletskiy, Denis V. et al., Laser Cooling in Solids; Advances and Prospects, Reports on Progress in Physics 79 096401, 2016, pp. 1-51, This Accepted Manuscript is © © 2016 IOP Publishing Ltd.
Chu, Jennifer, Engineers design 'tree-on-a-chip': Microfluidic device passive hydraulic power, Physic.org 2013-2019, Science X network, Mar. 20, 2017, pp. 1-5, https://phys.org/news/2017-03-tree-on-a-chip-microfluidic-device-passiv.
Weigl, Bernhard H. et al., Microfluidic Diffusion-Based Separation and Detection, Microfluidic Diffusion-Based Separation and Detection | Science, Jan. 15, 1999, pp. 346-347, vol. 283, Issue 5400, http://science.sciencemag.org/content/283/5400/346.
Nguyen, Nam-Trung, Micro-optofluidic Lenses; A review, American Institute of Physics, 2010, Biomicrofluidics 4, 031501, pp. 031501-1-031501-5.
Su, Tiehui et al., Experimental demonstration of interferometric imaging using photonic integrated circuits, Optics Express, May 29, 2017, pp. 12653-12665, vol. 25, No. 11.
Paiè, Petra et al., Partici Manipulation by Optical Forces in Microfluidic Devices, Micromachines, 2018, pp. 1-21, www.mdpi.com/journal/micromachines.
Wikipedia, Passive transport, https://en.wikipedia.org/wiki/Passive_transport, Jan. 17, 2019, pp. 1-3.
Stanton, Eric J. et al., Multi-octave spectral beam combiner on ultrabroadband photonic integrated circuit platform, Optics Express, May 4, 2015, pp. 11272-11283, vol. 23, No. 9.
Micolens Array, Thorlabs, Jan. 17, 2019, pp. 1-3, https://www.thorlabs.com/newgrouppage9.cfm?objectgroup_id=2861.
Ladislas Wiza, Joseph, Microchannel Plate Detectors, Nuclear Instruments and Methods, 3/08, pp. 587-601, vol. 162, 1979.
Neumaier, Arnold, "Learn the Top Misconceptions About Virtual Particles", retrieved from the Internet: <URL: https://www.physicsforums.com/insights/misconceptions-virtual-particles/>, Apr. 6, 2016 (Apr. 6, 2016), XP055586550, 9 pages.
Strassler, Matt, "Virtual Particles: What Are They?", retrieved from the Internet: <URL: https://profmattstrassler.com/articles-and-posts/particle-physics-basics/virtual-particles-what-are-they/>, Nov. 10, 2011 (Nov. 10, 2011), XP055586547, 5 pages.
Boyd, John, "New Carbon Nanotube Sheets Claim World's Top Heat-Sink Performance", IEEE Spectrum, Dec. 7, 2017 (Year: 2017), 3 pages.
Chandler, David L., "MIT News on Campus and Around the World: Explained: Phonons", <URL: https://news.mit.edu/2010/explained-phonons-0706>, Jul. 8, 2010 (Year: 2010), 3 pages.
Chen, Liu, et al., "Effect of the Diffuser on Diesel Turbocharger Compression Performance and Noise Emission", Proceedings of the ASME 2017 Internal Combustion Engine Division Fall Technical Conference (ICEF2017), Oct. 15-18, 2017 (Year: 2017), 9 pages.
DeBiase, Robert, "Can Casimir Forces be Asymmetric?", Proceedings of the Seventh Conference on Future Energy, Albuquerque, New Mexico, Jul. 30-Aug. 1, 2015, <URL: https://web.archive.org/web/20170825135618/integrityresearchinstitute.org/cofe.html>, 16 pages.
Doering, Charles R., et al., "Nonequilibrium Fluctuation-Induced Transport", Physical Review Letters, vol. 72, No. 19, May 9, 1994, 4 pages.
Esposito, Angelo, et al., "Gravitational Mass Carried by Sound Waves", Physical Review Letters, vol. 122, No. 084501, Mar. 1, 2019 (Year: 2019), pp. 084501-1-084501-6.
Koks, Don, "What is the Mass of a Photon?", <URL: https://math.ucr.edu/home/baez/physics/ParticleAndNuclear/photon_mass.html#:+:text=Photons%20are%20traditionally%20said%20to,the%20language%20of%20special%20relativity.&text=When%20the%20particle%20is%20at,%22rest%20mass%22%20mrest>, (Year: 2008), 2 pages.
Linke, H., et al., "A Quantum Dot Ratchet: Experiment and Theory", Europhysics Letters, vol. 44, No. 3, Nov. 1, 1998, <URL: https://www.researchgate.net/profile/P_Omling/publication/231007281_A_quantum_dot_ratchet_Experiment_and_theory/links/0deec52126cb350c59000000.pdf >, pp. 341-347.
Lorke, A., et al., "Far-Infrared and Transport Properties of Antidot Arrays with Broken Symmetry", Physica B 249-251, 1998, <URL: https://www.nano.physik.lmu.de/nanophysics/_assets/pdf/1998/98-12_Lorke_PhysicaB.pdf >, pp. 312-316.
Ninth International Conference on Future Energy—COFE9, Jul. 28-29, 2017, <URL: https://web.archive.org/web/20170825135618/integrityresearchinstitute.org/cofe.html>, 7 pages.
Sahai, R., "Membrane Separations / Filtration", Encyclopedia of Separation Science, Jan. 1, 2000 (Jan. 1, 2000), XP055627471, ISBN 978-0-12-226770-3, 001: 10.1016/BO-12-226770-2/05151-6, pp. 1717-1724.
Song, A. M., et al., "Nonlinear Electron Transport in an Asymmetric Microjunction: A Ballistic Rectifier", Physical Review Letters, vol. 80, No. 17, Apr. 27, 1998, <URL: https://www.nano.physik.uni-muenchen.de/nanophysics/_assets/pdf/1998/98-03_Song_BallRect_PRL.pdf>, pp. 3831-3834.
Springer, F., et al., "Study of the Effect of Geometry on Wall Shear Stress and Permeate Flux for Ceramic Membranes: CFD and Experimental Approaches", Engineering Applications of Computational Fluid Mechanics, vol. 4, No. 1, (Year: 2010), DOI: 10.1080/19942060.2010.11015296, published online Nov. 19, 2014, pp. 17-28.

\* cited by examiner

FILTRATION APPARATUS AND METHOD

CROSS REFERENCE TO RELATED APPLICATIONS

This application claims the benefit of U.S. Provisional Patent Application No. 62/710,120, filed on Feb. 9, 2018, No. 62/917,459 filed on Dec. 6, 2018, No. 62/710,224 filed on Feb. 12, 2018, No. 62/917,461 filed on Dec. 6, 2018, and No. 62/710,608 filed on Feb. 23, 2018, each being incorporated herein by reference in its entirety.

FIELD OF THE INVENTION

Embodiments are related to apparatus for filtering, pumping, and/or concentrating objects, such as waves or particles.

BACKGROUND

According to some definitions of the second law of thermodynamics it is impossible for heat to flow from a cold reservoir to a hot reservoir. Alternative statements claim that it is impossible to construct a thermodynamic apparatus which can convert thermal energy directly into mechanical work.

SUMMARY

An example apparatus embodiment of a filter plate includes a plate formed with a plurality of channel systems. Each of the channel systems include an inlet port formed on an inlet side of the plate; no more than one outlet port formed on an outlet side of the plate; and a channel formed in the plate, the channel coupled to the inlet port and to the outlet port, wherein the ratio of a first product to a second product is greater than unity, where the first product is the product of the capture area of the inlet ports of a channel system and the first transmissivity associated with the inlet ports, and where the second product is the to the product of the capture area of the outlet ports of a channel system and the second transmissivity associated with the outlet ports Each of the channel systems may further include an additional plurality of the inlet port formed on the inlet side of said plate; and an additional plurality of the channel formed in the plate, each of the channel coupled to no more than one of the inlet port and to the outlet port.

In some embodiments, none of said channel system includes more than one of said outlet port.

In some embodiments, none of the channels in a channel system are coupled to more than one outlet port.

Each of the channel systems may optionally include no more than one of the inlet port and no more than one of the outlet port, with a tapered channel coupling the inlet port to the inlet port.

For some channel systems, a selected one of the channels is coupled to one of the inlet ports and to the outlet port, and all other channels in each of the channel systems are coupled to the selected one channel.

The selected one channel may optionally be formed as a linear channel and other channels coupled to said linear channel may be formed as arcuate channels. Alternatively, all channels in one channel system may be formed as linear channels.

For some embodiments of a filter plate, a ratio of a value of mean free path for an object to be passed through the channel to a characteristic dimension of a channel is larger than 0.001, where the characteristic dimension is the larger of the characteristic length or the largest width of a channel For some embodiments of a filter plate, an inlet or outlet diameter of the channel is in a range from about one collision diameter of an object to be passed through the channel to about 1000 times the mean free path of an object in an adjacent reservoir.

For some embodiments of a filter plate, a length of a channel is in a range from about one collision diameter of an object to be passed through the inlet port to about one thousand times a value of mean free path for the object.

An inlet port may alternatively be formed with a circular perimeter, a polygonal perimeter, or an obround perimeter. An outlet port may be formed with a circular perimeter in some embodiments, although other perimeter shapes may be used.

For an example filter plate embodiment having a plurality of channel systems, none of the channel systems are coupled to one another for the exchange of solid, liquid, or gas particles or for direct passage of photons or other types of waves, such as acoustic waves or phonons, from one channel system to another.

DESCRIPTION

Figure 1:
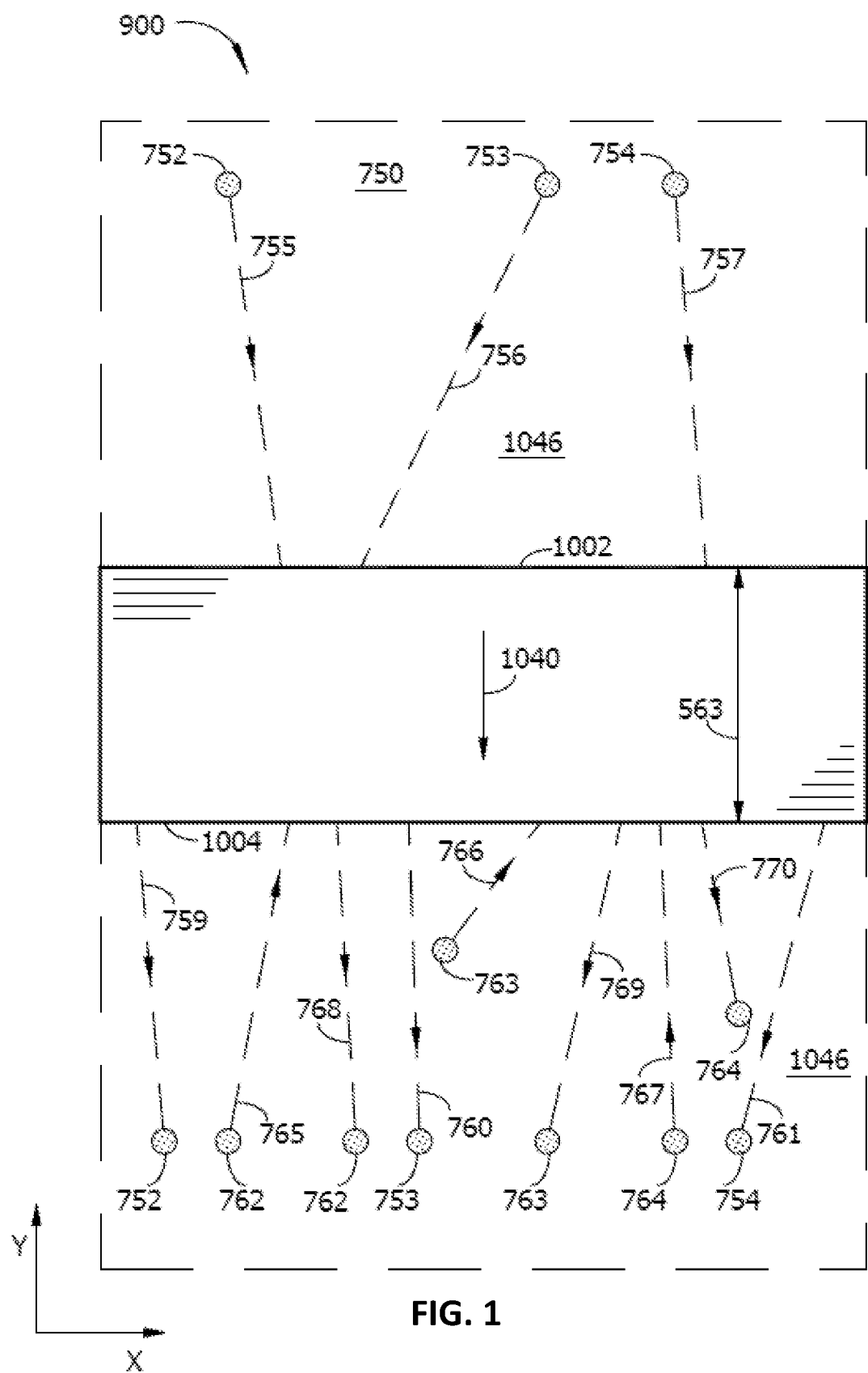
FIG. 1 is a schematic representation of an example filter plate embodiment.

Example embodiments in accord with the invention are described herein. Example embodiments include a plate formed with channels configured for establishing a preferred flow direction of objects in a medium from an inlet side of the plate to an outlet side of the plate for dynamic boundary condition, and a concentration difference, a pressure difference, or a density difference for objects located on the outlet side compared to the inlet side for a static boundary condition.

The term "medium" used herein describes any material which is capable of containing, carrying, transporting, or transferring an object of interest. A medium can be a gas, liquid, solid, or vacuum, for example. By default, a medium refers to the collection of all objects which interact with a specified apparatus.

The term "object" used herein describes any component of a medium. The examples of a filter plate embodiment described herein may be configured to interact with at least one object in a medium. A medium may comprise several different types, species, or classes of objects. Examples of an object include, but are not limited to, particles, such as a dust particle, an aerosol, a water droplet, an air molecule, a biological cell, or a polymer molecule, as well as subatomic particles, such as electrons or protons. Examples of an object also include, but are not limited to, waves, such as a photon, an acoustical or sound wave, an ocean wave, or a phonon. An object may have a property of interest and optionally a defining property which may be used to distinguish a selected object from other objects. The invention applies to any medium which can be considered to comprise distinct objects.

A "default boundary condition" for an example plate embodiment may refer to a model scenario in which the properties of the medium at a first reservoir and a second reservoir are identical and uniform in time and space.

A "baseline scenario" may refer to a scenario in which an example embodiment comprising a heat exchanging apparatus is replaced by a "baseline apparatus" comprising a solid, impermeable, possibly reflective, flat plate, and subjected to default boundary conditions.

A "baseline probability" may refer to the probability for any object which interacts with a baseline apparatus to be located at a specified side of the baseline apparatus after the interaction is completed in a baseline scenario. For example, the baseline probability may be 50% for any side of the baseline apparatus.

One can define a "dynamic boundary condition" as a simplified scenario in which the properties of the medium at a first reservoir and a second reservoir at an infinite distance from the filtering apparatus are identical and uniform in time and space.

One can define a "static boundary condition" as a simplified scenario in which a first and second reservoir are finite in size and isolated from each other and any other reservoirs apart from an embodiment of the invention, such as a filtering apparatus, allowing the exchange of OI between the first and second reservoirs. In the static boundary condition, the macroscopic properties of interest of the medium in the first and second reservoirs have reached a steady state value, i.e. a value that is substantially constant in time and space, i.e. substantially uniform throughout a reservoir. Such macroscopic properties can refer to the pressure, temperature, or density of a medium, for example.

As used herein, "input properties of interest" and "output properties of interest" refer to the properties of interest of a specified class of objects immediately before and immediately after interacting in a non-negligible manner with an embodiment of the invention, respectively. A property of interest may be the location of an object in either the first reservoir 201 or the second reservoir 202. The interaction of an object of interest with the disclosed plate embodiments can be described in terms of the difference between the input and output properties of interest. For example, an interaction can be described as either a transmission from the one reservoir to another reservoir, or a reflection back into the reservoir the object was located in before the interaction began. The type of interaction is a function of the "defining properties" of an object. The set of defining properties of the objects of interest may comprise the properties which distinguish the object of interest from other objects of the surrounding medium. In the example plate embodiment shown in FIG. 4, the set of defining properties of an object also includes the input property of interest, i.e. the location of an object in either the first reservoir 201 or the second reservoir 202 immediately before interacting in a non-negligible manner with an embodiment of the invention.

Throughout an interaction an apparatus configured and operated in accordance with the invention will distinguish between or filter objects based on the value of the defining property of an object. In other words, the expected value of the type of interaction between a specified class of objects with at least one specified defining property and an embodiment of the invention is not equal to the expected value of the type of interaction of objects of the same specified class but different specified defining property. The expected value is the statistical expectation calculated for all objects contained within at least one specified class of objects which interact with an embodiment of the invention in a sufficiently long duration of time to provide a sufficiently accurate result. By default, a class of objects comprises all objects which interact with a specified apparatus.

Turning now to the figures, a side view of an example plate embodiment 900, also referred to herein as a filter plate 900, is shown in FIG. 1. The filter plate 900 includes at least one solid plate 1000 formed with channels configured to establish a net displacement of objects from a first reservoir 750 on an inlet side 1002 of the plate 1000, through the channels, to a second reservoir 751 on an outlet side 1004 of the plate 1000 for a dynamic boundary condition. Examples of the channels appear in other figures and will be described below. A direction of net object displacement 1040 is marked by an arrow from the inlet side 1002 toward the outlet side 1004 of the example filter plate embodiment 900. Note that, for the static boundary condition, arrow 1040 indicates the direction of increase in pressure, density, concentration of objects of interest. Unless specified, the dynamic boundary condition is assumed in the following description.

FIG. 1 is an example embodiment of a filter plate 900 showing an example interaction with objects of interest in a medium 1046. An inlet side 1002 faces a first reservoir and an outlet side 1004 faces a second reservoir. Both reservoirs comprise a medium 1046 which in turn comprises objects of interest, which are schematically represented by particles, such as particle 752. Each particle can move in the medium along trajectories, such as trajectory 755.

To illustrate the concept of operation of an idealized filter plate 900, consider the following trajectories of objects of interest which interact with the filter plate. Objects 752, 753, and 754 are incident on the filter plate 900 from the first reservoir, as indicated by trajectories 755, 756, and 757, respectively. In this idealized, simplified example, all three aforementioned objects pass through channels in the filter plate and are transmitted into the second reservoir, as indicated by trajectories 759, 760, and 761, respectively. The locations of objects of interest 752, 753, and 754 at a later point in time in the second reservoir are shown.

Objects 765, 763, and 764 are identical to objects 752, 753, and 754, and are incident on the filter plate 900 from the second reservoir, as indicated by trajectories 765, 766, and 767, respectively. In this idealized, simplified example, all three aforementioned objects are reflected by the filter plate back into the second reservoir, as indicated by trajectories 768, 769, and 770, respectively. The locations of objects of interest 765, 763, and 764 at a later point in time in the second reservoir are also shown.

For a dynamic boundary condition, therefore, there is a net diffusion of objects of interest from the first reservoir into the second reservoir, as indicated by arrow 1040. Embodiments of the invention can therefore be employed in applications involving pumping or the production of thrust. Note that, in general, filtering apparatuses, such as filtering apparatus 900, will not operate in the idealized fashion shown in FIG. 1. Typically, a fraction of objects of interest which interact with the filtering apparatus from the second reservoir will diffuse, or will be transmitted into the first reservoir. For a static boundary condition, the net diffusion of OI from the second reservoir into the first reservoir is equal to the net diffusion of OI from the first reservoir into the second reservoir. Since a larger fraction of OI which interact with the filtering apparatus from the second reservoir are reflected than the fraction of OI which interact with the filtering apparatus from the first reservoir, there is larger concentration, density or pressure of objects of interest in the second reservoir compared to the first reservoir.

Figure 2:
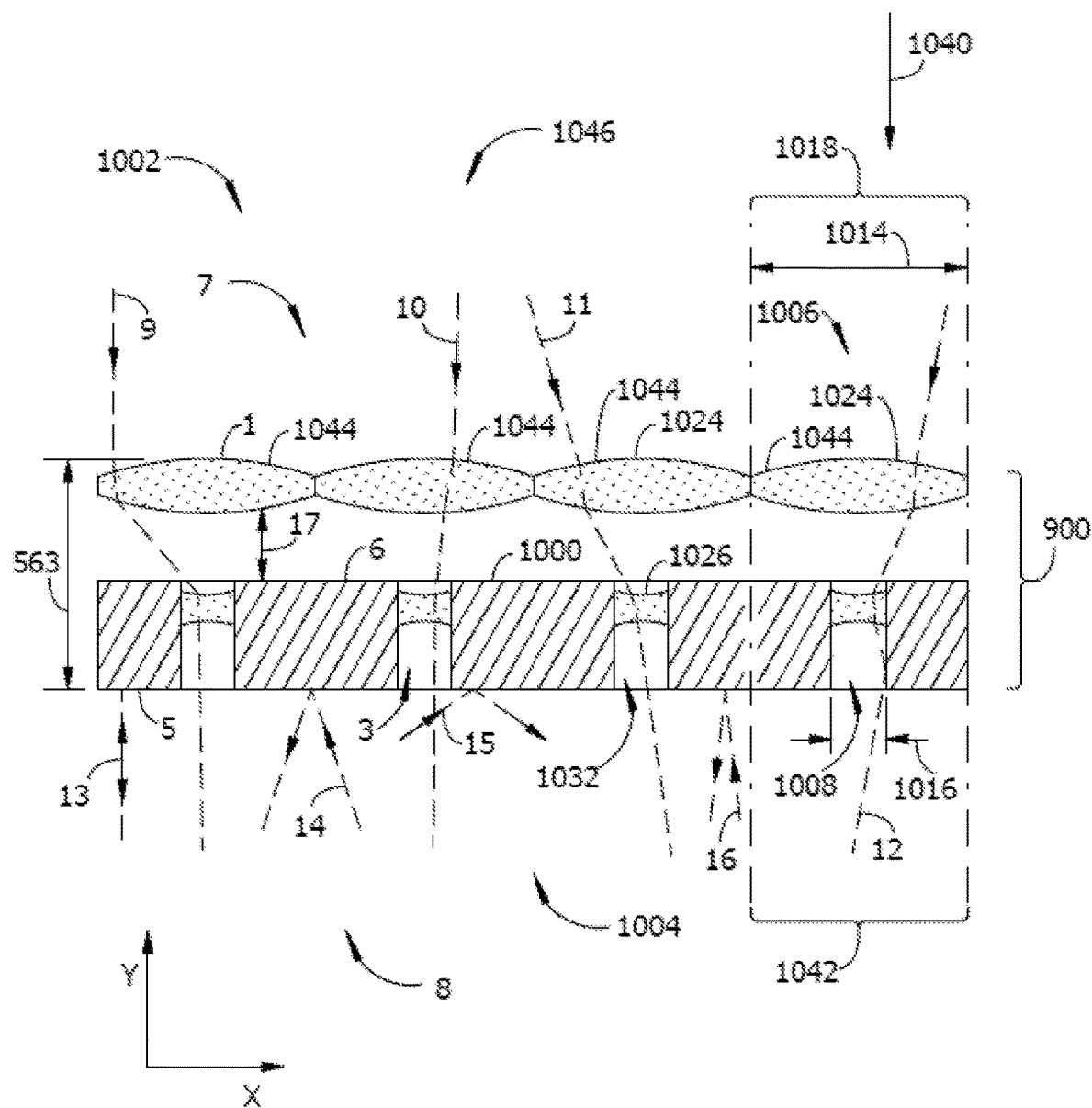
FIG. 2 is a cross-sectional view of another example filter plate embodiment comprising optical lenses.

FIG. 2 is a cross-sectional view of an example filter plate 900 embodiment comprising a plate 1000 and optical elements. In the example of FIG. 2, the example filter plate embodiment 900 includes optical elements, shown as refracting lenses (1024, 1026), adjacent a solid plate 1000 formed with inlet ports 1006 and outlet ports 1008 connected by linear channels 1032. In FIG. 2, the medium 1046 is represented by a collection of photons, each example photon represented in the figure by an example trajectory (9, 10, 11, 12, 13, 14, 15, 16). Each photon follows a trajectory in three-dimensional space. The 2D projection on the XY-plane of such a trajectory is also shown, such as in the form of trajectory 9.

A first reservoir 7 on an inlet side 1002 of the plate 1000 and a second reservoir 8 on an outlet side 1004 of the plate 1000 provide a source for objects interacting with the filter plate embodiment 900 and a destination for objects that have passed through channels in the filter plate. Some filter plate embodiments 900 may include the first and second reservoirs. Alternatively the reservoirs may be coupled to a filter plate embodiment during operation of the filter plate but may not be part of the filter plate embodiment. The first and second reservoirs may be isolated from one another as well as from any other reservoirs, apart from the depicted apparatus, which forms the interface between the first reservoir 7 and the second reservoir 8.

The depicted bulk material 4 has a first surface 6 and a second surface 5. For plate embodiments configured to interact with photons, all surfaces of the bulk material 4, including surfaces inside channels and/or apertures, may be highly reflective at selected wavelengths of light or other electromagnetic radiation. In alternative embodiments, the surfaces of the bulk material may not be highly reflective.

The bulk material 4 may be a metal, for example. Alternatively, the externally accessible surfaces of the bulk material 4 may be coated in a reflective material, such as silver, aluminum, or another material having a preferred value of reflectivity for selected wavelengths. In other embodiments, the temperature of the bulk material 4 may be regulated by an external temperature regulation apparatus. Other materials from which the plate 1000 may be made include, but are not limited to, crystalline materials such as silicon used in semiconductor processing or in optical components, ceramic, glass, materials compatible with additive manufacturing processes such as polymer material, and other materials in which the disclosed channel shapes may be formed.

In FIG. 2, objects such as photons are able to pass through the depicted apparatus via many channels, such as the example of a channel 1018. In the example of FIG. 2, an aperture 3 in the plate 100 for each channel 1018 has a circular cross-section when viewed along the Y-axis. In alternative embodiments, the channels may have other cross-sectional shapes, such as square, rectangular, or polygonal. Objects in the medium 1046 on the inlet side 1002 pass through the filter plate embodiment 900 first contact a capture surface 1044, represented in the example of FIG. 2 by the combined area of the surfaces of lenses 1024 facing the medium 1046 in the first reservoir 7, through inlet ports 1006 in the plate 1000, exiting outlet ports 1008 into the second reservoir 8 on the outlet side 1004. Each convex lens 1024 and its associated concave lens 1026 and linear channel 1032 form one object transmission channel 1018, an example of a single apparatus unit 1042. A filter plate embodiment 900 may include many apparatus units 1042 as suggested in the example of FIG. 2. A preferred thickness 563 of the apparatus may be selected according to a mean free path distance of the objects passing through the filter plate embodiment 900 as will be explained in more detail later.

Throughout their interaction with the apparatus, photons from the first reservoir 7 are focused by a first lens, such as first lens 1, a double convex lens in this example. The directions of some photons from the first reservoir 7 may not be parallel to the normal of the first surface 6, where the normal to the first surface is parallel to the Y-axis. Each first lens is associated with a particular object transmission channel 1018. In this particular case, the cross-sectional area of a first lens is of a hexagonal shape when viewed along the Y-axis. In other embodiments, the cross-sectional area of a first lens may be another shape, such as circular, rectangular, or polygonal.

In the example of FIG. 2, another lens, such as second lens 2, may be located within a channel, or in the opening of the channel on the first surface 6. The second lens is used to change the direction of the photon from the first reservoir 7 to a more desirable direction after having been focused by the first lens 1. A desirable direction may be a direction parallel to the normal of the first surface 6. In the example of FIG. 2, the second lens is a double concave lens. Each second lens is also associated with a particular channel. In other embodiments of the invention, there may not be a second lens. Although FIG. 2 illustrates examples of convex and concave lenses, other types of optical elements and/or combinations of optical elements may be part of an alternative embodiment.

The set of apparatuses comprised of a channel, such as channel 3, an associated first lens, such as first lens 1, an associated second lens, such as second lens 2, the gap 17 between the first lens and the bulk material, as well as any associated supporting material used to support the lenses, such as bulk material 4, may be referred to as an "apparatus unit" as described above. The set of possible trajectories of a photon within an apparatus unit is referred to as the "channel system".

The bulk material 4 of the plate 1000 included in a filter plate embodiment 900 is preferably selected such that photons having wavelengths in a range of interest for operation of some plate embodiments are unable to pass through the bulk material, i.e., the bulk material is opaque at the wavelengths of interest. In plate embodiments 900 configured for processing objects other than waves, for example particles with mass and volume, the bulk material 4 is preferably selected to be impermeable to the objects of interest at object velocities and densities likely to be encountered in operation of the apparatus, thereby constraining object transmission through the plate to channels formed in the plate 1000.

In FIG. 2, the lenses may be made of glass. In other embodiments, the lenses may be made of other materials. The material of the lenses has a different refractive index than the medium surrounding the lenses. In FIG. 2, the example medium surrounding the lenses is a vacuum. In other embodiments, the medium can also comprise a low pressure gas.

In alternative embodiments, other shapes of lenses may be used. For example, a planoconvex, or convex meniscus lens may be used. Other embodiments may also employ other types of optical elements, such as optical elements constructed of metamaterials, optical elements employing reflection, optical elements using a combination of refraction and reflection, optical elements having reconfigurable surfaces, and optical elements configured for internal reflection as suggested in the example of FIG. 4. Alternative embodiments may employ different focusing means.

As suggested in the example of FIG. 2, an interaction between a photon from the first reservoir 7 and the depicted apparatus may be considered to commence when the photon enters, intersects, comes into contact with, or is influenced by the surfaces, channels, and optional optical elements of a plate embodiment 900. An example interface is denoted in the figures by a first boundary surface 1044. Note that in this case the interface between the apparatus and the first reservoir 7 is comprised of first lenses only. In the example of FIG. 2, the first boundary area is equal to the combined surface area of the assembly of first lenses 1024 facing the first reservoir 7. One can define an interaction between a photon from the second reservoir 8 and the depicted apparatus to commence when the photon passes through, intersects, or comes into contact with a plane containing the second surface 5, where the plane is parallel to the XZ-plane. This plane may be referred to as the second boundary surface 5. An interaction is thus defined to commence when a photon of the first or second reservoir intersects or comes in contact with a boundary surface. An interaction can be defined to terminate when a photon in the first or second reservoirs no longer intersects or is no longer in contact with any of the boundary surfaces.

Throughout an interaction, example of a plate embodiment shown in FIG. 2 is configured to focus photons originating at a first reservoir before the photons arrive at an interface to a second reservoir. Such an interface is formed by the plane describing the interface between a channel 3 and the second reservoir 8. In this way, the probability of a photon passing through the channel 3 to have originated at the first reservoir 7 is increased beyond the baseline probability of 50%. As a result, there is a net transmission of photons from a first reservoir 7 to a second reservoir 8. After the default boundary condition is removed, and with the first and second reservoirs finite in size and otherwise isolated from each other and any other reservoirs, the net energy of photons in the first reservoir could be reduced over time, while the net energy of photons in the second reservoir could be increased correspondingly, where the net energy corresponds to the combined energies of all photons in a reservoir. Connecting several stages of the apparatus shown in FIG. 2 in series, i.e. allowing the second reservoir of a first apparatus to coincide with the first reservoir of a second apparatus as suggested in the example of FIG. 6, could achieve a desired steady-state net energy of photons in a first reservoir 7.

In the example of FIG. 2, focusing of photons is accomplished by the deflection, or successive refraction, of photons by a first lens, such as first lens 1. For example, the photon associated with an example trajectory 9 originates in the first reservoir 7, is deflected by a first lens 1 such that the photon's trajectory 9 enters the channel associated with the first lens 1, where the photon is deflected further by a second lens. The photon subsequently exits the channel into the second reservoir 8. Similar transmissions of photons through the plate are described by trajectories 10, 11, and 12. The region between the bulk material 4 and the assembly of first lenses, such as first lens 1, may be a gap 17. Gap 17 may be a vacuum or may alternatively be filled with a material substance. Photons may be reflected by the first surface 6, the channel walls, as well as second surface 5. The latter is exemplified by trajectories 13, 14, 15, and 16. Note that some photons which originate at the first reservoir 7 will return to the first reservoir 7 once the interaction is complete. Similarly, some photons which originate from the second reservoir 8 will be found at the first reservoir 7 once the interaction is complete. On average, however, the apparatus is configured in such a manner, that the transmission of photons which move from the first reservoir 7 to the second reservoir 8 throughout an interaction exceeds the transmission of photons moving in the opposite direction for the default boundary condition.

A portion of a boundary surface may be referred to as a "capture surface" 1044. For example, a first capture surface may be a portion of a first boundary surface associated with a selected first lens. In the example of FIG. 2, the first capture surface is the surface of a first lens facing the first reservoir 7. The second capture surface may be described by the cross-section of a channel on plane parallel to the XZ-plane and coincident with the second surface 5. In this example, the second capture surface is of a circular shape. In this case, the first capture surface is larger than the second capture surface. The first capture area is equal to the surface area of the first capture surface, and the second capture area is equal to the surface area of the second capture surface. A "first footprint surface" refers to the total boundary surface associated with an apparatus unit, i.e. the sum of the first capture surface as well as any surface between adjacent first lenses. In other words, the boundary of the footprint surface of an apparatus unit is provided by the boundary of other footprint surfaces of adjacent apparatus units, where the apparatus units may optionally be arranged periodically in the XZ-plane. In the example of FIG. 2, the first capture surface 1044 and the footprint surface are identical. Similarly, a "second footprint surface" may refer to the projection of the boundary of the first footprint surface on the second boundary surface.

A control volume may be defined for a plate embodiment. For example, a projected first footprint surface may refer to the surface bounded by the boundary of the first footprint surface and described by a plane parallel to the XZ-plane. The projected first footprint surface is the planar surface of a configuration in which the first lens is a planoconvex lens, with the planar side facing the first reservoir 7. For this example of a planoconvex lens, one can define the control volume to be bounded by the projected first footprint surface, the second footprint surface, and the surface parallel to the Y-axis and connecting corresponding, projected points of the boundaries of the first and second footprint surfaces. For this example, the surface of the control volume facing the first reservoir 7 is denoted the first surface, and the surface of the control volume facing the second reservoir 8 is denoted the second surface.

For the default boundary condition, the probability of a photon being located in the first reservoir 7 prior to contacting or intersecting the first or second surface of the control volume is 50%, with 50% probability applying to the second reservoir 8. This arises from the fact that the area and geometry of the first and second surfaces are identical and from the aforementioned assumption of identical media in both reservoirs, wherein the areas are uniform in time and space. The fraction of photons that are incident on the first surface and also enter into the control volume is approximately equal to the ratio of the first capture area to the area of the first surface. In this example the first capture surface is identical to the first surface. The fraction of photons that are incident on the second surface and also enter into the control volume is equal to the ratio of the second capture area to the area of the second footprint surface, which is less than one. Since the first capture area is larger than the second capture area, the probability of a photon entering the control volume system from the first reservoir 7 is larger than the probability of a photon entering the control volume from the second reservoir 8. The fraction of photons which enter the control volume via the first capture surface and exit via the second capture surface may be referred to as the "first transmissivity". The fraction of photons which enter the control volume via the second capture surface and exit via the first capture surface may be referred to as the "second transmissivity". A value of transmissivity is a function of properties of the medium and the geometry of the apparatus unit. The transmissivity depends on the type, size, shape, and material of the lenses, for example. These and other relevant parameters, such as the ratio of the first capture area to the second capture area, can be optimized to maximize an objective subject to constraints. An example objective may be the net transmission of photons from the first reservoir 7 to the second reservoir 8, thereby reducing the net energy in the first reservoir and increasing the net energy in the second reservoir. For the default boundary condition, this will occur when the ratio of the first and second transmissivity multiplied by the ratio of the first and second capture area is greater than one. In other words, the ratio of a first product to a second product is greater than unity, where the first product is the product of the capture area of the inlet ports, i.e. the first capture area, of a channel system and the first transmissivity associated with the inlet ports, and where the second product is the to the product of the capture area of the outlet ports, i.e. the second capture area, of a channel system and the second transmissivity associated with the outlet ports. Whenever convenient, the first reservoir and the second reservoir are defined in a manner in which said ratio is greater than unity. Note that, in some embodiments the value of this ratio depends on the properties of the medium comprising the objects of interest. In such embodiments, it is not always convenient to define the first reservoir and the second reservoir in a manner in which this ratio is greater than unity. In such embodiments, the first reservoir is the reservoir facing a portion of a channel with a larger capture area. Note that, when following this definition, the aforementioned ratio can also be smaller than unity, depending on the properties of the surrounding medium. These properties can comprise distribution of velocities of objects of interest in an adjacent medium, for example. Note that a first reservoir and a second reservoir, a first capture area and a second capture area, and a first transmissivity and a second transmissivity of an embodiment of the invention can always be defined or re-defined in a manner in which the aforementioned ratio is always greater than unity. In other words, labeling a channel opening an inlet port as opposed to an outlet port, or a first channel opening as opposed to s second channel opening is arbitrary until the aforementioned ratio is known for a particular application or for particular properties of a medium, at which point the designation is adapted such that the ratio is greater than unity as opposed to smaller than unity.

Further note that, for a net displacement of objects from the inlet side to the outlet side for a dynamic boundary condition, the first capture area can be smaller than the second capture area provided that the first transmissivity is larger than the second transmissivity by a sufficient amount, such that the aforementioned product of the ratio of the first transmissivity to the second transmissivity and the ratio of the first capture area of a channel system to the second capture area of a channel system is greater than one.

A net transmission of photons from a first reservoir to a second reservoir can be used to cool the first reservoir at the expense of heating the second reservoir, for example. In the steady state, when the first and second reservoirs are isolated from any other reservoirs, operation of a plate embodiment will result in a net temperature difference between the first reservoir and the second reservoir. This temperature difference can be employed to refrigerate an object located in the first reservoir. For example, the second reservoir may be the room in which the refrigeration apparatus is located. The magnitude of the steady state temperature difference is determined by the aforementioned geometry of an apparatus of the invention, amongst other parameters.

Selected properties, features, alternative embodiments, and/or methods of operation described for transmission of photons in the examples related to FIG. 2 may also be applied to the examples described for FIGS. 3-12, for example in the displacement of other types of waves, such as acoustic waves, ocean waves, or phonons, or the displacement of particles with mass and volume from the inlet side of the plate to the outlet side of the plate to establish a net object displacement from the first reservoir to the second reservoir for a dynamic boundary condition. For the disclosed filter plate embodiments, the net displacement of objects from the first reservoir to the second reservoir is a function of the product of the ratio of the first transmissivity to the second transmissivity and the ratio of the first capture area and the second capture area of a channel system. These parameters are defined below. For an array of identical channel systems, the ratio of the first capture area and the second capture area is equal to the ratio of the total combined areas of the inlet ports to the total combined areas of the outlet ports, where the areas are calculated at the inlet side 1002 of the plate 1000 for the inlet ports 1006 and the outlet side 1004 of the plate 1000 for the outlet ports 1008. The area of one inlet port refers to the area of the capture surface exposed to the medium in the first reservoir on the inlet side of the filter plate 900. The area of one outlet port refers to the cross-sectional area of a channel at the outlet side of the plate.

Figure 3:
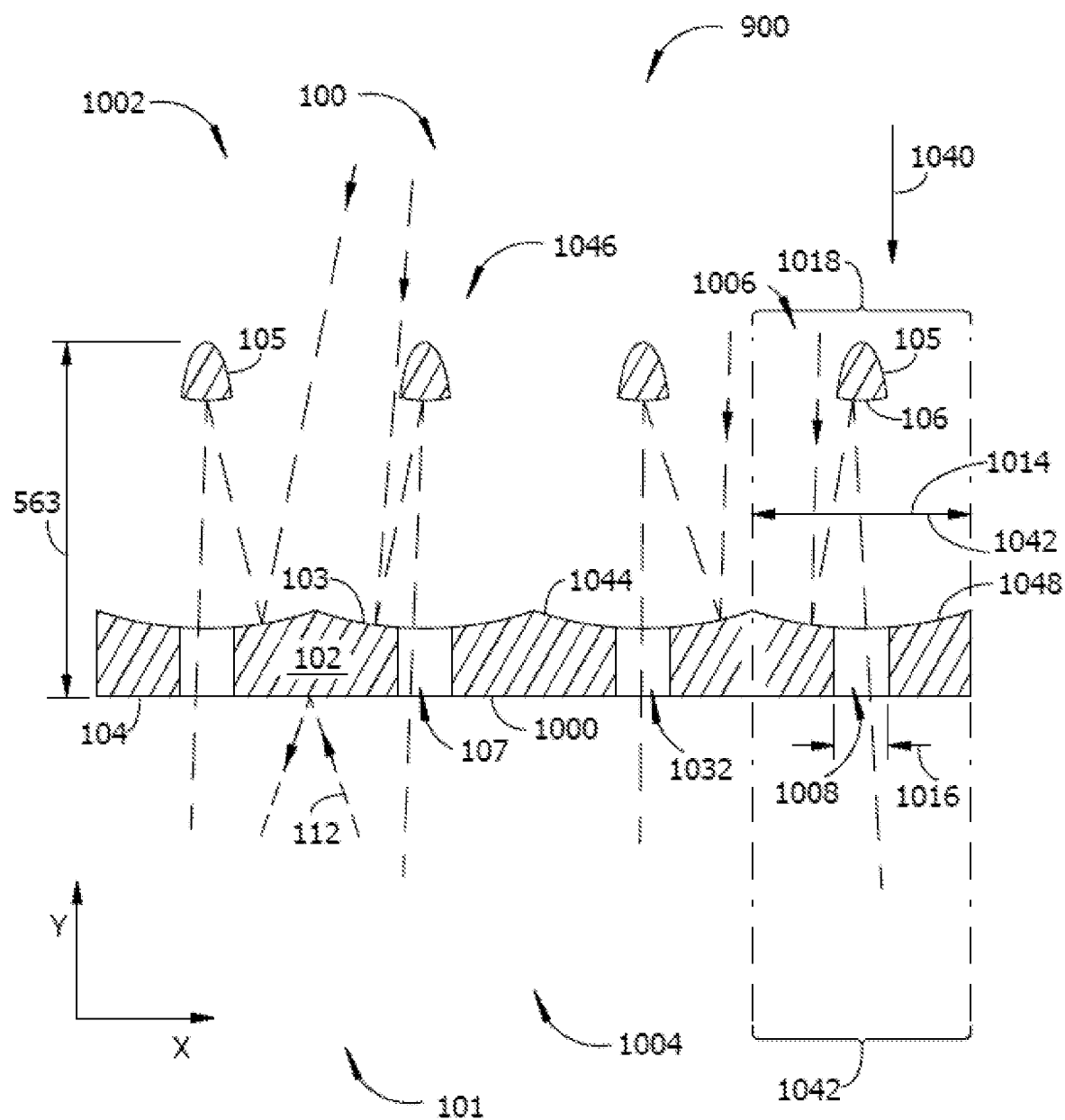
FIG. 3 is a cross-sectional view of another example filter plate embodiment with optical elements comprising reflecting surfaces.

FIG. 3 is a cross-sectional view of another example filter plate embodiment 900. As in FIG. 2, the example of a medium 1046 is represented by a collection of photons, with the projection of a photon trajectory on the XY-plane being exemplified by trajectory (108, 109, 110, 111, 112, 113, 114).

In the example of FIG. 3, an inlet side 1002 of the plate 1000 faces a first reservoir 100 and an outlet side 1004 of the plate embodiment faces a second reservoir 101. The depicted bulk material 102 has a first surface 103 on the inlet side 1002 and a second surface 104 on the outlet side 1004. The plate 1000 may have a surface shaped as a first reflector 1048. A second reflector 105 with a reflective surface 106 may be rigidly attached to, and optionally an integral part of, the bulk material 102. Selected surfaces of the bulk material 102 may have a minimum specified reflectivity at wavelengths of interest.

In FIG. 3, photons may pass through the plate 1000 via channels formed through the plate, such as channel 107. In the illustrated example, each channel is cylindrical and is formed with a circular cross-section when viewed along the Y-axis.

Throughout their interaction with the apparatus, photons from the first reservoir 100 are focused by a first optical element, represented in the example of FIG. 3 by a reflective first surface 103. In this example, the optical element is a mirror. The reflective surface of the mirror may alternatively be formed as a spherical, planar, parabolic, or hyperbolic surface. The perimeter shape of the outer edge of each mirror may alternatively be hexagonal as suggested in the example of FIG. 11, circular as suggested in the example of FIG. 10, or other arcuate or polygonal shapes, for example the hexagonal perimeter of the mirror in FIG. 11 and the obround shape of the mirror in FIG. 12.

A second optical element may be included. The second optical element in the example of FIG. 3 is represented by a reflector 105 with a reflective surface 106. In the example of FIG. 3, the reflective surface 106 on the second optical element 105 is convex. In alternative embodiments, the reflective surface 106 may be formed as a planar, spherical, or hyperbolic surface. Each of the first optical elements, the second optical element associated with each first optical element, and an aperture through the first optical element in the plate together form one transmission channel 1018. Examples of an inlet port diameter 1014 and an outlet port diameter 1016 are marked for one of the transmission channels 1018. One transmission channel 1018 in the example of FIG. 3 further corresponds to one apparatus unit 1042. An embodiment preferably includes many apparatus units 1042 as suggested in the example of FIG. 3.

In the example of FIG. 3 and other examples in which all incident photons are parallel to the Y-axis, it may be desirable for the focal point of the first surface 103 to lie close to or within an associated channel, after having been reflected from the reflective surface 106 on the second optical element 105.

As suggested in FIG. 3, an example apparatus unit may include many individual transmission channels, each transmission channel including a first optical element, e.g. mirror 103, a channel aperture formed through the first optical element, e.g. channel aperture 107, a second optical element, e.g. mirror 106, and any associated structures formed in the bulk material 102 of the plate to position and support the other components. The set of possible trajectories of a photon through a plate embodiment, which may optionally include optical elements as described, may be referred to as the "channel system". As before, it is preferable that no photons can pass through bulk material 102 without passing through a transmission channel 1018.

The optical elements in the example of FIG. 3 may be positioned in a vacuum. In alternative embodiments, the medium may comprise other materials, such as a solid crystal lattice, water or another fluid, air, or a polymer material.

Throughout an interaction, the example embodiment of FIG. 3 is configured to focus objects such as photons or phonons, or particles with mass and volume originating at a first reservoir before the objects arrive at an interface to a second reservoir. Such an interface is formed by the plane describing the interface between channel 107 and the second reservoir 101. In this way, the probability of an object passing through channel 107 to have originated at the first reservoir 100 is increased beyond the baseline probability of 50%. As a result, there is a net transmission of objects from a first reservoir 100 to a second reservoir 101. Once the default boundary condition is removed, and the first and second reservoirs are assumed to be finite in size and otherwise isolated from each other and any other reservoirs, the net energy of objects in the first reservoir could be reduced over time, while the net energy of objects in the second reservoir could be increased correspondingly. Connecting several stages of the apparatus shown in FIG. 3 in series could achieve a desired steady-state net energy of objects in a first reservoir 100.

In the example embodiment of FIG. 3, objects are focused by reflection from the first reflective surface 103 for each transmission channel and from the second reflective surface 106, where the two reflective surfaces define a focal distance for the combination of reflective surfaces on each channel. Some objects, for example the object originating in the first reservoir 100 and traveling along trajectory 108, are parallel to the Y-axis and are reflected into the channel 107 and thence into the second reservoir 101. Other objects may follow trajectories (e.g., trajectories 109, 110, and 111) which are not parallel to the y-axis but which still result in the object passing through the channel.

Objects may be reflected by any surface of the bulk material, such as a second surface 104, as exemplified by trajectories 112, 113, and 114. Note that some objects which originate at the first reservoir 100 will return to the first reservoir 100 once the interaction is complete. Similarly, some objects which originate from the second reservoir 101 will be found at the first reservoir 100 once the interaction is complete. On average, however, the transmission of objects which move from the first reservoir 100 to the second reservoir 8 through a plate embodiment throughout an interaction exceeds the transmission of objects moving in the opposite direction for the default boundary condition.

Figure 4:
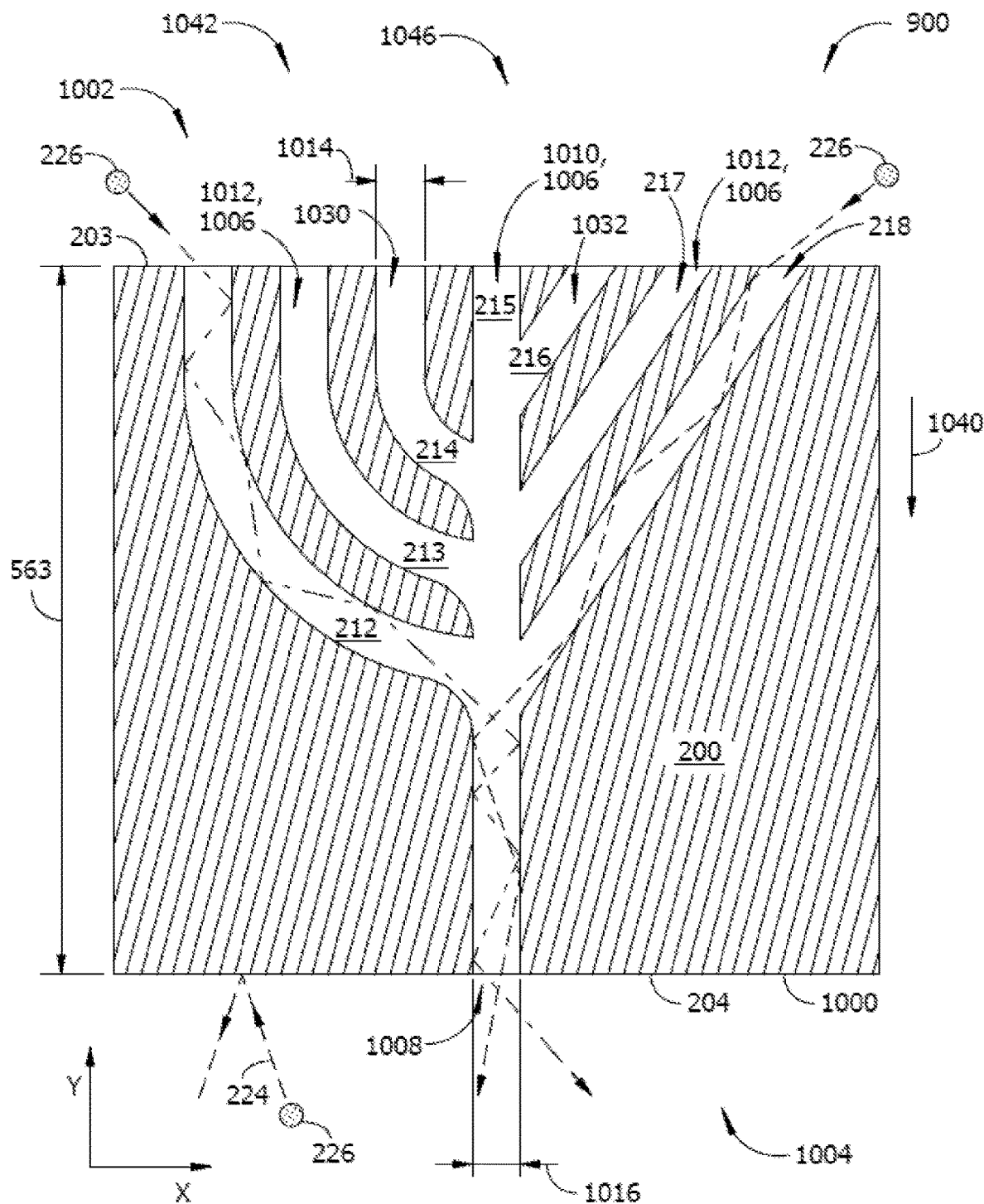
FIG. 4 is a cross-sectional view of another example filter plate embodiment formed with examples of arcuate and linear channels in a trunk and branch arrangement.

FIG. 4 is a cross-sectional view of another alternative filter plate embodiment 900. In FIG. 4, the medium 1046 is represented by individual objects, such as object 226. Each object follows a trajectory in three dimensional space, such as example trajectories 220, 221, 222, 223, 224, and 225. Movement along a trajectory may be an intrinsic property of a object, as in the case of a photon, or it may arise from the interaction with other objects of a medium, for example the diffusion of objects in a medium.

In the example of FIG. 4, objects originating in a first reservoir 201 may pass through channels (212, 213, 214, 215, 216, 217, 218) formed in an example filter plate embodiment 900 into a second reservoir 202. The example plate 1000 in FIG. 4 has a first surface 203 and a second surface 204. The arrangement of channels in FIG. 4 is an example of a trunk and branch channel configuration where branch channels 1012, for example channels 212, 213, 214, 216, 217, and 218, are in fluid communication with the inlet side 1002 of the plate 1000 through inlet ports 1006 and with the trunk channel 215, but the branch channels are not in direct fluid communication with one another, i.e., the surfaces of a branch channel do not intersect the surfaces of any other branch channel. The trunk channel 215 extends from the input side 1002 of the plate 1000 to the output side 1004 of the plate. Each branch channel is preferably coupled to one, and no more than one, inlet port 1006, with a separate inlet port 1006 being provided for each branch channel 1012, and each branch channel is preferably coupled to one, and no more than one, outlet port 1008. For the example trunk and branch arrangement of FIG. 4, all branch channels associated with one trunk channel share a common outlet port 1008. An embodiment may contain many trunk channels 1010 and each trunk channel may have more branch channels 1012 than are shown in the example of FIG. 4. Each trunk channel 1010 and its connected branch channels 1012 may be referred to as a channel system. Objects may move along the channels by reflection (e.g., for photons or phonons or acoustic waves) or by collision and rebound with channel walls (e.g., for particles with mass and volume).

Each channel system, which may alternately be referred to herein as an apparatus unit 1042, may have more than one inlet port, but no more than one outlet port. This attribute of the filter plate embodiments disclosed herein applies to filter plates configured for interacting with objects such as waves such as photons, and for filter plates configured for interacting with particles having mass and volume, such as polymer molecules, cells, dust particles, and so on.

Each branch channel and trunk channel are formed with a diameter 1014 at the corresponding inlet port 1006 on the inlet side 1002 of the plate 1000. The trunk channel has a diameter 1016 at the outlet port 1008 on the outlet side 1004 of the plate 1000. The ratio of the combined input areas of the input ports to the area of the output ports may be calculated using these diameters (1014, 1016). In the example of FIG. 4, the length of the trunk channel 1010 corresponds to the thickness 563 of the plate 1000.

FIG. 4 further illustrates examples of branch channels with different shapes. Example branch channels 1012 to the left of the trunk channel 1010 have an arcuate profile and may be referred to as arcuate channels 1030. Example branch channels to the right of the trunk channel 1010 have a linear profile and may be referred to as linear channels 1032. A plate 1000 may be formed only with arcuate channels 1030, only with linear channels 1032, or a combination of linear and arcuate channels. All of the channels in the example of FIG. 4 have a same inlet port diameter 1014. In alternative embodiments, inlet ports 1006 may have different diameters for different channels or for different apparatus units 1042.

Each channel may have a circular cross-section when viewed along the length of the channel, which, for channel 215, would correspond to a view along the Y-direction. In other embodiments, the channel may have any cross-section, such as square, rectangular, or polygonal cross-sections. Each channel has a first opening, such as first opening 208, or another example of a first opening 210. Each channel system is in fluid communication with the second reservoir 202 through a single outlet port 1008. The channels are formed in the bulk material 200 of the plate 1000.

A "dynamic medium material" may include the material found at first reservoir 201 and second reservoir 202, as well as the material inside the channels, such as channel 212, or channel 215, or channel 217. For an example in which the medium is comprised of individual molecules, or larger particles, bulk material 200 may be a solid material, such as a metal or ceramic. There may be several types of medium present, with a first medium supporting the transport or diffusion of a second medium. For example, when the objects of interest are electrons, the bulk material 200 may be an insulator, such as glass, and a dynamic medium material may be a conductor for the objects of interest. Similarly, water molecules may transport sodium and chlorine ions, in applications in which a plate embodiment is used for desalination. When the objects of interest may be described as waves, such as photons or phonons, a channel may be considered to be a waveguide. For the example plate embodiment of FIG. 4, an example interaction between a particle and the depicted apparatus may be considered to commence when a particle passes through, intersects, or comes into contact with, planes containing the first or second surface, where the planes are parallel to the XZ-plane, and where the direction of travel prior to the interaction is in the opposite direction of the outward normal of the associated surface of the bulk material, which is directed in the positive Y-direction for the first surface, and the negative Y-direction for the second surface. These planes may be referred to as the first plane and the second plane, respectively. An interaction ends when a particle no longer intersects or is in contact with the first and second planes. "Contact" as used herein refers to the existence of a non-negligible force between an object of the medium and an object of the apparatus, such as and object of bulk material 200.

The example plate embodiment shown in FIG. 4 is configured to collect or focus objects originating at a first reservoir before they arrive at an interface to the second reservoir, such as a second opening 219. In this way, the probability of an object passing through the second opening 219 to have originated at the first reservoir 201 is increased beyond the baseline probability of 50%. As a result, there is a net displacement of particles from a first reservoir 201 to a second reservoir 202. A filter plate embodiment 900 is preferably configured to enhance the displacement of objects from the first reservoir to the second reservoir, possibly by the process of diffusion or motion facilitated by the self-energy of the objects for a dynamic boundary condition. For plate embodiments configured to interact with objects such as photons, a plate embodiment is preferably configured to direct the objects through channels in the plate embodiment by refraction and/or reflection. In other embodiments, other such collection mechanisms may be used.

After a default boundary condition is removed, and given that the first and second reservoirs are finite in size and otherwise isolated from each other and any other reservoirs, the concentration of objects of interest in the first reservoir could be reduced over time, while the concentration of objects in the second reservoir could be increased correspondingly. The disclosed examples of plate embodiments may therefore be effective for pumping applications. Connecting several stages of the example filter plate embodiment 900 shown in FIG. 4 in series, i.e. allowing the second reservoir of a first apparatus to coincide with the first reservoir of a second apparatus, could achieve a desired steady-state concentration of objects of interest in a first reservoir 201.

In the example of FIG. 4, a collection of objects is accomplished by the guiding of objects which enter any given channel to a central channel 215. For example, the particle associated with trajectory 221 enters channel 213 and is reflected off the walls within the channel several times as it is guided to the central channel 215, from which it will subsequently exit through second opening 219 to the second reservoir 202. Similarly, the particle associated with trajectory 223 enters channel 218 and is guided to the central channel 215. A particle, such as the particle associated with trajectory 222, which enters channel 215 will likely remain in channel 215 until it exits through the second opening 219. The particle associated with trajectory 220 has entered an inlet port 1006 for an example channel 212, and will preferably also exit through the outlet port 1008 formed at the second opening 219. Particle 226 is reflected off the second surface 204, as indicated by trajectory 225. Trajectory 224 portrays another example of a particle from the second reservoir 202 being blocked from returning to the first reservoir 201. Some particles which originate from the first reservoir 201 may return to the first reservoir 201 once the interaction is complete. Similarly, some particles which originate from the second reservoir 202 may be found at the first reservoir 201 once the interaction is complete. On average, however, the flow rate of particles which move from the first reservoir 201 to the second reservoir 202 throughout an interaction exceeds the flow rate of particles moving in the opposite direction for the default boundary condition.

One can define a "capture area" to be the cross-sectional area of all openings to a particular channel system on a specified side of an apparatus. The "first capture area" is the area of all first openings of channels which are associated with the same central channel on a first side of the plate, i.e., the inlet side of the plate. The "second capture area" is the area of all second openings associated with the central channel on the second side of the plate, ie., the outlet side. For the example plate embodiments disclosed herein, the first capture area is preferably larger than the second capture area.

One can define a "footprint area" to be the total area associated with a channel system, i.e. the sum of the first capture area as well as the first surface area of the associated bulk apparatus on the first surface 203. The boundary of the footprint area of a channel system is provided by the boundary of other footprint areas of adjacent channel systems, where the channel systems may be spaced periodically in the XZ-plane. For example, the boundary of a footprint area may have a hexagonal shape. In this example embodiment the capture area and the footprint area lie on the XZ-plane. One can define a control volume which is bounded by an area on the first plane delineated by the footprint area on the first surface, as well as a corresponding area on the second plane projected along the Y-axis, as well as surfaces parallel to the Y-axis connecting corresponding points of the first and second surface of the control volume.

For the default boundary condition, the probability of an object of the medium being located at the first reservoir 201 prior to interacting with the first surface of the control volume is 50%, with the other 50% applying to the second reservoir 202. Since the first capture area is larger than the second capture area, the probability of a particle entering the channel system from the first reservoir 201 is larger than the probability of a particle entering the channel system from the second reservoir 202. The fraction of particles which enter the channel system via the first capture area and exit via the second capture area may be referred to as the "first transmissivity", with the "second transmissivity" defined correspondingly. The value of a transmissivity is a function of the geometry of the apparatus, as well as properties of the medium. For the default boundary condition a plate configured as described herein, there will be a net flow rate of objects from the first reservoir 201 to the second reservoir 202 when the ratio of the first and second transmissivity multiplied by the ratio of the first and second capture area is greater than 1. The geometry of the channel system and the ratio of the first capture area to the second capture area are examples of parameters that can be optimized to maximize an objective subject to constraints. The objective may be the net flow rate of a property of interest from the first reservoir 201 to the second reservoir 202.

The effectiveness of the disclosed example plate embodiments for transferring objects by diffusion and/or optical propagation is affected not only by the properties of the objects of interest in an adjacent medium, but also by the geometry and size of the apparatus, particularly the cross-sectional diameters and lengths of the channels formed in the plate and the total area of ports on the input side of the plate compared to the total area of ports on the output side of the plate. The thickness of the an example plate embodiment, or of a layer in a plate embodiment, is the outer dimension of the referenced structure along the Y-axis, e.g. the length of channel 215 in FIG. 4.

In applications of a plate embodiment for which the objects of interest are particles, it may be desirable to avoid excessive scattering within the channel system in order to maintain an initially necessarily negative Y-velocity component of a particle entering the channel system from the first reservoir 201, for instance. For discussion purposes herein, a negative Y direction refers to a direction from the input side of a plate to the output side of the plate, parallel to the Y axis. To maintain a high first transmissivity, therefore, it may be desirable for the thickness of the apparatus to be smaller than a length three orders of magnitude larger than the mean free path of a particle or object in the medium. In some embodiments, it may be preferable for the thickness of the apparatus to be a fraction of the mean free path.

The mean free path of a particle in a medium may be defined to be the average distance the particle travels between collisions with other particles. An estimate for a value of the mean free path may be made by relationship (1) below:

$$\lambda \approx 1/(\sqrt{2}\pi n \sigma^2) \qquad (1)$$

where λ is the mean free path, n is the number density of particles, and σ is the collision diameter of a particle.

The characteristic width of a channel is subject to similar considerations. The width may be on the order of 10 particle diameters, for example. The width may also be several orders of magnitude larger or smaller than that, depending on the application and the properties of the medium and the materials of the apparatus. Note that the smallest width of a channel is larger than the collision diameter of an object of interest in order to allow objects of interest to pass through a channel.

In other embodiments, a filtering apparatus configured in a similar manner as the filtering apparatus shown in FIG. 4 can be employed to interact with other species of types of objects of interest, such as electrons, sound waves, or phonons. In some of the following examples, the objects of interest are photons. In other examples, the objects of interest are particles with mass and volume or may alternatively be waves. When the objects of interest are particles, the effectiveness of a plate embodiment may be a function of the geometry and the scale, or the size, of the apparatus. In some applications, it may be desirable to avoid excessive photon-photon scattering, photon-object scattering, and/or diffuse reflection by the walls within the channel system. Although such scattering behavior can be considered and, at least partially, compensated for in the configuration of the apparatus, it may degrade the intended performance of the apparatus, by reducing the first transmissivity, for instance. In the absence of scattering, an initially negative Y-velocity component of a particle entering the channel system from the top station 201, for example, is more likely to be maintained, which would enhance any desired focusing effects.

Photon-object scattering refers to the scattering of photons from objects which may also be present in a medium of a first or second reservoir. It may be possible and desirable to prevent undesired objects from entering the channel system. For instance, this can be accomplished by artificially excluding, removing, or filtering such undesired objects, such as water molecules, air molecules, dust particles, from the channel system. For example, any objects, such as air molecules, located in a refrigeration chamber or a room may be prevented from entering a channel system by a filter, such as a metal plate or panels of glass located between a plate embodiment and a first and second reservoir. The filter may be capable of transmitting at least a portion of the objects of interest, e.g. photons.

Figure 5:
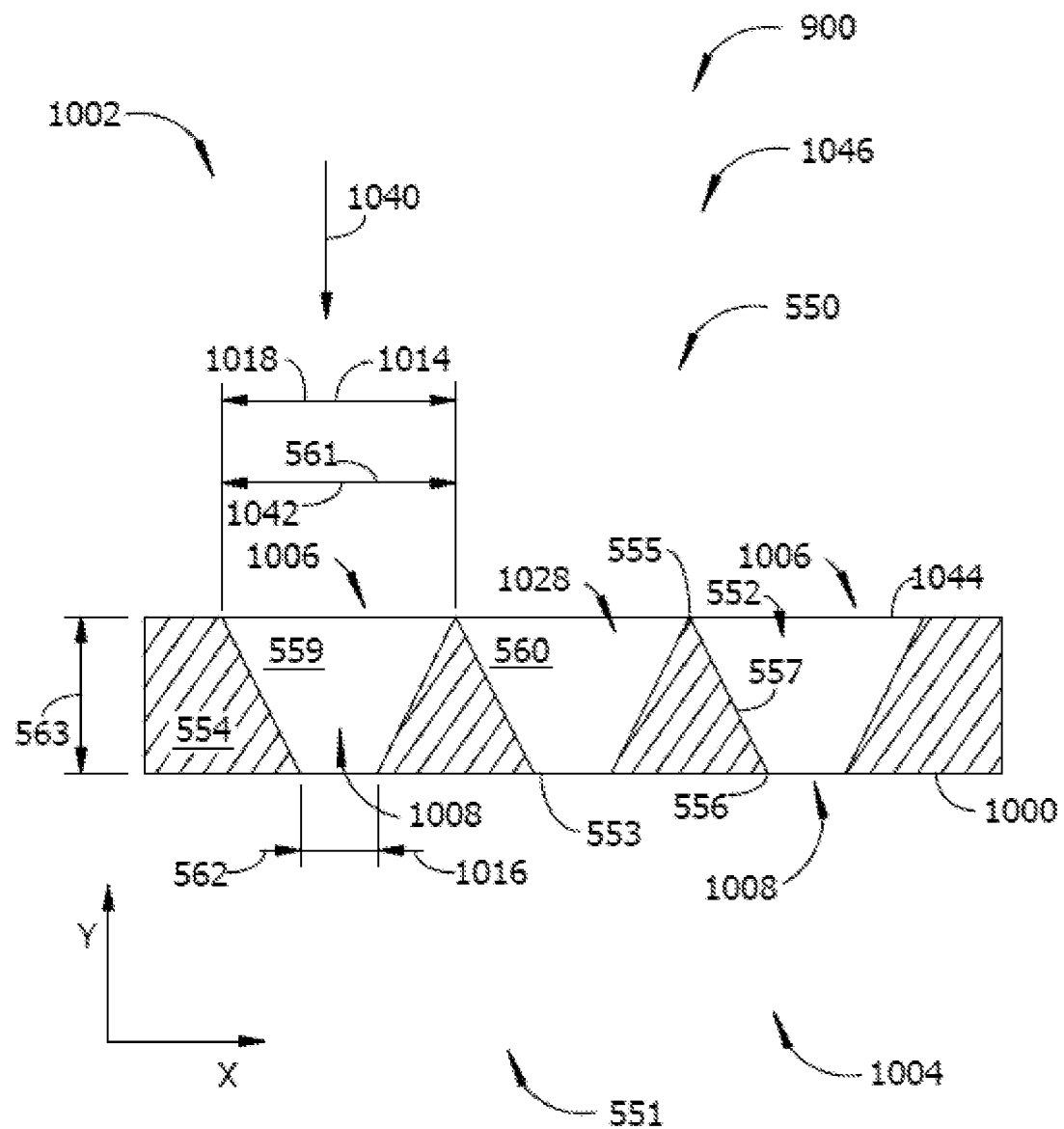
FIG. 5 is a cross-sectional view of another example filter plate embodiment formed with tapered channels.

Within the boundary formed by the filter, the plate may be immersed in a suitable, or desirable type of medium, such as a vacuum, to minimize any undesired scattering. Such filtering may not always be possible or practical for some scenarios, such as for photon-photon scattering. To maintain a high first transmissivity in that case, it may be desirable for the height of the apparatus to be smaller than a length several orders of magnitude larger than the mean free path of a photon in the medium. In some embodiments, it may even be preferable for the thickness of the apparatus to be less than the value of the mean free path. The characteristic width of a channel is subject to similar considerations. The width may also be within several orders of magnitude of the mean free path of a photon in the medium, for example. The width may also be a fraction of the mean free path, depending on the application and the properties of the medium and the materials of the apparatus. Note that in some cases, it may be desirable to configure a medium in a way in which the objects of interest have a suitable mean free path length. Amongst other factors, suitability may be determined by the relation between the tolerances of a specified manufacturing method and the required size and shape resolution of a plate embodiment. FIG. 5 is a cross-sectional view of another example plate embodiment 900. In the example to follow the medium 1046 is represented by a collection of photons, but the medium may alternately comprise different types of waves such as phonons or sound waves, or comprise a collection of particles with mass and volume. The example plate embodiment 900 in FIG. 5 is in fluid communication with a first reservoir 550 on a first side 1002 of the plate 1000 and a second reservoir 551 on a second side 1004 of the plate opposite the first side 1002. The example bulk material 554 of the example plate 1000 has a first surface 557 on the first side of the plate and a second surface 558 on the second side of the plate.

In FIG. 5, photons are able to pass through the depicted apparatus via designated channels, such as channel 559 or channel 560. In this example embodiment, each channel has a circular cross-section when viewed along the Y-axis. The first diameter 561 of the first opening 552 is larger than the second diameter 562 of the second opening 553, thereby defining opposite ends of a tapered channel 1028. The example thickness dimension 563 of the plate embodiment corresponds to a length of a channel along the Y-direction. In other embodiments, a channel may have a hexagonal cross-section. In some embodiments, a channel may have a hexagonal cross-section at the first opening 552, which may transform, as a linear function of a length along the Y-axis, to a circular cross-section at the second opening 553. Other channel geometries and shapes are also within the scope of the invention.

In the example filter plate embodiment 900 of FIG. 5, an inlet port 1006 has a diameter 561 that is larger than a diameter 562 of an outlet port 1008. The cross-sectional area of the first opening 552 for the inlet port is therefore larger than the cross-sectional area of the outlet port at the second opening 553. Combined with a suitable geometry of the channel between the first opening 552 and the second opening 553, this can result in a focusing of photons, or an increase in the number of photons per unit volume, or an increase in the density of photons. A portion of the photons from the first reservoir 550 which have entered inlet port 1006 at the first opening 552 are focused before exiting through outlet port 1009 at the second opening 553 into the second reservoir 551.

The first surface 557 forms a boundary between the channel and the bulk material 554. This boundary forms a curve in the cross-sectional view in FIG. 5. In this embodiment, this curve is a straight line between a first edge 555 of a first opening, such as first opening 552, and a second edge 556 of a second opening, such as opening 553. In other embodiments, this curve need not be straight, but can an arcuate shape.

The set of apparatuses comprised of a channel, such as channel 560, as well as any associated supporting material used to support the lenses, such as bulk material 554, is referred to as an "apparatus unit". The set of possible trajectories of a photon in the context of an apparatus unit is referred to as the "channel system". In FIG. 5, the medium surrounding the bulk material 554 is a vacuum. In other embodiments, the medium can comprise low pressure gas. In other embodiments, such as embodiments in which the objects of interest are electrons, the medium surrounding bulk material 554 can be a conductor such as a metal such as copper.

Throughout an interaction, the example plate embodiment shown in FIG. 5 is configured to focus photons originating at a first reservoir before they arrive at an interface to a second reservoir. Such an interface is formed by the plane describing the interface between channel 560 and the second reservoir 551. In this way, the probability of a photon passing through the second opening 553 to have originated at the first reservoir 550 is increased beyond the baseline probability of 50%. As a result, there is a net transmission of photons from a first reservoir 550 to a second reservoir 551. Once the default boundary condition is removed, and with the first and second reservoirs finite in size and otherwise isolated from each other and any other reservoirs, the concentration of photons in the first reservoir could be reduced over time, while the concentration of photons in the second reservoir could be increased correspondingly. Embodiments of the invention can thus also be considered for applications involving pumping. Connecting several stages of the apparatus shown in FIG. 5 in series could achieve a desired steady-state concentration of photons or other objects in a first reservoir 550.

In the example plate embodiment 900 shown in FIG. 5, the focusing of photons is accomplished by the reflection of photons by a first reflective surface, such as first surface 557, toward the outlet side 1004 of the plate 1000. Some photons which originate at the first reservoir 550 may return to the first reservoir 550 once the interaction is complete. Similarly, some photons which originate from the second reservoir 551 may be found at the first reservoir 550 once the interaction is complete. On average, however, the diffusion of objects, or the transmission of photons, which move from the first reservoir 550 to the second reservoir 551 throughout an interaction exceeds the diffusion of objects or transmission of photons moving in the opposite direction for the default boundary condition, in accord with the ratio of inlet port areas to outlet port areas as described previously for other example embodiments Although many of the previous examples have been described in the context of an object of interest being a photon, embodiments may be configured to cause a net displacement of other objects from a first reservoir on an inlet side 1002 of a filter plate embodiment 900 to a second reservoir on an outlet side 1004 of the plate 1000 for a dynamic boundary condition.

The average length of a channel, such as channel 215, of a channel system, such as the channel system shown in FIG. 4, may be referred to as the "characteristic length" of the filtering apparatus. The length of a channel is the length of the line which describes the centroid of a channel between the openings of the channel, where the openings refer to the interface between the channel and a reservoir. A single point on the centroid describes the center of the cross-sectional area of a channel at the location of the point, where the cross-sectional area is measured on a plane perpendicular to the interior wall surfaces of a channel. For example, the cross-sectional area of a point within channel 215 is measured along a plane parallel to the XZ-plane. Since the channels in the depicted channel system have a circular cross-section in general, the centroid of the channels is the line describing the centers of the circles describing the cross-sections of each channel along the length of each channel.

For example, the length of channel 215 is the distance of separation between the first opening 208 and the second opening 219 of channel 215, where the first opening 208 describes the interface between channel 215 and the first reservoir 201, and the second opening 219 describes the interface between channel 215 and the second reservoir 202. Since channel 219 is straight and symmetric about a central axis, the line which describes the centroid of channel 219 is straight and parallel to the Y-axis. The length of channel 215 in this particular embodiment is therefore also equal to the shortest distance between the first opening 208 and the second opening 219. Since the first surface 203 and the second surface 204 are planar and parallel to the XZ-plane, the length of channel 215 in this particular embodiment is also equal to the shortest distance between the first surface 203 and the second surface 204. The distance between the first surface 203 and the second surface 204 can also be referred to as the height of the depicted apparatus, as mentioned.

In another example, the length of channel 212 is the length of the line which describes the centroid of channel 212. Since channel 212 merges with channel 215, the centroid of channel 212 merges with the centroid of channel 215. The length of channel 212 is therefore the length of the centroid of the channel between the first opening of channel 212 and the second opening of channel 212, i.e. second opening 219. The first opening of channel 212 is the interface between channel 212 and the first reservoir 201, as exemplified by first opening 208 of channel 215. Similarly, the length of channel 217 is the length of the centroid of the channel between the first opening of channel 217, which is located at the interface between channel 217 and the first reservoir 201, and the second opening 219 of channel 217, which is located at the interface between channel 217, which has merged with channel 215, and the second reservoir 202.

The characteristic length of the channel system comprising channels 215, 212, 213, 214 and any other channels is the average length of all channels associated with the channel system. The characteristic length of a specified channel is the length of an individual, specified channel as described in the previous paragraphs.

In some example plate embodiments 900, the characteristic length of each of at least two channels which converge into a single channel within a channel system is smaller than a number several orders of magnitude larger than the smallest mean fee path of objects of interest within an adjacent reservoir. In accordance with some plate embodiments 900, the characteristic length of at least two channels which converge into a single channel within a channel system is smaller than two orders of magnitude larger than the smallest mean fee path of objects of interest within an adjacent reservoir. In other words, the ratio of the smallest mean free path of an object of interest in an adjacent reservoir to the characteristic length of each aforementioned channel is larger than 0.01.

The ratio of the mean free path of an object of interest in a specified reservoir to the characteristic length of a channel is denoted the "relative length", or "RL". Unless otherwise specified, the medium or the reservoir which provides the mean free path in the calculation of the RL is the medium or reservoir with the smallest mean free path. The relative length describes the size of the channel relative to the properties of the surrounding medium. In embodiments in which the medium can be described as a fluid, this ratio may be referred to as the Knudsen number.

In accordance with some embodiments of the invention, the RL of each of at least two channels in a channel system in which said two channels converge into a single channel can be larger than several orders of magnitude smaller than one. For example, the RL of each aforementioned channel can be 0.001 for some embodiments. For multiple order of magnitude smaller RL, the filtration effect of the filtration system can be non-zero, but negligibly small. In other example embodiments of the invention, the RL can be 0.01. The RL can also be 0.2, for example. The RL can be 1.5 in another example. The RL can be 3 in another example. The RL can also be larger than 3. In general, a larger RL increases the performance of the filtration system, but increases the complexity or difficulty of manufacture. As mentioned, an increase in the characteristic length relative to the mean free path of objects of interest in an adjacent reservoir can increase the probability of scattering of objects of interest as they travel through the filtering apparatus. This can reduce the focusing effect of the filtering apparatus and reduce the performance of the filtering apparatus.

For example, the mean free path of nitrogen gas at standard temperature and pressure is approximately 60 nanometers. For applications of a filter plate embodiment 900 in which the objects of interest are nitrogen atoms, and in which the first and second reservoirs are at standard temperature and pressure, the characteristic length can be about 60 nanometers, for example, where "about" and "approximately" as used herein refer to a value within plus or minus 30% of the stated figure. In another example filter plate embodiment, the characteristic length is about 6 micrometers. The characteristic length associated with yet other filter plate embodiments 900 may be about 30 nanometers, for example. For filter plate embodiments 900 similar to the example shown in FIG. 4, the characteristic length of channel 215 may be about 70 nanometers, for instance. For filter plate embodiments similar to the example shown in FIG. 5, the length 563 of a channel may be about of 35 nanometers. For filter plate embodiments similar to the example shown in FIG. 3, the characteristic length may be twice the average distance between the reflective surface of a focusing reflector, such as the reflective first surface 103 of first reflector 102, and the reflective surface of an associated defocusing reflector, such as the reflective surface 106 of a second reflector, such as second reflector 105. In FIG. 3, in simple terms, associated reflective surfaces can be considered to be facing each other. In this example, this characteristic length can be 55 nanometers, for instance.

In another example, the mean free path of electrons in the conduction band in copper can be considered to be approximately 40 nanometers. In embodiments of a filter plate in which the objects of interest are electrons, the bulk material, such as bulk material 200, or bulk material 102, or bulk material 554, may include an electrical insulator. The bulk material may optionally comprise material with a reflectivity which is greater than zero with respect to electrons. In these and other example filter plate embodiments, the bulk material can comprise material with a different refractive index with respect to objects of interest, i.e. electrons in this case, as described by FIG. 2, for example. In embodiments of the invention in which the objects of interest are electrons in the conduction band, and the medium in first and second reservoir is copper, the characteristic length associated with some filter plate embodiments may be about 40 nanometers, for example. In another example, the characteristic length may be approximately 40 micrometers, although the filtering or focusing effect of such an embodiment may be diminished relative to a filter plate embodiment with a smaller characteristic length for a specified mean free path of 40 nanometers. The characteristic length associated with some filter plate embodiments may alternatively be about 30 nanometers, for example. For filter plate embodiments similar to the example shown in FIG. 4, the characteristic length of channel 215 may be approximately 35 nanometers, for instance. For filter plate embodiments similar to the example shown in FIG. 5, the length 563 of a channel may be about 20 nanometers, for instance. For filter plate embodiments similar to the example shown in FIG. 2, the characteristic length may be the distance of separation between the center of a converging lens, such as first lens 1, and the center of an associated diverging lens, such as second lens 2. In FIG. 2, the centers of associated converging and diverging lenses are separated by the shortest distance compared to the distance of separation of the centers of unassociated converging and diverging lenses. In a filter plate embodiment 900 similar to the example of FIG. 2, the characteristic length can be about 45 nanometers, for instance.

For embodiments in which the objects of interest behave like waves, such as photons, phonons, acoustic waves, or ocean waves, for example, the mean free path may be very large, possibly even infinitely large. For very large values of mean free path, some objects of interest rarely or never scatter within a medium, such as a first reservoir or a second reservoir. This may be due to the superposition principle, which applies to some wave types. Since the mean free path of some of these objects of interest is larger than the mean free path in the aforementioned examples, the characteristic length of the filter plate embodiments may be larger as well. This can significantly reduce the complexity associated with the manufacture of a filter plate embodiment. A sufficiently large ratio of the mean free path relative to the characteristic length of the filtration apparatus should preferably be maintained.

A medium may be located in a first reservoir, a second reservoir, and/or the interior of a channel, such as the example channel 215 in FIG. 4. The characteristic length of a filter apparatus which is configured to interact with photons may be about ten meters, for example. The unidirectional focusing portions of such example filter plate embodiments function in a manner comparable to optical telescopes or solar concentrators, for instance, although the functions may be performed by structures in a plate embodiment at a vastly smaller scale than conventional telescopes or solar concentrators. As previously explained, the calculation of the mean free path of photons in the medium surrounding and enveloping the bulk material in a filter apparatus preferably takes into account photon-object scattering, i.e. collision between photons and other objects in the medium, such as air molecules. As mentioned, this effect can be mitigated by evacuating the portion of the filter apparatus which is concerned with the focusing of the objects of interest, e.g. the photons, from other objects of interest, e.g. air molecules, which would otherwise interfere with and reduce the mean free path of the objects of interest. For example, the focusing portion of the filter apparatus, such as the example channel system in FIG. 4, the example channel 559 in FIG. 5, or the region between the first and second reflective surfaces in the example of FIG. 3, such as first reflective surface 106 and second reflective surface 106, may be located in a vacuum.

The width of a channel, such as channel 560 in FIG. 5, or channel 215 in FIG. 4, follows similar considerations as the length of a channel. The width of a channel is measured in the plane which is perpendicular to the local centroid of the channel, as previously explained. A wider channel allows objects of interest to follow a path through the channel which is longer than the length of a channel, i.e. longer than the length of the centroid of a channel. This can increase the probability of an object of interest colliding with another object within the channel, or within the process of focusing the trajectory of the object of interest with the trajectories of other objects of interest. An increased probability of an object of interest undergoing a scattering event throughout the focusing process may reduce the efficacy of the focusing process and adversely affect the performance of the filter apparatus. The performance of the filter apparatus is a function of width of a channel, the length of the centroid of a channel, the geometric shape of a channel, as well as other parameters, such as parameters pertaining to the mean free path of objects of interest in the surrounding medium.

In some example plate embodiments, the smallest value of the width of a channel along the length of the channel, such as channel 215 in FIG. 4, may be approximately the minimum width required for objects of interest to be able to pass through the channel. In alternative plate embodiments, the smallest value of the width of a channel along the length of the channel may be about ten diameters of the object of interest. In other embodiments, the smallest value of the width of a channel along the length of a channel may be approximately equal to the mean free path of the object of interest in an adjacent reservoir. In some filter plate embodiments, the value of the width of a channel along the length of a channel may be smaller than a length several orders of magnitude larger than the smallest mean free path of objects of interest in a reservoir adjacent to the corresponding channel, where the mean free path is measured at the interface of the channel with the reservoir. For example, the value of a ratio of a smallest mean free path and the width of a channel may be about 0.001. In another example, the ratio of the smallest mean free path and the width of a channel may be about 0.01. In yet another example, the ratio of the smallest mean free path and the width of a channel may be about 3. Alternatively, the ratio of said smallest mean free path to the width of a channel may be about 10.

In the example of FIG. 5, the width of channel 559 is a diameter 561 at the first reservoir 550. The diameter 561 may be about one tenth the mean free path of objects of interest in the first reservoir 550 in the vicinity of channel 559 in some plate embodiments. In another example, diameter 561 may be about twice the value for the mean free path of objects of interest in the first reservoir 550. The width of channel 559 corresponds to a diameter 562 at the second reservoir 551 in the example of FIG. 5. The value of the diameter 562 can be about twice the minimum size required for objects of interest to pass through the example channel 559 in some plate embodiments. Alternatively, the diameter 562 can be about ten times the minimum size required for objects of interest to pass through a channel 559. The diameter 562 may be about a tenth the mean free path of objects of interest in the second reservoir 551. Alternatively, the diameter 562 may be about a hundred times the mean free path of objects of interest in the second reservoir 551 in the vicinity of channel 559.

The dimensions of channels in the other example plate embodiments may follow the parameter values described for the example plate embodiment of FIG. 5. The width of each channel in a channel system in FIG. 4 may be constant along the length of an individual channel, or may alternatively change along the length of a selected channel. In the examples of FIG. 2 and FIG. 3, the outer diameter, the outer size, or the channel-to-channel spacing, of a reflective surface, such as reflective surface 103, or of a refractive body, such as lens 1, when said surface or body is projected onto the XZ plane, may for some implementations be considered as the width of a channel. For example, the diameter (or comparable transverse dimension) of the example lens 1 in FIG. 2 along the X-direction may be approximately equal to the mean free path of an object of interest in the surrounding medium. In another example, the size of lens 1 may be about half the value of the mean free path. In another example, the size of lens 1 may be about ten times said the value of the mean free path. Similarly, the extent of reflective surface 103 along the X-direction may be approximately equal to the mean free path of an object of interest in the first reservoir 100 in FIG. 3, for example.

The manner in which a filtration apparatus is manufactured depends on the scale or the characteristic length of a filtration apparatus. For example, consider an application example in which the mean free path of objects of interest in a medium is about one millimeter. The characteristic length of an example embodiment of a filter system for such an application may be about one centimeter. Structures of this scale can be readily manufactured and mass produced using conventional mechanical manufacturing techniques, such as computer numerical controlled (CNC) mills, selective laser sintering (SLS), photolithography and etching, additive printing processes, and so on.

Embodiments of a filter apparatus for which the characteristic length is on the order of nanometers may be manufactured with semiconductor manufacturing equipment and procedures. For example, grayscale electron beam or ion beam lithography can be employed to manufacture molds with large arrays of repeating patterns of complex geometry at the nanometer scale. These molds can be employed to imprint the desired surface features on a substrate using nanoimprint lithography. This method can be employed to manufacture filter plate embodiments as shown in the examples of FIGS. 3 and 5, for example. In another example, filter plate embodiments can be manufactured using nanometer scale additive manufacturing techniques, such as electron beam induced deposition. These and other manufacturing techniques can benefit from interference effects to manufacture the aforementioned large arrays of complex structures. These methods are known in the field of interference lithography, for example. Subtractive manufacturing techniques such as deep reactive ion etching can be employed to manufacture convergent or divergent channels of filtration apparatuses of the type shown in FIG. 4, for example. The channel diameter can be on the order of tens of nanometers, for instance.

Figure 6:
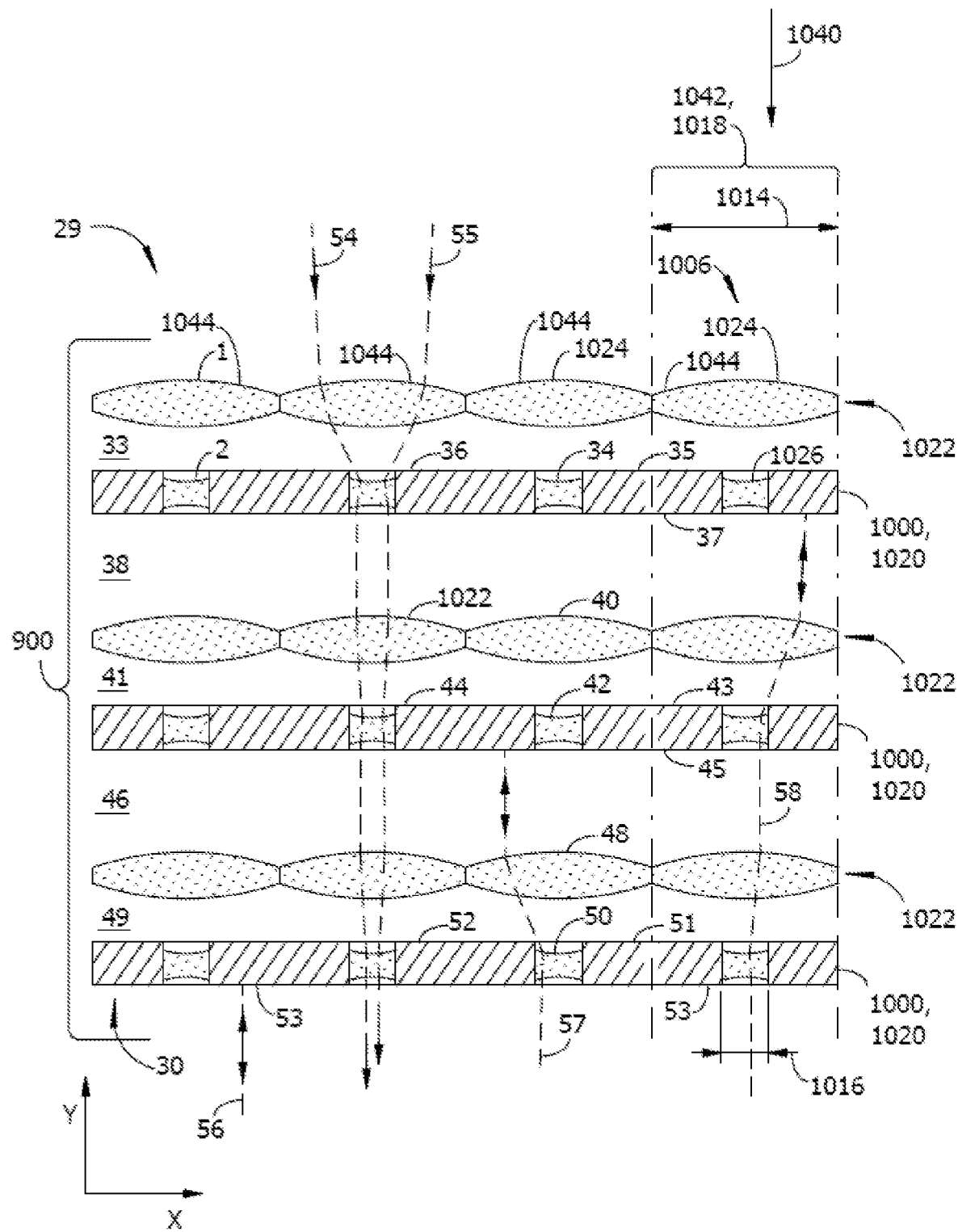
FIG. 6 is a cross-sectional view of another example filter plate embodiment comprising a layered arrangement of plates and optical elements.
Figure 7:
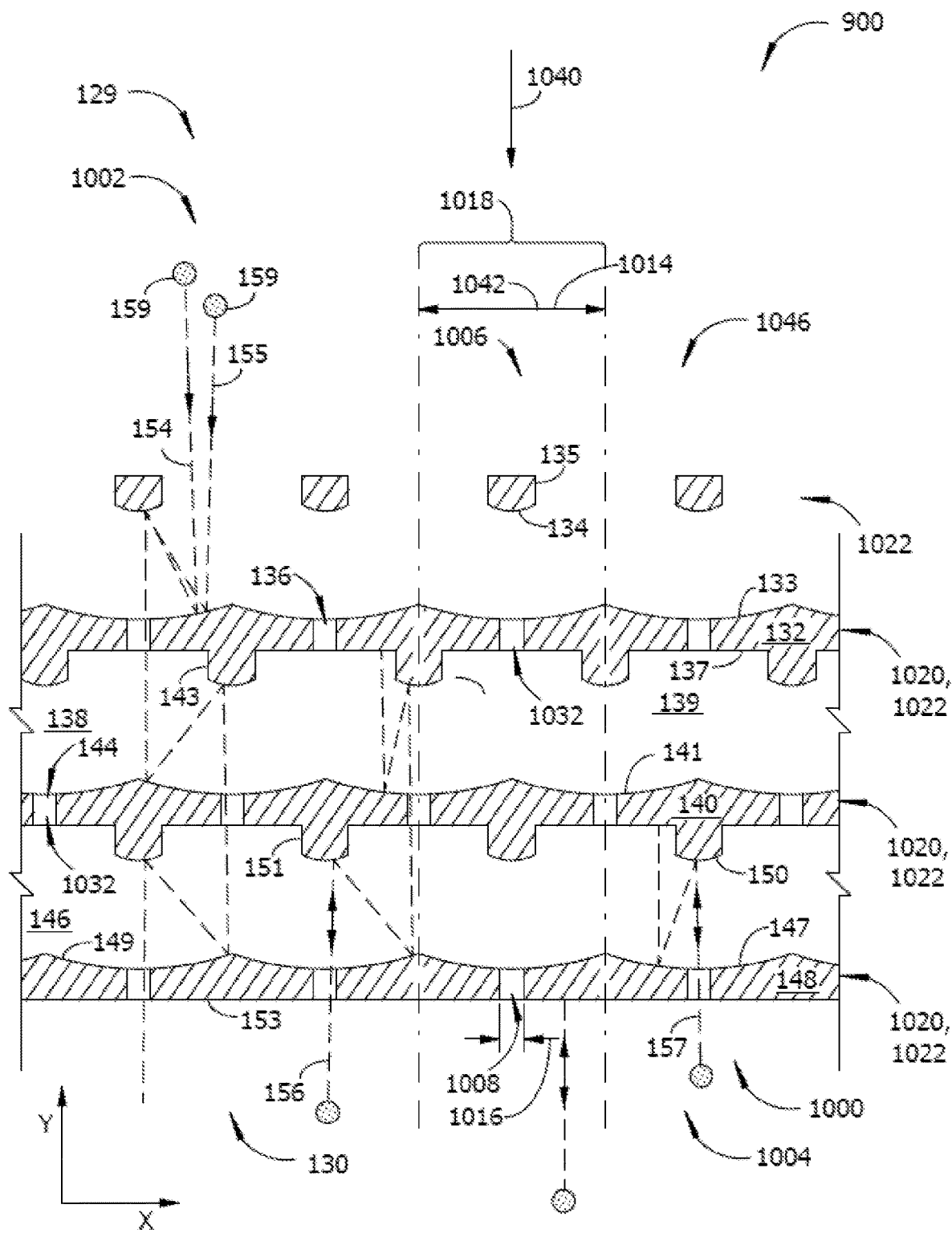
FIG. 7 is a cross-sectional view of another example embodiment comprising a layered arrangement of plates and optical elements having reflecting surfaces.

FIGS. 6 and 7 show examples of alternative examples of a filter plate embodiment 900 comprising multiple layers of optical elements 1022 and plate layers 1020. In FIG. 6, several layers of the filtering apparatus shown in FIG. 2 are arranged in series, i.e. in the Y-direction or in a direction normal to the planar surface of the filtering apparatus relative to each other. Individual channels, channel 107 in FIG. 3, of adjacent filtering layers arranged in series are configured concentrically in order to maximize the focusing effect. In FIG. 6, indicated by object trajectories 54 and 55 the focusing effect can be enhanced by arranging several layers in series. The distance of separation between trajectories 54 and 55 is reduced within each layer on the path from the first reservoir 29 to the second reservoir 30. Note that the defocusing and reflecting of trajectories, such as trajectory 57 or 58 can require several layers of filtering apparatuses.

In FIG. 7, several layers of the filtering apparatus shown in FIG. 3 are arranged in series. In FIG. 7, as indicated by object trajectories 155 and 154, a similar effect is achieved. As before, the defocusing and reflecting of trajectories, such as trajectory 156 or 157 can require several layers of filtering apparatuses.

Figure 8:
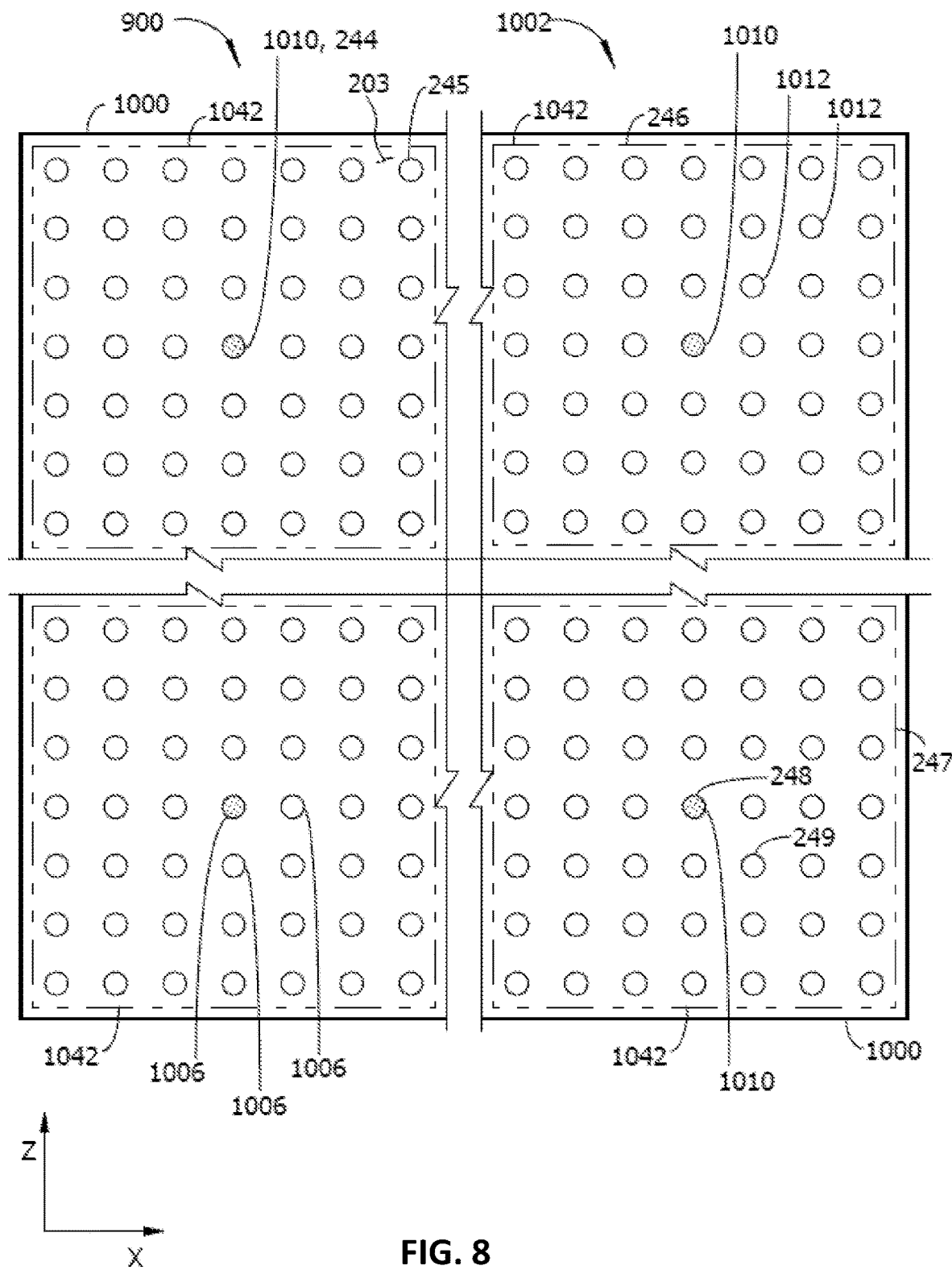
FIG. 8 is a view toward a first side of the example filter plate embodiment of FIG. 4.
Figure 9:
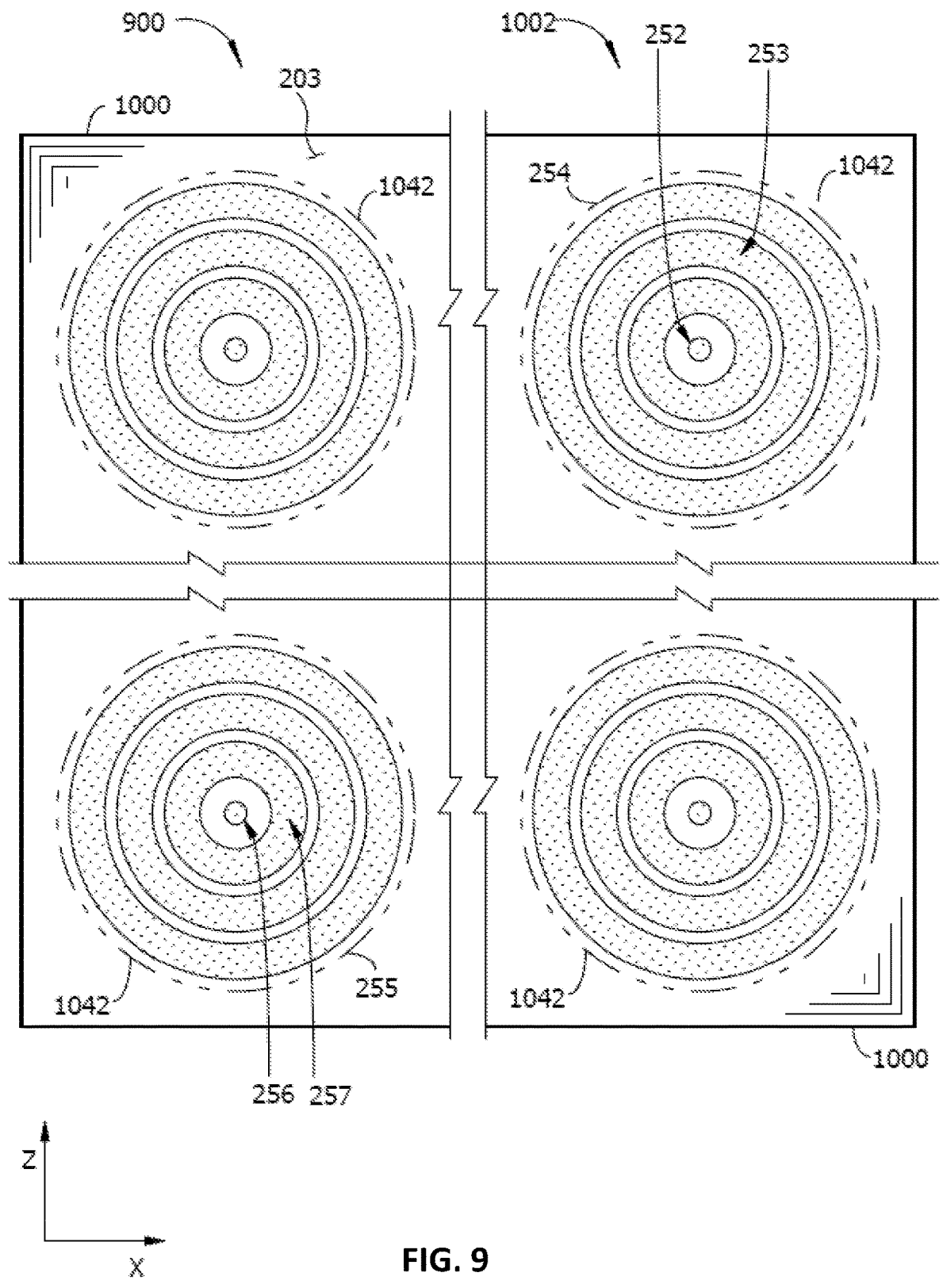
FIG. 9 is a view toward the first side of an example of an alternative embodiment of the filter plate from FIG. 4.

FIGS. 8 and 9 show examples of how the inlet ports 1006 associated with a channel system may be arranged, and how multiple channel systems may be positioned on the inlet side of an example filter plate. In FIG. 8, channel 248 can be considered to be a central channel of a channel system, such as channel 215 in the channel system shown in FIG. 4. The channels arranged in a square pattern around channel 248, such as the channels enclosed by boundary 247, such as channel 249, can be considered to be branches of or tributaries to central channel 248. The channel systems can be arranged in an array adjacent to each other to form a filtering apparatus or a filtering plate of a desired size. The size of the plate can be on the order of square centimeters, or square meters, for example.

In FIG. 9, channel 252 can be considered to be a central channel of a channel system, such as channel 215 in the channel system shown in FIG. 4. The channels are annular in shape and arranged in a concentric pattern around channel 252, such as channel 257 around central channel 256. Each annular channel, such as channel 253 can be considered to be branches of or tributaries to a central channel, such as channel 252. In this case the boundary surface 255 describing an apparatus unit or channel system is circular in shape. As before, channel systems can be arranged in an array adjacent to each other to form a filtering apparatus or a filtering plate of a desired size.

Figure 10:
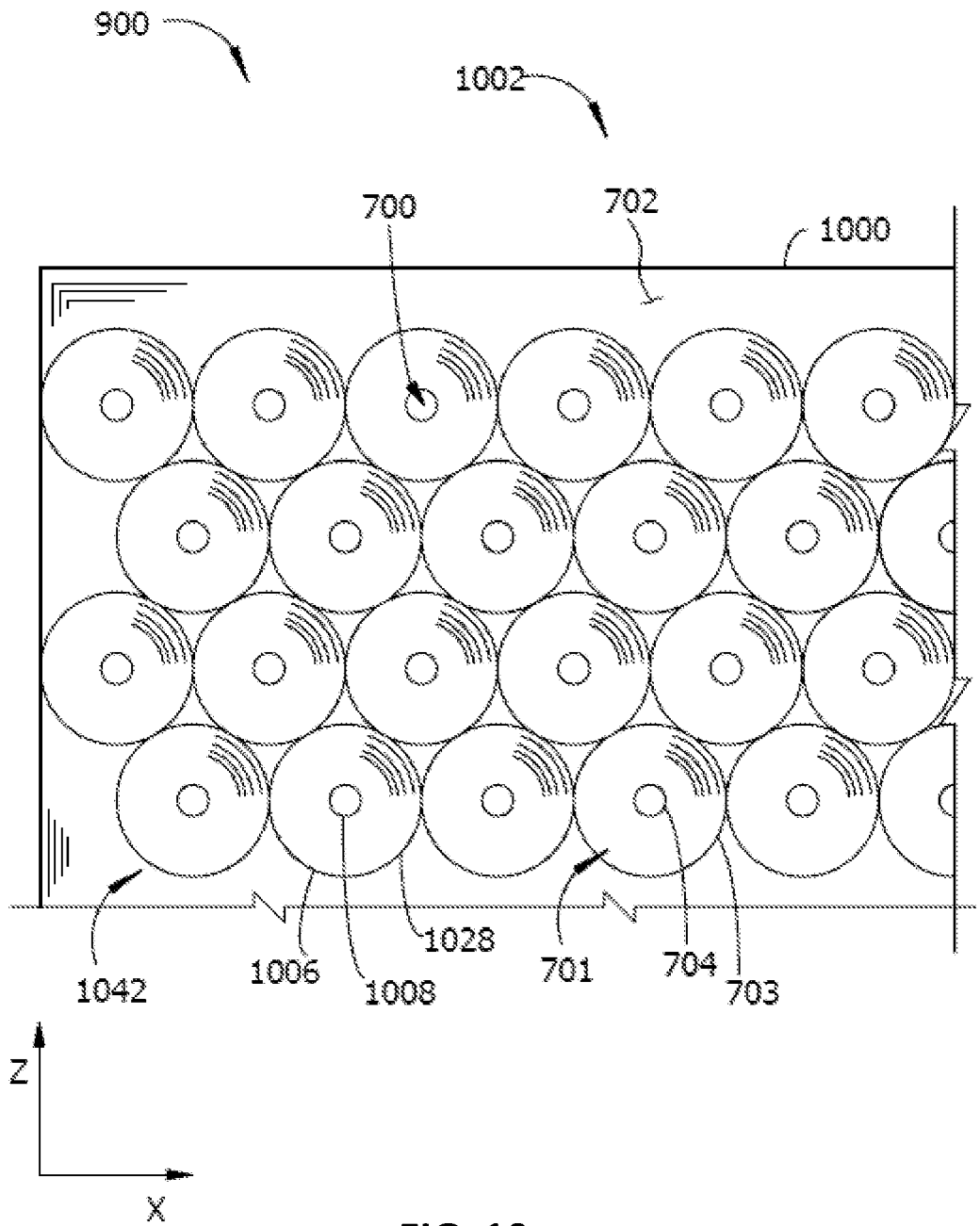
FIG. 10 is a view toward a first side of the example filter plate embodiment of FIG. 5.

In the example of FIG. 10, inlet and outlet ports for tapered channels are viewed from the inlet side of a filter plate. A central hole, such as central hole 700, corresponds to a second opening in FIG. 5, such as second opening 553. The interior edge, such as edge 556, of such an opening is visible in the form of a circle, such as circle 703. The interior edge, such as edge 555, of first opening is also visible in the form of a circle, such as circle 704. The planar outside surface 702 of the filtering apparatus, as well as the interior surface 701 of a channel, such as first surface 557 are also visible.

Figure 11:
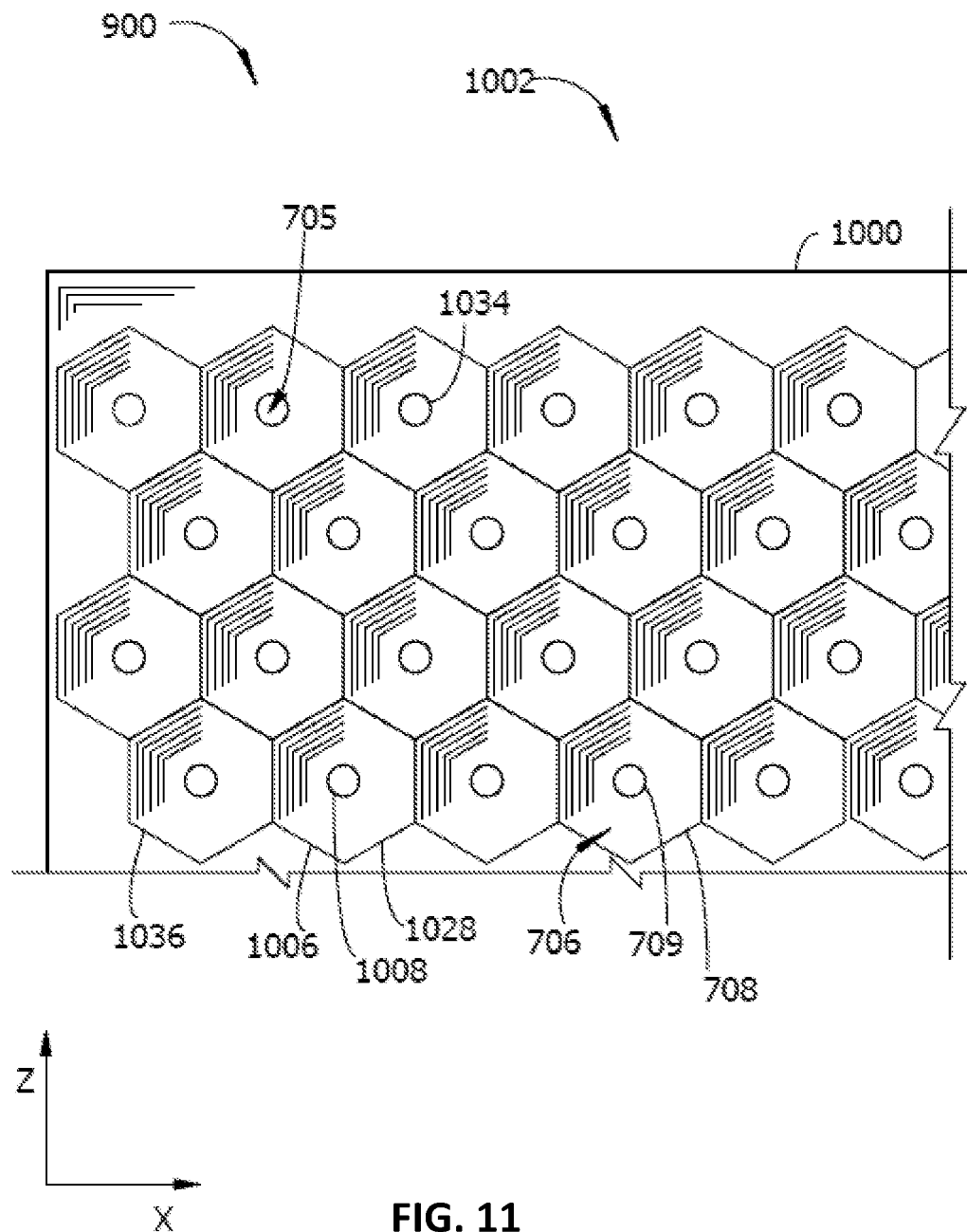
FIG. 11 is a view toward the first side of an alternative filter plate embodiment described in FIG. 5.

FIG. 11 shows an example of inlet ports having a hexagonal perimeter shape and outlet ports having a circular perimeter shape. A central hole, such as central hole 705, corresponds to a second opening in FIG. 5, such as second opening 553. The interior edge, such as edge 556, of such a second opening is visible in the form of a circle, such as circle 709. The interior edge, such as edge 555, of first opening is also visible in the form of a hexagon, such as hexagon 708. The interior surface 706 of a channel, such as first surface 557 is also visible.

Figure 12:
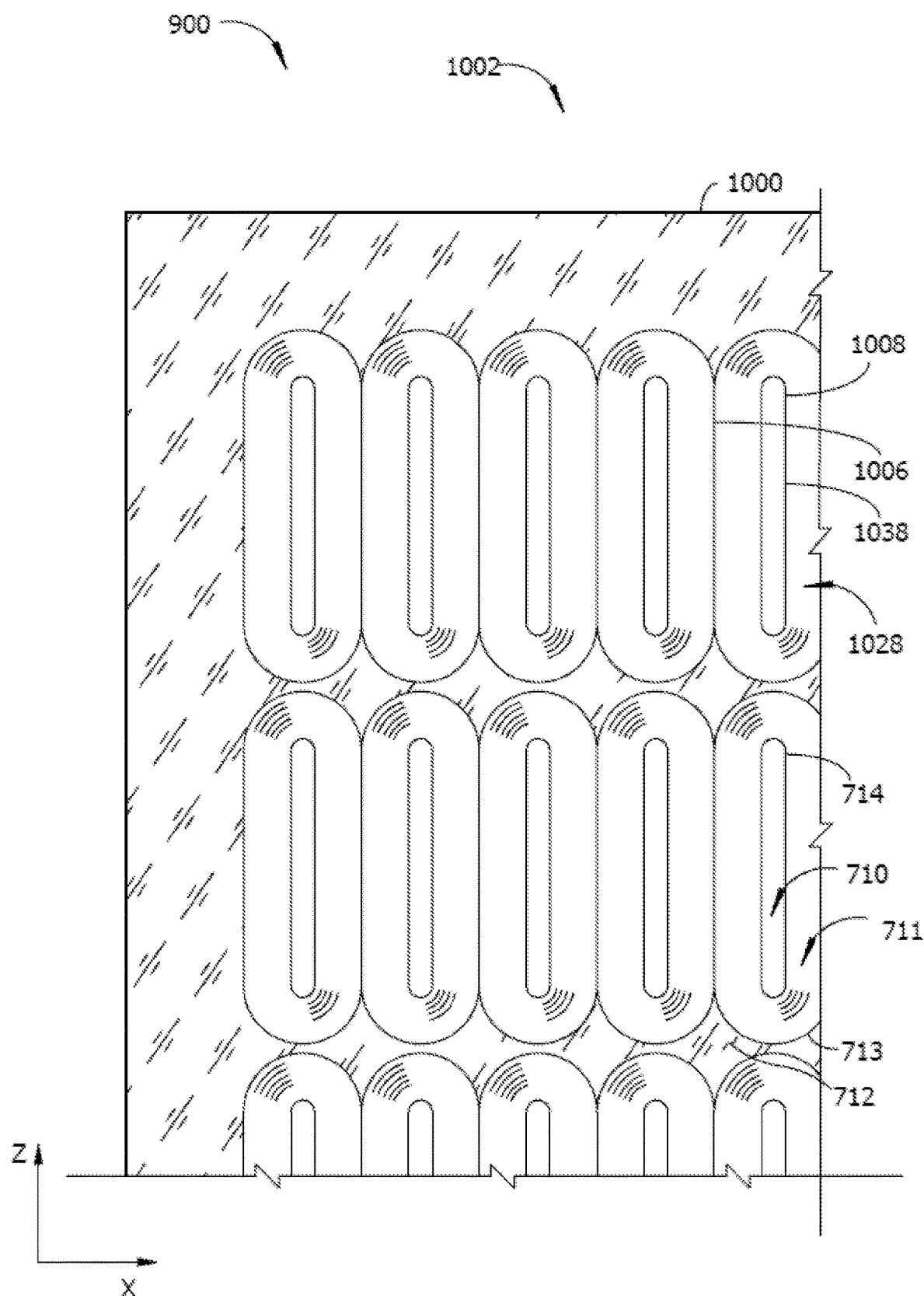
FIG. 12 is a view toward the first side of another alternative filter plate embodiment of FIG. 5.

FIG. 12 shows examples of obround inlet and outlet ports. A central inlet, such as central inlet 710, corresponds to a second opening in FIG. 5, such as second opening 553. The interior edge, such as edge 556, of such a second opening is visible 714. The interior edge, such as edge 555, of first opening is also visible 713. The planar outside surface 712 of the filtering apparatus, as well as the interior surface 711 of a channel, such as first surface 557 is also visible.

Figure 13:
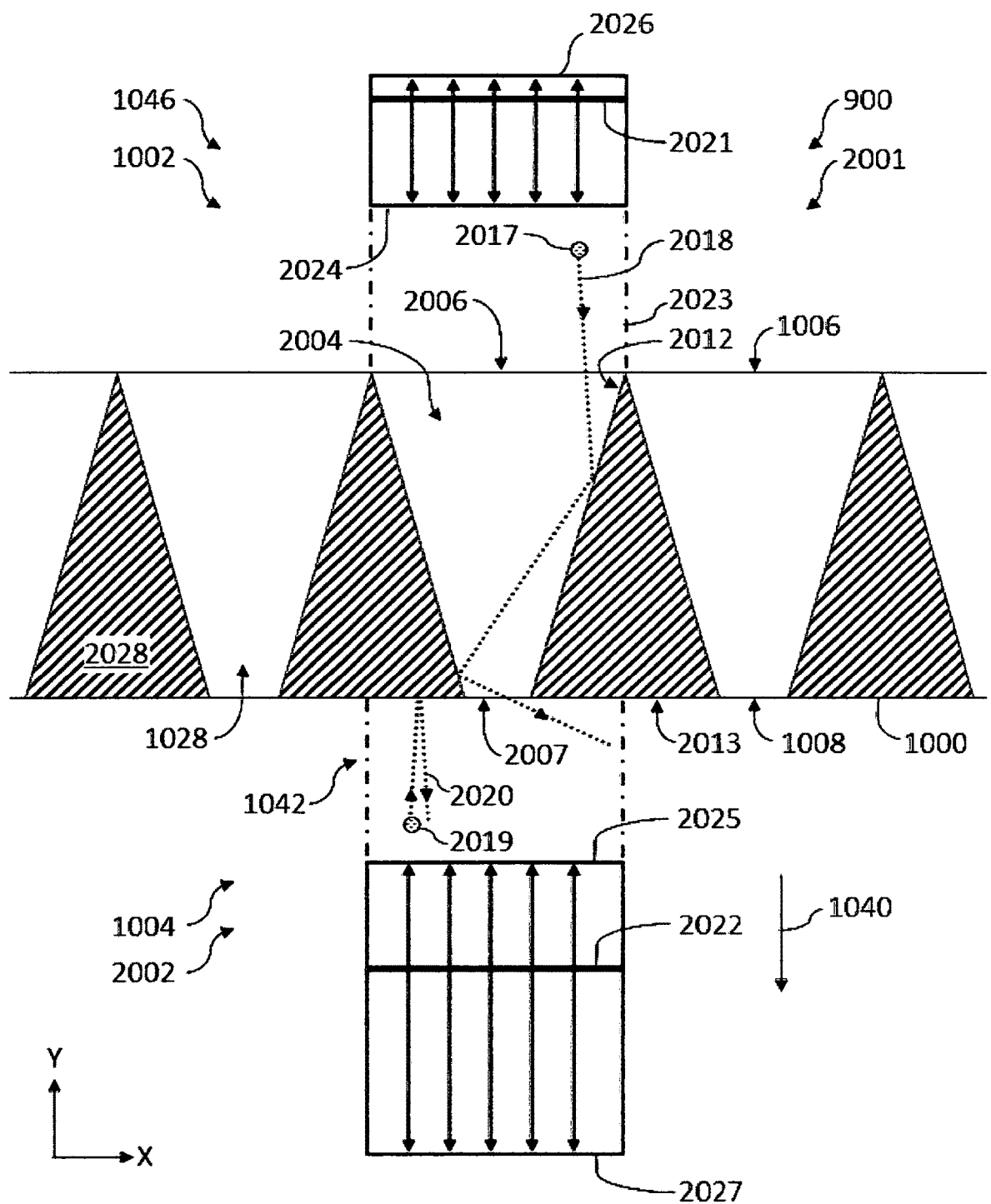
FIG. 13 is a cross-sectional view of one embodiment of the invention and a schematic representation of the interaction of said embodiment with objects of interest.

FIG. 13 is a cross-sectional view of one embodiment of the invention and a schematic representation of the interaction of said embodiment with objects of interest.

The embodiment shown in FIG. 13 is configured identically to the embodiment shown in FIG. 5 unless otherwise specified or shown in the figures. The angle formed between and interior surface of a channel, such as interior surface 2012, and a second outside surface, such as outside surface 2013, is 75 degrees in this cross-sectional view, while it is approximately 60 degrees in the embodiment shown in FIG. 5. The limitations on the characteristic length and width of a channel, as well as the configuration of the bulk material 2028 are unchanged relative to the embodiment shown in FIG. 5. FIG. 13 can be considered to describe the interaction of objects of interest with embodiments of the type shown in FIG. 5 for a subset of use cases in more detail.

In the scenario shown in FIG. 13, the distribution of the "initial velocities", i.e. the velocities of objects of interest prior to interacting with the filtering apparatus 900 is non-uniformly distributed over the range of possible angles. The component of the initial velocities is larger along the positive or negative Y-direction than in the positive or negative X-direction. In other words, an object of interest which interacts with the filtering apparatus 900 is more likely to be approaching the filtering apparatus from the positive or negative Y-direction than the positive or negative X-direction. The statistical distribution of initial velocities over all possible angles, i.e. over 360 degrees, is a non-uniform, or non-constant function of angle. The peak of this statistical distribution lies at +90 degrees and −90 degrees when the angle is measured relative to the XZ-plane Such a scenario occurs in several applications of embodiments of the invention. For example, a filtering apparatus can be employed to transfer photons from one finite sized reservoir to another finite sized reservoir. When these finite sized reservoirs, or photon sources, are located a sufficiently far distance from the filtering apparatus, and the solid angle of the filtering apparatus is sufficiently small, and the filtering apparatus is arranged perpendicularly to a direct line connecting the photon sources, the photons which interact with the filtering apparatus from both the first and the second reservoir are substantially perpendicular to the filtering apparatus.

In another example, there can be a net flow or a bulk flow of objects of interest directed along the negative Y-direction. When the velocity of the bulk flow is sufficiently large relative to the average relative velocity of the OI within the bulk, the directions of the initial velocities of individual OI interacting with the filtering apparatuses are also non-uniformly distributed as a function of all possible angles. For example, consider an ideal gas moving in the negative Y-direction relative to the filtering apparatus 900 at a speed of Mach 0.5, i.e. half the speed of sound. In this case the distribution directions of initial velocities of OI, i.e. the individual gas molecules, is non-uniform and biased in the negative Y-direction, i.e. the −90 degrees direction in the aforementioned example. This is even more pronounced at Mach 1, or at supersonic speeds, such as Mach 2. Note that the shape of the distribution of directions of initial velocities need not be identical in the first reservoir 2001 and the second reservoir 2002. For instance, the distribution of directions of initial velocities in the first reservoir, i.e. the distribution within the range 0 degrees to −180 degrees via −90 degrees, can be substantially biased towards the −90 direction. In an arbitrary example of such a bias, 50% of all initial velocity directions in the first reservoir can lie within +10 degrees and −10 degrees of the −90 degree direction, i.e. approximately 11% of all possible initial directions in the first reservoir in a 2D-scenario. This bias need not be the same in the second reservoir, where, in another arbitrary example, 40% of all initial velocity directions in the second reservoir can lie within a range of angles smaller than +10 degrees or larger than +170 degrees. The geometry of embodiments of the invention can be adapted to the distribution of initial velocity directions in in both reservoirs in some embodiments of the invention.

In another example, resonance effects in the reservoirs adjacent to the filtering apparatus can result in a larger probability of waves being incident on a filtering apparatus in the +90 and −90 degree directions.

In another example, the distributions of initial directions can be modified artificially to be biased towards the +90 and −90 degree directions by other reflectors. This pre-focusing can improve the performance of a filtering apparatus, since it is easier to optimize a geometry for a single angle than multiple angles at once. In the aforementioned example of the two finite reservoirs emitting thermal radiation towards each other, the finite reservoirs can be located in the focal point of a parabolic mirror which surrounds the finite reservoirs. For instance, the finite reservoirs can be cylindrical or spherical in shape. When viewed in a cross-section, the finite reservoirs emit thermal radiation, i.e. photons, in a circular pattern. The parabolic mirror or similarly configured reflector can convert this radial radiation pattern into a unidirectional radiation pattern, where the direction of the radiation from the first reservoir is directed parallel to, and in the opposite direction of: the direction of the radiation from the second reservoir. A filtering apparatus or a filtering plate, such as the filtering apparatus shown in FIG. 2, 3, 6, or 8, for example, can be located perpendicular to these directions, such that the Y-axis, or the normal of the planar filtering apparatus, is parallel to the primary radiation direction. In this manner, only a fraction of the photons emitted by the second finite reservoir are transmitted to the first finite reservoir, while a larger fraction of the photons emitted by the first finite reservoir are transmitted to the second finite reservoir. Thus heat can be transferred from the first reservoir to the second reservoir. Due to the focusing effect, the first reservoir can be colder than the second reservoir. In other words, heat can be transferred from a cold object to a warm object, relatively speaking. This concept can be used to power a heat engine which converts thermal energy directly into mechanical work, for example. The apparatus thus described can be considered to be a heat transfer apparatus and the filtering apparatus can be considered to be a temperature amplifier. Due to the presence of the filtering apparatus between the first reservoir and the second reservoir, the absorptivity of the second reservoir is larger than the emissivity of the second reservoir, as perceived by the first reservoir. In the scenario in which the first and second reservoirs are constructed to be identical, and in a static boundary condition, the temperature of the second reservoir is larger than the temperature of the first reservoir.

In FIG. 13, the initial direction of the OI is within approximately 5 degrees of +90 degrees and −90 degrees, as measured relative to the XZ-plane. An OI diffusing in the negative Y-direction from the first reservoir 2001 into a channel 2004 and into the second reservoir 2002 is represented schematically by particle 2017 and trajectory 2018. An OI diffusing in the positive Y-direction from the second reservoir 2002 and being reflected by the second outside surface 2013 is schematically represented by particle 2019 and trajectory 2020. The influx of OI from the first reservoir 2001 is indicated by the magnitude of the flux of objects 2024, which is the number of objects per unit time and per unit area, the magnitude of which is indicated relative to reference line 2021 and the direction of which is indicated by the enclosed arrows, which are in this case directed in the negative Y-direction. For the dynamic boundary condition shown, the influx 2025 of OI from the second reservoir 2002 is identical in magnitude and also uniformly distributed in the XZ-directions, although only variation of the influx 2025 along the X-direction is shown in this cross-sectional view. The magnitude of influx 2025 is indicated relative to reference line 2022 and the direction is indicated by the enclosed arrows, which are in this case directed in the positive Y-direction. The outflux of OI into the second reservoir 2002 is indicated by outflux 2027, which is also measured relative to reference line 2022, and which comprises both the flux of OI transmitted from the first reservoir 2001 to the second reservoir 2002 as well as the flux of OI which have been reflected back into the second reservoir 2002. The outflux of OI into the first reservoir 2001 is indicated by outflux 2026, which is measured relative to reference line 2021, and which comprises both the flux of OI transmitted from the second reservoir 2002 to the first reservoir 2001 as well as the flux of OI which have been reflected back into the first reservoir 2001. Due to the geometry of the filtering apparatus, namely the reflection of a large majority of the influx 2025 by second outside surface 2013 and the transmission of a majority of the influx 2024, and the size of the filtering apparatus, namely the avoidance of excessive scattering events of OI, the outflux 2027 is larger than the outflux 2026, resulting in a net diffusion or a bulk flow of OI from the first reservoir 2001 to the second reservoir 2002 for the dynamic boundary condition shown. The first capture area, i.e. the area of the first opening 2006 is larger than the second capture area 2007, and the first transmissivity is a number slightly less than one, or approximately equal to one, while the second transmissivity is equal to one. The ratio of the product of the first transmissivity and the first capture area over the product of the second transmissivity and the second capture area is therefore greater than unity.

Figure 14:
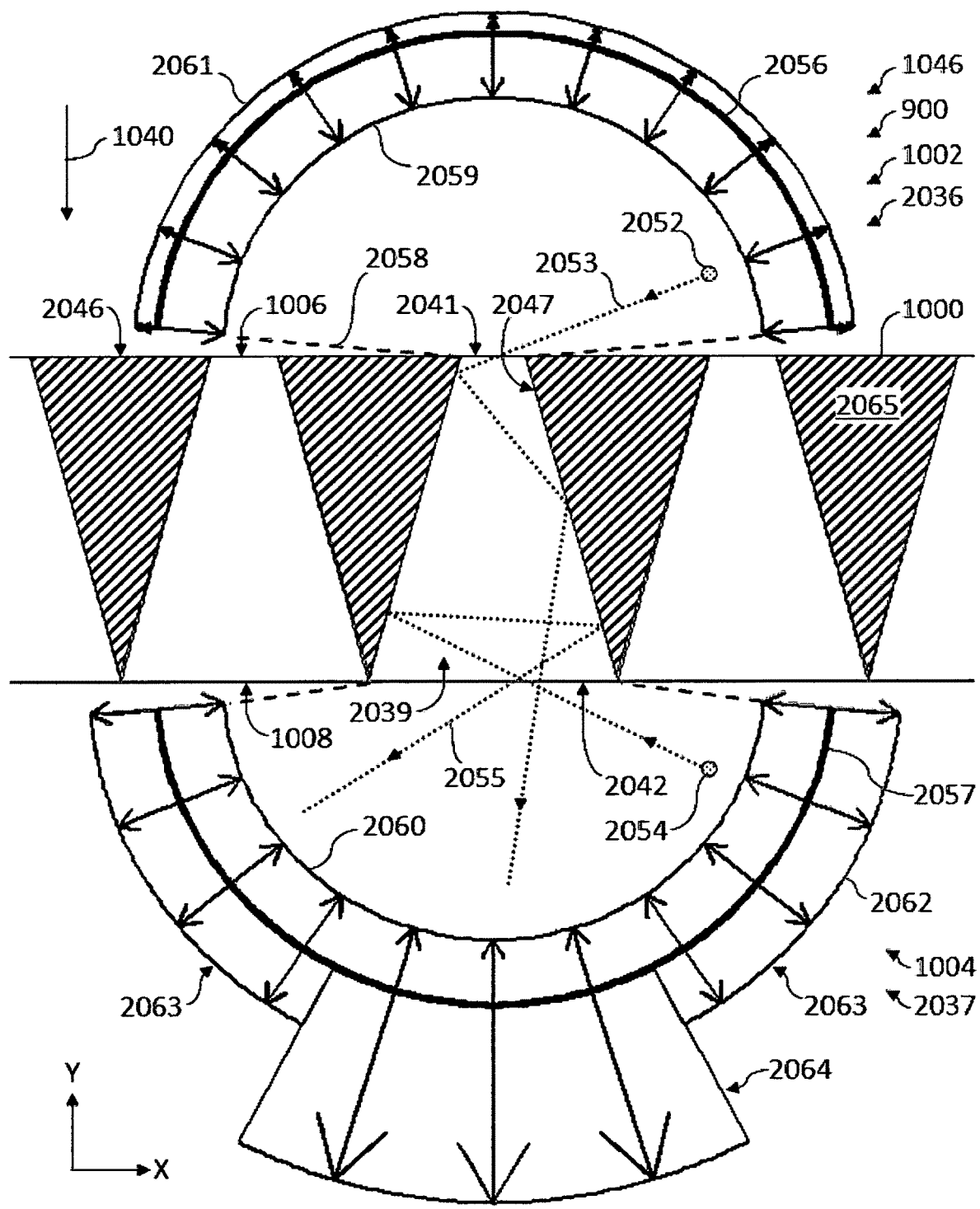
FIG. 14 is a cross-sectional view of the embodiment shown in FIG. 13 and a schematic representation of the interaction of said embodiment with objects of interest, where the properties of the objects of interest in the medium adjacent to the embodiment are different to the properties of the same for the scenario shown in FIG. 13.

FIG. 14 is a cross-sectional view of the embodiment shown in FIG. 13 and a schematic representation of the interaction of said embodiment with objects of interest, where the properties of the objects of interest in the medium adjacent to the embodiment are different to the properties of the same for the scenario shown in FIG. 13. The embodiment 900 shown in FIG. 14 can be considered to be identical to the embodiment shown in FIG. 13, where the embodiment in FIG. 14 has been rotated by 180 degrees about an axis in the XZ-plane. In other words, the first reservoir 2001 in FIG. 13 has been designated the second reservoir 2027 in FIG. 14. This change in designation is done for convenience and illustrative purposes, and clarity of description. The principle of operation and the construction of filtering apparatus 900 is unchanged. The properties of the medium or the operating mode of the filtering apparatus 900 are the only difference between the scenario shown in FIG. 13 and FIG. 14.

In FIG. 14 the distribution of initial directions, i.e. the distribution of the directions of the initial velocities of OI which interact with the filtering apparatus 900, are more uniformly distributed over the range of all angles, i.e. 360 degrees, than in the scenario shown in FIG. 13. In the simplified scenario shown in FIG. 14, the distribution of initial directions for OI which enter a channel from the first reservoir 2036 is uniform. This is indicated by the uniformly distributed incident flux 2059 from the first reservoir, where the distribution is uniform over the range of possible directions indicated by the arrows within the contours of the plot of the incident flux 2059. The incident flux 2059 is measured relative to the reference line 2056. For the dynamic boundary condition the properties of the first reservoir 2036 and the second reservoir 2037 are assumed to be instantaneously identical. Accordingly, the distribution of incident flux 2060 of OI from the second reservoir 2037 as a function of the direction of the incident velocity is also uniform over all directions, as indicated by a constant magnitude of flux 2060 relative to reference line 2057.

Such a distribution of incident flux occurs in a wide variety of applications of embodiments of the invention. For example, in a typical stationary medium, i.e. a medium in which the average velocity of OI is zero, i.e. a medium in which the bulk flow is zero, the distribution of velocities of OI is uniformly distributed over all angles. This applies to atoms or molecules in gases, or electrons in the conduction bands of conductors. A filtering apparatus placed in such a stationary medium will therefore be subject to a uniform distribution of initial directions, i.e. the probability of an OI interacting with a channel or an outside surface of a filtering apparatus having an initial velocity with a specified direction is approximately equal for all directions.

For the simplified embodiment shown in FIG. 14, all of the OI which enter a channel such as channel 2039 from the first reservoir 2036 and transmitted to the second reservoir. Note that, for simplicity, it is assumed that there are no randomizing scattering events throughout the motion of an OI through the filtering apparatus. In other embodiments there can be scattering events, such as OI to OI collisions or diffuse reflections from the interior surface of a channel, such as interior surface 2047, provided that there can still be a net diffusion for a dynamic boundary condition or a net concentration, pressure, or density difference for a static boundary condition. As an OI diffuses from the first reservoir 2036 to the second reservoir 2037 through channel 2039, an OI can collide with the interior wall 2047 of a channel. Due to the angle of the wall relative to the XZ-plane, the component of the direction of motion of an OI along the Y-direction increases. This effect is shown in FIG. 14 in terms of the example trajectory of an OI, such as trajectory 2053 of OI 2052. As shown, the component of motion or of the velocity of OI 2052 in the negative Y-direction increases in magnitude with each collision with the interior surface 2047. As a result, the initially uniform distribution of velocities in the first reservoir 2036 indicated by flux magnitude 2059 as a function of direction is no longer uniform when the OI arrive in the second reservoir 2037. The initially hemispherical, uniform distribution of directions has been focused into a concentrated beam 2064 of outflow velocities. Due to the high first transmissivity and the geometric properties of the interior surface 2047 of channel 2039 the entire influx 2059, i.e. the influx 2059 integrated over all angles, has been focused into a reduced set of angles, i.e. a concentrated beam 2064.

Conversely, any influx 2060 from the second reservoir 2037 into channel 2039 with an initial angle which lies within the limited range of said beam 2064 is spread out over the entire range of possible influx angles, resulting in a reduced outflux magnitude 2061, measured relative to the same reference line 2056. Any influx 2060 from the second reservoir into channel 2039 with an initial angle which lies outside the limited range of said beam 2064 is reflected back into the second reservoir 2037, as indicated by the portion 2063 of outflux 2062 which lies outside of beam 2064. Outflux 2062 is also measured relative to reference line 2057. The scenario in which an OI from the second reservoir 2037 is reflected back into the second reservoir 2037 is exemplified by trajectory 2055 of OI 2054.

As a result, the first transmissivity is larger than the second transmissivity. In some embodiments, the ratio of the first transmissivity to the second transmissivity is sufficiently large, that the ratio of the product of the first transmissivity and the first capture area, i.e. the area of first opening 2041 in the XZ-plane, to the product of the second transmissivity and the second capture area, i.e. the area of the second opening 2042, is greater than one, despite the first capture area being smaller than the second capture area. In some such embodiments, therefore, there is a net diffusion of OI from the first reservoir 2036 to the second reservoir 2037 for a dynamic boundary condition, or a larger concentration, density, or pressure of OI in the second reservoir 2037 relative to the first reservoir 2036.

Figure 15:
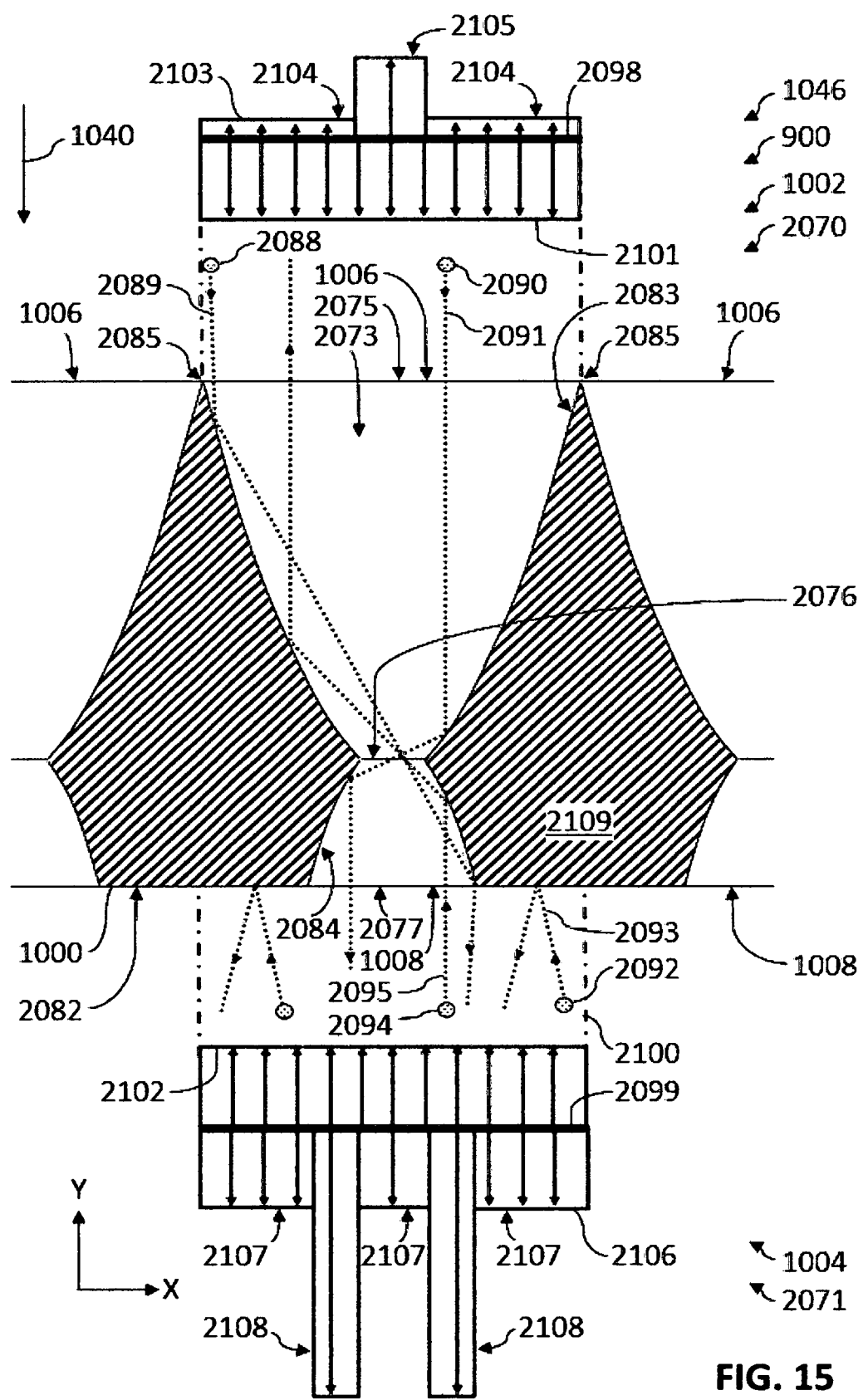
FIG. 15 is a cross-sectional view of one embodiment of the invention and a schematic representation of the interaction of said embodiment with objects of interest.

FIG. 15 is a cross-sectional view of one embodiment of the invention and a schematic representation of the interaction of said embodiment with objects of interest.

In this embodiment the initial direction of OI is substantially parallel to the Y-axis, i.e. directed substantially in the +90 and -90 degree directions relative to the XZ-plane, as described in the context of FIG. 13.

The filtering apparatus 900 comprises several circular channels, such as channel 2073. As discussed in the context of the other filtering apparatuses, the channels can also be hexagonal or rectangular in cross-section when viewed along the Y-direction, for example. Each channel comprises a first reflective surface 2083 and a second reflective surface 2084. The first reflective surface 2083 of bulk material 2109 is concave, resulting in a convex shape of channel 2073. The cross-sectional diameter of channel 2073 for the first reflective surface 2083 decreases at an increasing rate in the negative Y-direction. The second reflective surface 2084 is configured in a similar, concave fashion. The cross-sectional diameter of channel 2073 for the second reflective surface 2084 increases at a decreasing rate in the negative Y-direction. The interface between the first reflective surface 2083 and the second reflective surface 2084 is formed by a central channel opening 2076. The first reflective surface is configured to direct OI moving from the first reservoir 2070 into the channel 2073 via the first opening 2075 through the central opening 2076 to a corresponding point on the second reflective surface. A nominal trajectory is a trajectory which is parallel to the Y-axis in this example. The second reflective surface and the first reflective surface are configured to reflect nominal trajectories in a manner in which their direction after passing through the channel is also parallel to the Y-axis in this particular embodiment and this particular application and these particular properties of the objects of interest. The extent of the second reflective surface 2084 along the X- and Y-direction is smaller than the extent of the first reflective surface 2083 along the X- and Y-direction, such that nominal trajectories of OI moving from the first reservoir 2070 to the second reservoir 2071 are focused. In other words, the distance of separation between nominal trajectories distributed uniformly in the XZ-plane and which interact with both the first and second reflective surfaces is smaller in the second reservoir 2071 than in the first reservoir 2070. This is exemplified by trajectory 2095 of OI 2094 and trajectory 2089 of OI 2088. Trajectory 2091 of OI 2090 is also shown.

A second outside surface 2082 reflects OI from the second reservoir 2071 which are not incident on the second opening 2077 of channel 2073. This is exemplified by trajectory 2093 of OI 2092. A first outside surface 2085 forms a sharp edge in this cross-sectional view.

Note that the second reflective surface 2084 of bulk material 2109 can be convex in embodiments in which adjacent nominal trajectories of OI moving through channel 2073 do not intersect between collisions with the first and second reflective surfaces.

The limitations on the characteristic length and width of a channel, as well as the configuration of the bulk material 2109, as well as other considerations are unchanged relative to the embodiment shown in FIG. 5 and other embodiments discussed herein. The characteristic length is the extent of channel 2073 along the Y-axis, i.e. the distance between first opening 2075 and second opening 2077, which should be less than 1000 the smallest mean free path of OI within an adjacent reservoir. The smallest width of channel 2073 is the maximum extent of central opening 2076 along the X-direction and should be larger than the diameter of an OI in order to allow OI to pass through the channel. The largest width of channel 2073 is the maximum extent of first opening 2075 along the X-direction, and should be less than 1000 the smallest mean free path of OI in the first reservoir 2070 to avoid excessive scattering events of OI along the path through the channel 2073.

An apparatus unit can be considered to be the portion of the filtering apparatus which encloses a channel. This portion is indicated by boundary line 2100. The influx of OI from the first reservoir is substantially parallel to the Y-axis, as mentioned, and substantially uniformly distributed in the XZ-plane in this embodiment, as indicated by influx 2101 measured relative to reference line 2098 and influx 2102 measured relative to reference line 2099 for the depicted boundary condition. For simplicity nominal trajectories are assumed in the description of the flux. OI which are incident on the central channel opening 2076 pass through the channel 2073 without colliding with the first or second surfaces. Thus the outflux 2103 and 2106 is equal to the influx 2102 and 2101 at the corresponding locations, as indicated by outflux portions 2105 and 2107, respectively. Due to the reflection by outside surface 2082, the outflux 2106 at the corresponding reflection locations is equal and opposite to influx 2102. This is indicated by regions 2107 in FIG. 15. Influx 2102 incident on the second reflective surface 2084 is transmitted to the first reservoir 2070 and defocused, as indicated by regions 2104 of outflux 2103. Influx 2101 incident on the first reflective surface 2083 is transmitted to the second reservoir 2071 and focused, as indicated by regions 2108 of outflux 2106.

The first transmissivity and the second transmissivity are equal to unity in this scenario. The first capture area is larger than the second capture area. For the dynamic boundary condition shown, this results in a net diffusion or a bulk flow of OI from the first reservoir 2070 to the second reservoir 2071. This net flow is illustrated by the difference in the influx 2101 and the outflux 2103 integrated over the entire footprint area or, in this case, the entire first capture area, which is equal to the area of first opening 2075. The net flow is also equal to the integrated difference in the outflux 2106 and influx 2102. The second capture area is equal to the surface area of second opening 2077.

Figure 16:
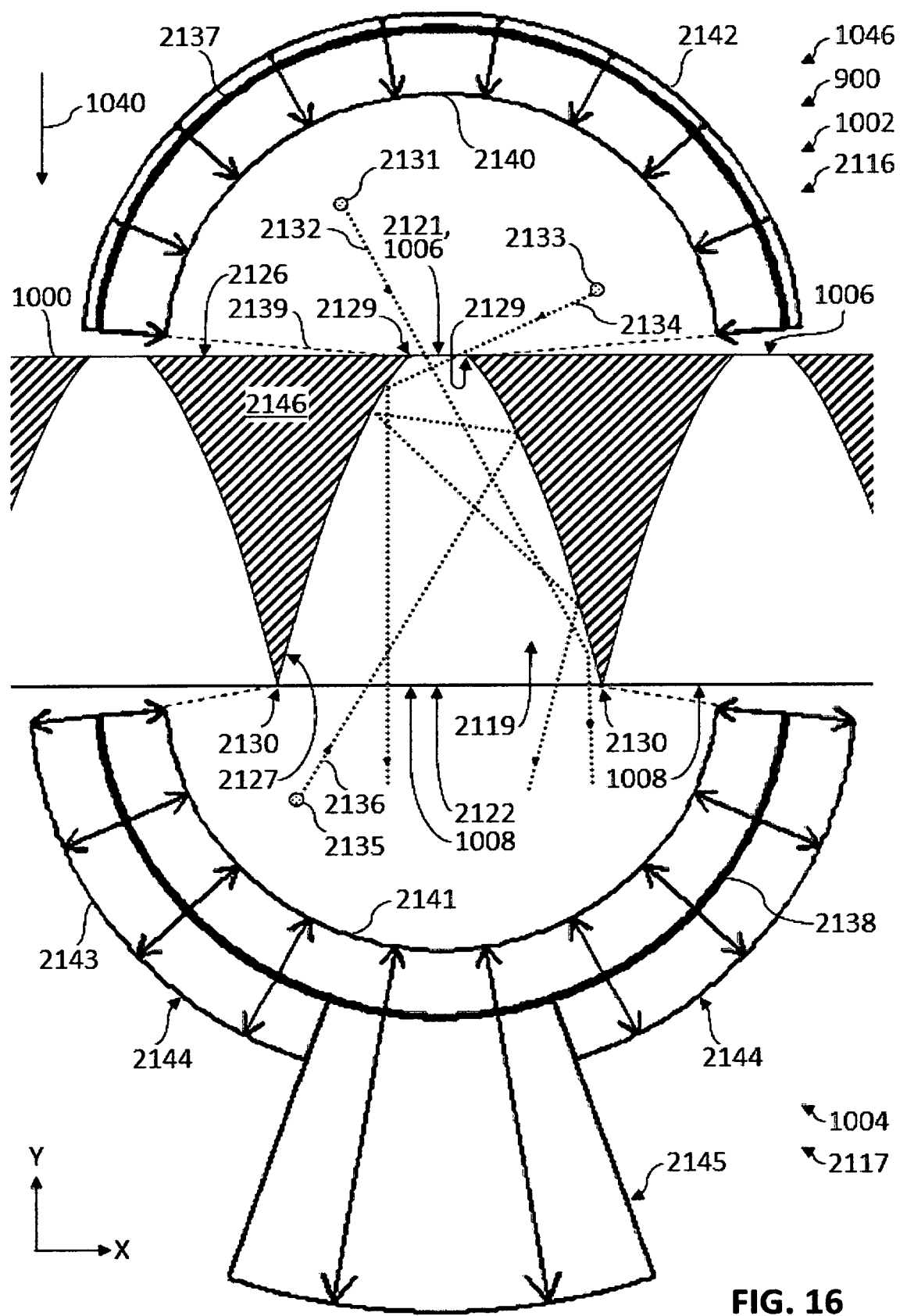
FIG. 16 is a cross-sectional view of one embodiment of the invention and a schematic representation of the interaction of said embodiment with objects of interest.

FIG. 16 is a cross-sectional view of one embodiment of the invention and a schematic representation of the interaction of said embodiment with objects of interest.

The embodiment shown in FIG. 16 can be considered to be identical to the embodiment shown in FIG. 14, with the exception that the linear cross-section of interior surface 2047 of bulk material 2065 in FIG. 14 is concave in FIG. 16. In other words, the cross-sectional diameter of channel 2119 in the Y-direction increases at a decreasing rate in the negative Y-direction, as indicated by surface 2127.

The concave surface of interior surface 2127 can increase the focusing effect discussed in the context of FIG. 14, and decrease the angle of concentrated beam 2145. The second transmissivity is reduced further, and the focusing, guiding, or re-directing effect on the OI diffusing from the first reservoir 2116 to the second reservoir 2117 is enhanced compared to the embodiment shown in FIG. 14. The first transmissivity is approximately unchanged compared to the embodiment shown in FIG. 14. Correspondingly, the net flow rate of OI from the first reservoir 2116 to the second reservoir 2117 for a dynamic boundary condition can be increased compared to the geometry shown in FIG. 14.

Channel 2119 is circular in shape when viewed along the Y-direction. In other embodiments, the cross-section can be polygonal or hexagonal, for example.

The limitations on the characteristic length and width of a channel, as well as the configuration of the bulk material 2146, as well as other considerations are unchanged relative to the embodiment shown in FIG. 5 and other embodiments discussed herein. The characteristic length is the extent of channel 2119 along the Y-axis, i.e. the distance between first opening 2121 and second opening 2122, which should be less than 1000 the smallest mean free path of OI within an adjacent reservoir. The smallest width of channel 2119 is the maximum extent of first opening 2121 along the X-direction, i.e. the maximum distance between edges 2129, and should be larger than the diameter of an OI in order to allow OI to pass through the channel. The largest width of channel 2119 is the maximum extent of second opening 2122 along the X-direction, i.e. the maximum distance between edges 2130, and should be less than 1000 the smallest mean free path of OI in the second reservoir 2117 to avoid excessive scattering events of OI along the path through the channel 2119.

The influx 2140 from the first reservoir 2116 and the influx 2141 from the second reservoir 2117 are measured relative to reference line 2137 and 2138, respectively. The outflux 2142 into the first reservoir 2116 is smaller than the influx 2140 due to the small second transmissivity. Note that the first outside surface 2126 contributes to the outflux 2142, although this contribution is not shown. The ratio of the first transmissivity to the second transmissivity multiplied with the ratio of the first capture area and the second capture area is greater than unity in this example. Note that the influx of OI from the first reservoir 2116 into channel 2119 can enter channel 2119 from a large number of directions. In three-dimensional space, the range of directions of initial velocities of OI in the first reservoir entering channel 2119 is approximately the range of directions of a hemispherical surface, i.e. half of all possible directions. The range of directions of initial velocities of OI in the second reservoir entering channel 2119 and being transmitted into the first reservoir 2116 via diffusion is approximately equal to the range of angles of concentrated beam 2145. The ratio of first capture area to the second capture area is a ratio of planar surfaces, while the ratio of the range of angles, and by extension the ratio of the first and second transmissivities, is a ratio of two three-dimensional, hemispherical surface. While a simplified, this description can give an insight into why the ratio of the first and second transmissivities can dominate for some embodiments.

The outflux into the first reservoir 2143 is equal to the influx 2141 for the region of angles which are not within the range of the concentrated beam 2145, as indicated by region 2144, due to the reflection of all the influx 2141 within this region. The integrated outflux in the elevated flux region 2145 is equal to the integrated influx over hemispherical region 2140. The magnitude of the outflux 2143 in region 2145 s not drawn to scale compared to outflux in region 2144. This also applies to FIG. 14.

Example trajectories are provided for illustrative purposes. Example trajectory 2136 of OI 2135 shows a reflection back into second reservoir 2117. Trajectory 2132 of OI 2131 and trajectory 2134 of OI 2133 show a transmission from the first reservoir 2116 to the second reservoir 2117.

Figure 17:
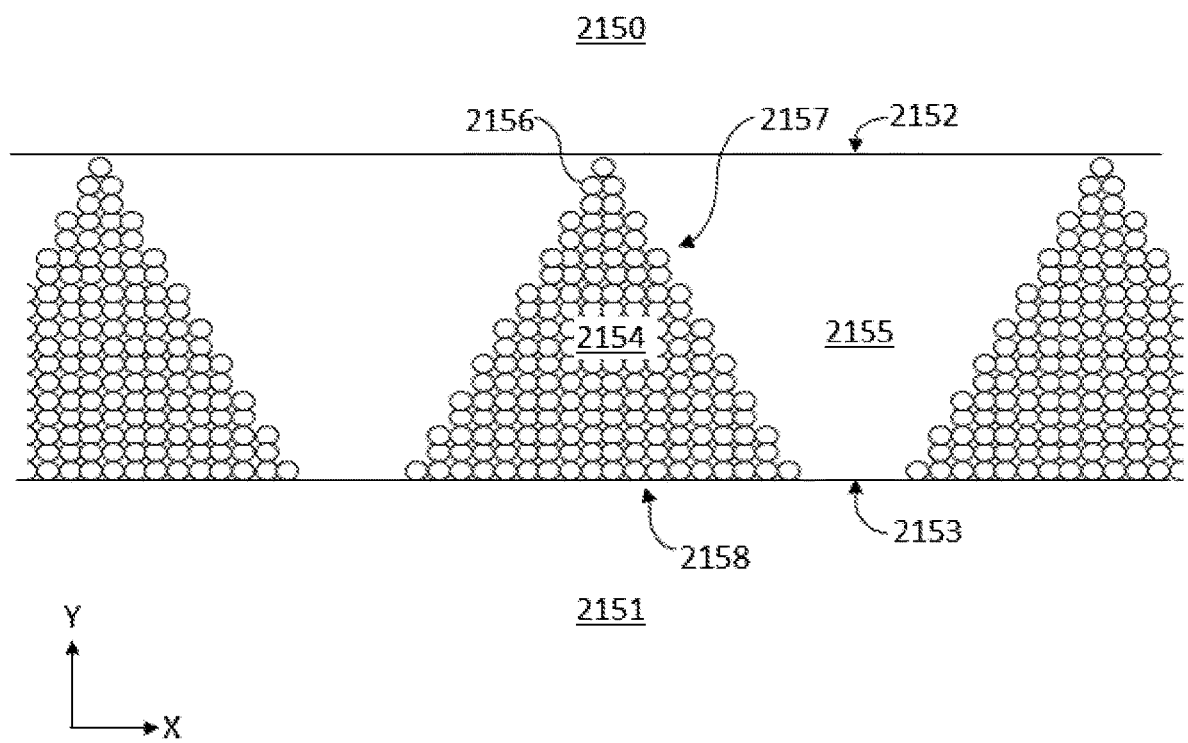
FIG. 17 is a cross-sectional view of one embodiment of the invention.

FIG. 17 is a cross-sectional view of one embodiment of the invention. It shows a first reservoir 2150 and a second reservoir 2151. The bulk material 2154 of the filtering apparatus comprises several atoms, such as atom 2156, arranged in a desired geometry. An atom may be part of a lattice which forms the bulk material.

The geometry in this embodiment is similar to the geometry shown in FIG. 5. In other embodiments, the geometry can be configured and/or operated in a similar manner as the geometry shown in FIG. 13, 14, 15, or 16, for example. Depending on the application, therefore, the designation of the first reservoir 2150 and the second reservoir 2151 can be reversed for convenience, as demonstrated in the context of FIGS. 13 and 14. The atoms are arranged to form circular channels, such as channel 2155, each channel having a first opening, such as first opening 2152, and a second opening, such as second opening 2153. A planar second surface 2158 and a conical inside surface 2157 form the outside surfaces of the filtering apparatus, which are configured to reflect objects of interest, where the coefficient of reflectivity is greater than zero.

The atoms can be metal atoms, such as atoms of Aluminum, Titanium, or Iron, for example. The atoms can also be atoms of carbon in another example. The atoms can also be electrical insulators such as glass or ceramics for embodiments in which the objects of interest are electrons, for instance.

The channels are circular in shape when viewed along the Y-direction. Details pertaining to size constraints and method of manufacture have been discussed in the context of the other figures.

Figure 18:
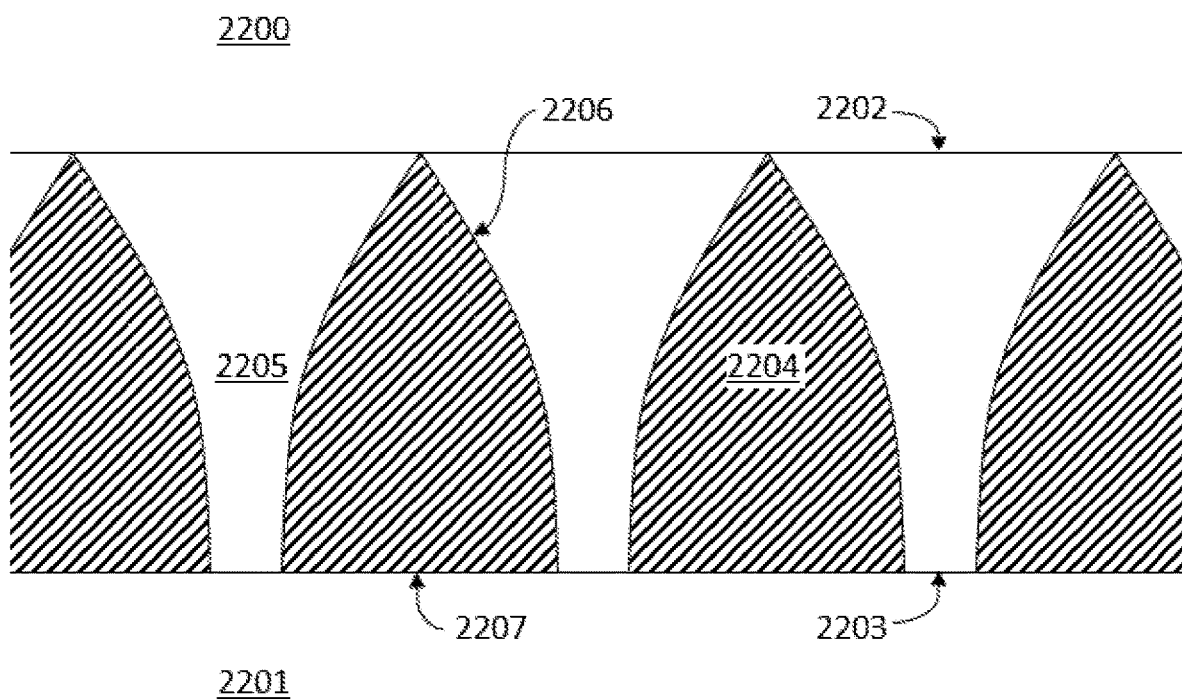
FIG. 18 is a cross-sectional view of one embodiment of the invention.
Figure 18:
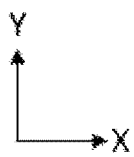

FIG. 18 is a cross-sectional view of one embodiment of the invention.

Embodiments for which the cross-sectional diameter of a channel, such as channel 2205 increases at an increasing rate or decreases at a decreasing rate along the length of a channel are also within the scope of the invention. In the depicted embodiment, the diameter of channel 2205 decreases at a decreasing rate in the negative Y-direction.

In FIG. 18, there is a first reservoir 2200, a second reservoir 2201, and a series of channels, such as channel 2205 separated by bulk material 2204. Each channel has a circular cross-section when viewed along the Y-direction. In other embodiments, the cross-section can be hexagonal, for example. Each channel has a first opening, such as first opening 2202, and a second opening, such as second opening 2203, and an interior surface, such as interior surface 2206.

Depending on the properties of the surrounding medium, where the properties can refer to the distribution of incident angles in the first reservoir and the second reservoir, for example, there can be a net diffusion of OI from the first reservoir 2200 to the second reservoir 2201, or from the second reservoir 2201 to the first reservoir 2200, for a dynamic boundary condition.

Figure 19:
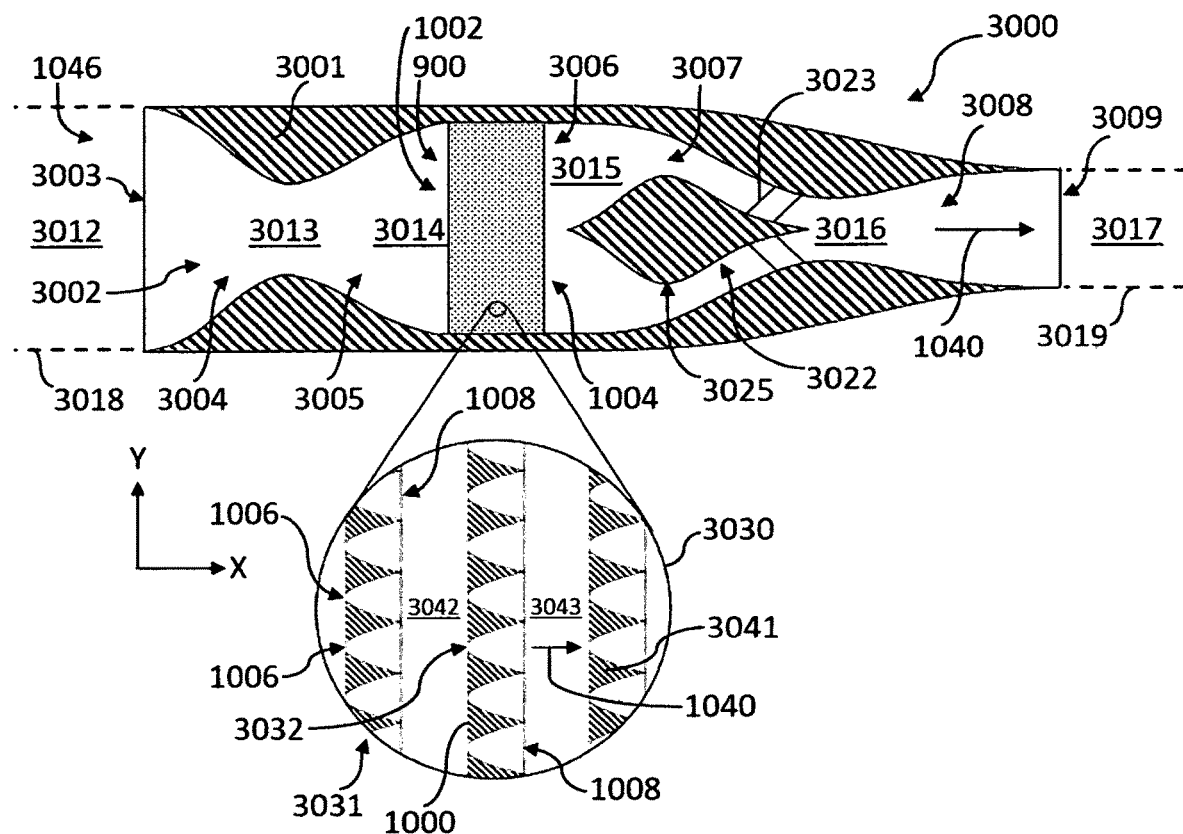
FIG. 19 is a cross-sectional view of an application of an embodiment of the invention in a supersonic ramjet engine.

FIG. 19 is a cross-sectional view of an application of an embodiment of the invention in a supersonic ramjet engine.

Engine 3000 can be employed to produce thrust by interacting with gas molecules, such as air molecules, for example. Engine 3000 comprises a first inlet 3003, a first contraction 3004, a first expansion 3005, a filtering apparatus 3006, also referred to as a filtering apparatus 900, a second contraction 3007, a second expansion 3008 and an exit 3009. During nominal, supersonic flight, an inflow streamtube 3018 and an outflow streamtube 3019 is incident on or emitted by stagnation points of the leading edge 3010 and trailing edge 3011, respectively.

Engine 3000 comprises a channel 3002 bounded by bulk material 3001 and located between inlet 3003 and outlet 3009. Engine 3000 can be configured to operate in air, for example. The exterior surface 3020 and the interior surface 3021 of the engine describe axially symmetric and concentric surfaces in this simplified embodiment, with the axis of symmetry being parallel to the X-axis, and being referred to as the "central axis".

A translating spike 3022 with external surface 3025 is configured to regulate the flow rate through the engine 3000 and thus regulate the amount of thrust produced. The translating spike 3022 can be moved by hydraulic or electric actuators along the central axis to increase or reduce the cross-sectional area of the channel 3002 from an open position to a closed position in a continuously variable fashion. Support struts, such as support strut 3023 provide structural support to the translating spike. The flow direction during nominal operation is indicated by arrow 1040.

Filtering apparatus 3006 is configured in accordance with the invention. For example, filtering apparatus 3006 can comprise several layers of filtering apparatuses, such as layer 3031, arranged in series, where each filtering apparatus in a layer is arranged in a similar manner as the filtering apparatus shown in FIG. 16. Accordingly, the pressure of the medium comprising the objects of interest, e.g. the air, is increased across the filtering apparatus, such that the pressure at station 3042 is larger than the pressure at station 3014, and the pressure at station 3043 is larger than at station 3042, and the pressure at station 3015 is larger than the pressure at station 3043. There is a net diffusion of OI, e.g. air molecules, through the filtering apparatus 3006 in the direction shown by arrow 1040. Each channel system in a filter apparatus comprises a first opening, such as a first opening 3032, and a bulk material, such as bulk material 3041, as shown by enlargement 3030.

Engine 3000 can be considered to operate in a similar fashion as a conventional ramjet in other aspects. Between the free stream station 3012 and the throat 3013 supersonic flow is decelerated and the air is compressed preferably isentropically, i.e. without the production of shock waves. Between throat 3013 and station 3014 the flow is compressed and decelerated further to subsonic flow speeds. This compression between station 3012 and 3014 in an ideal ramjet is adiabatic, but in practical implementations there can be a weak shock wave stabilized between throat 3013 and station 3014, preferably close to throat 3013 to reduce losses. The flow velocity at station 3014 is reduced in order to reduce the drag associated with the filtering apparatus 3006.

The filtering apparatus is configured to increase the pressure of the gas. Due to the collisions of the OI with the downstream surface of the filtering apparatus, there is a cooling effect of the medium containing the OI as momentum of the OI is transferred to the filtering apparatus.

Following the increase in pressure at station 3015, the gas is expanded, preferably adiabatically, through a convergent and divergent nozzle. In this expansion the temperature of the gas is reduced further, such that the temperature at station 3017 is less than the temperature at station 3012, while the pressures at both stations are atmospheric pressures.

In other embodiments, the individual layers in a filtering apparatus can be configured in a similar manner as the filtering apparatus shown in FIG. 15. In such embodiments, the flow velocity at station 3014 can be larger, such that the initial direction of the OI which interact with the filtering apparatus is biased more strongly towards the preferred +90 direction of this embodiment, as previously mentioned. In some embodiments, a filtering apparatus can comprise several periodic arrangements of layers of filtering apparatuses. For example, an arrangement can comprise 4 layers, with a first layer upstream of the other three layers being configured in a similar manner as filtering apparatus shown in FIG. 16. This layer can be configured to redirect or bias the initial direction of OI which interact with the subsequent layers towards the preferred +90 degree direction of these layers. The three consecutive layers of filtering apparatuses can be configured in a similar manner as the filtering apparatus shown in FIG. 15. The number of these layers is limited by the amount of distance across which the bias in the directivity can be maintained. Due to scattering events, the performance of these layers decreases across several layers arranged in series. A periodic arrangement of a bias layer configured in a similar manner as the apparatus shown in FIG. 16 or FIG. 14 and downstream focusing layers configured in a similar manner as the filtering apparatus shown in FIG. 15 or FIG. 13 can reduce periodically bias and focus the trajectories of objects of interest. This can reduce the drag and improve the effectiveness of a filtering apparatus.

In some embodiments, the characteristic length of each layer of filtering apparatuses can be reduced in a downstream direction throughout a combined filtering apparatus in correspondence with a reduction in the mean free path associated with an increase in density and pressure across a filtering apparatus. Alternatively the flow velocity can be increased and the density of the medium can be decreased in order to keep the length of the mean free path above a size constraint provided by the configuration or manufacturability of the filtering apparatus.

Figure 20:
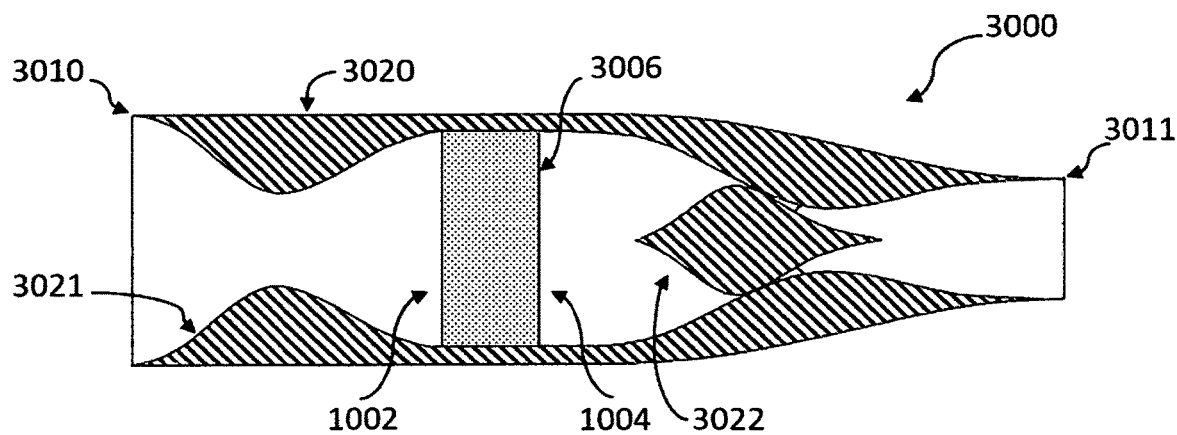
FIG. 20 is a cross-sectional view of the embodiment shown in FIG. 19 in a closed or zero-thrust configuration.

FIG. 20 is a cross-sectional view of the embodiment shown in FIG. 19 in a closed or zero-thrust configuration. In this configuration the translating spike 3022 is in a fully retracted position, resulting in a closing off of the channel 3002 and the production of zero thrust. The filtering apparatus 3006 can be considered to operate at a static boundary condition in this configuration, with a larger pressure being produced in the second reservoir 1004 than in the first reservoir 1002.

In some embodiments of the invention, the objects of interest are virtual particles, as described by quantum field theory. One can consider the quantum vacuum to be a medium comprising virtual objects, where a virtual object denotes a fluctuation in the quantum vacuum which temporarily exhibits some or all of the properties of a corresponding conventional or real object. Examples of virtual objects are virtual photons, or virtual particle-antiparticle pairs such as electrons and positrons. The quantum vacuum can instantaneously exhibit any of the properties of a particle or wave, such as mass or momentum. In the context of embodiments of the invention, no distinction is made between conventional objects, such as photons, and virtual objects, such as virtual photons. For simplicity, the term "vacuum" is used to refer to the quantum vacuum described by quantum field theory. These virtual particles give rise to the zero point energy and associated effects, such as the Casimir effect.

Embodiments of the invention which interact with the quantum vacuum can be configured as follows. The characteristic size of a filtering apparatus, the characteristic length and the characteristic width of a channel, are configured to be less than the length of 1000 mean free paths of virtual particles. In other words, the characteristic size of a filtering apparatus is configured in a manner in which the Casimir forces between components of the invention, e.g. between opposing walls of a channel, are non-negligible. In other words, the characteristic size of a filtering apparatus is configured in a manner in which the zero point energy between components of the invention, e.g. between opposing walls of a channel, is changed from the undisturbed, vacuum level of the zero point energy by a non-negligible amount.

The vacuum can be considered to consist of virtual particles, such as virtual photons, which travel a certain distance or exist of a period of time before annihilating with another virtual particle. An annihilation event can be considered to be a scattering event of an OI, as discussed herein. The average path travelled by a virtual particle, such as a virtual photon, between annihilation or extinction events can be considered to be the mean free path of a virtual particle, as discussed herein. The mean free path of virtual particles is within several orders of magnitude of one nanometer. For example, the Casimir pressure between two opposing, perfectly conducting plates is approximately equal to one atmosphere at separations of approximately 10 nanometers.

The geometry of a filtering apparatus which interacts with the quantum vacuum can be any suitable geometry discussed herein. For example, a filtering apparatus can be configured in a manner described in the context of FIG. 16 and FIG. 17. Embodiments of the invention which interact with the quantum vacuum can also be configured in a manner described in the context of FIG. 4 and FIG. 5. Note that the distribution of initial directions of virtual particles for a static boundary condition is uniform over all angles, as described in the context of FIG. 14 and FIG. 16. In the following paragraphs, for convenience and clarity of description, the example embodiment which will be discussed is an embodiment configured in a similar manner as the embodiment in FIG. 16.

All surfaces of bulk material of the filtering apparatus, such as bulk material 2146 or bulk material 2154, are perfectly conductive in this embodiment. In other embodiments, this need not be the case. Bulk material 2146 may be a superconducting material, or a conventionally conducting material such as metal, a semiconductor such as silicon, or an insulator such as glass. In other embodiments, the surface of bulk material may also be coated in a different material with intended properties. If the minimization of an objective favors a high electrical conductivity, coating materials such as copper, silver, or graphene may be used. The bulk material is neutrally charged in this simplified embodiment. In the case in which the bulk material 2146 is a metal, a metal with a large plasmon frequency, such as Aluminium, can be used. This ensures that the range of frequencies over which the reflectivity of the bulk material is greater than zero is maximized, which ensures that the filtering apparatus can interact with a wide range of frequencies of virtual particles such as virtual photons, such that the thrust or axial pressure is maximized.

For a dynamic boundary condition, virtual objects can interact with the filtering apparatus in a manner in which there is a net diffusion of virtual objects in the negative Y-direction for the embodiment shown in FIG. 16. This can result in a net force on the filtering apparatus in the positive Y-direction. The value of this force per unit area in the XZ-plane is denoted the axial pressure. For example, when the virtual particles are virtual photons, the origin of this axial pressure is the radiation pressure of virtual photons which are redirected or focused by the filtering apparatus within the mean free path of these virtual photons, as exemplified by trajectory 2053 and trajectory 2055 in FIG. 16. The radiation pressure of virtual objects acting on the surfaces of the filtering apparatus, such as surface 2126 and surface 2127 can give rise to a net force or a net axial pressure along the Y-direction. The value of the zero point energy can be considered to be larger in channel 2119 compared to the baseline, undisturbed vacuum, resulting in a pressure on the interior surface 2127 which is larger than the pressure due to a lower, baseline, undisturbed vacuum level of the zero point energy on surface 2126. The zero-point energy can be considered to be the energy associated with virtual objects. The size and shape of a channel, as well as other parameters, such as the conductivity of the bulk material, affect the magnitude of this axial pressure.

As discussed in the context of FIG. 14, as well as FIG. 13, the direction of the axial pressure can also be in the negative Y-direction and the zero point energy can be reduced within a channel for embodiments or applications in which the initial directions of the virtual particles are biased towards the +90 and −90 degree directions, as discussed previously.

When all portions of the finite surface are subjected to an unmodified vacuum, an embodiment of the invention may be configured to produce a net axial pressure. In other embodiments, other portions of the surface of a finite volume need not be subjected to an unmodified vacuum as defined by the vacuum of the default boundary condition. In general, the bulk material may be configured in a manner in which the zero-point energy of the medium in the proximity of one incremental surface element of the bulk material is not equal to the zero-point energy of the medium in the proximity of another incremental surface element of the bulk material. Such differences in zero-point energy may result in differences in the stress on said surfaces. In accordance with the invention, when integrated over the entire surface of the bulk material, such differences in stress may give rise to a net force on the volume of the bulk material enclosed by said surfaces.

The magnitude and direction of the axial pressure for a particular geometry and size of an apparatus unit can be calculated using methods known in the art. For example, such methods have been developed for calculating the Casimir interaction between two bodies of arbitrary geometry. These algorithms can be adapted to the types of geometries provided in or within the scope of the invention. The appropriate geometry and size of an embodiment for a particular application can be found using standard optimization techniques.

There are a wide variety of applications of such an apparatus. For example, the axial pressure may be used to do mechanical work, which may be converted into electrical energy by an electric generator. Embodiments of the invention can also be considered for applications involving the pumping of zero-point energy. Consider a scenario in which the depicted apparatus forms an interface between two otherwise isolated reservoirs. In such cases, embodiments of the invention can be employed to decrease the zero-point energy in a first reservoir and increase it correspondingly in a second reservoir. The first and second reservoirs are assumed to be finite in size, and are assumed to initially be at the default boundary condition, i.e. the zero-point energy in the first and second reservoirs is initially substantially equal to the zero-point energy of free space. Over time, the embodiment of the invention will reduce the zero-point energy in the first reservoir, and increase the zero-point energy in the second reservoir correspondingly. Eventually, a new steady-state configuration is reached, in which the zero-point energy in any reservoir is approximately constant in time.

Filtering apparatuses configured to interact with the quantum vacuum have a wide variety of applications. For example, such filtering apparatuses can be configured to produce thrust by interacting with and inducing a bulk flow of virtual particles. For instance, such embodiments can be configured in a similar manner as the embodiment shown in FIG. 19 and FIG. 20, where the medium 1046 is a vacuum as opposed to a gas. Accordingly, such an engine can be configured to produce thrust in the vacuum of space. Embodiments of the invention can therefore be used to power or propel spacecraft or rockets. In such applications, the filtering apparatus can be mounted in place of conventional, chemical rockets on the spacecraft or rockets, for example. As discussed in the context of FIG. 19, a translating spike, such as translating spike 3022, can be used to regulate the flow rate of the virtual particles through the engine. The bulk material 3001 can be configured in a similar manner as the bulk material of the filtering apparatus which interacts with the virtual particles, as discussed. In other embodiments, a different type of valve or flow regulator can be employed to regulate the flow rate or the rate of diffusion of virtual particles or gas molecules through channel 3002. For example, the outlet 3009 can comprise a moveable nozzle which can constrict the cross-sectional area when viewed along the central axis.

A filtering apparatus which interacts with the quantum vacuum or any other type of medium can also be mounted on a rotating shaft of an electric generator, and apply a torque on the shaft. Thus a filtering apparatus can be employed to turn the shaft and apply power to the electric generator, which can convert the power into electricity. In such configurations, the filtering apparatus can perform the same function and be arranged similarly as a turbine blade on a wind turbine. The normal or the Y-axis of the filtering apparatus can be configured perpendicularly to the local flow of OI relative to the filtering apparatus. Note that the filtering apparatus can produce thrust or deliver power to the electric generator even when there is no net bulk flow or no wind.

A filtering apparatus which interacts with the quantum vacuum can also be enclosed in a protective casing. For example, this casing can close off inlet 3003 and outlet 3009. The casing is configured to be transparent to virtual particles to a greater extent than bulk material 3001, such that virtual particles can still move through the protective casing. The casing can be configured to prevent or reduce contamination or blockage of individual channels of a filtering apparatus by other objects, such as air molecules, dust particles, or aerosols. The casing material can be any material with the aforementioned properties. For example, the casing material can be fiberglass or any other material with a high transmissivity for electromagnetic radiation. The casing material can also be a metal, provided the transmissivity of virtual particles through the metal of the casing is larger than the transmissivity of the virtual particles through the bulk material of the filtering apparatus, such as bulk material 3041.

Figure 21:
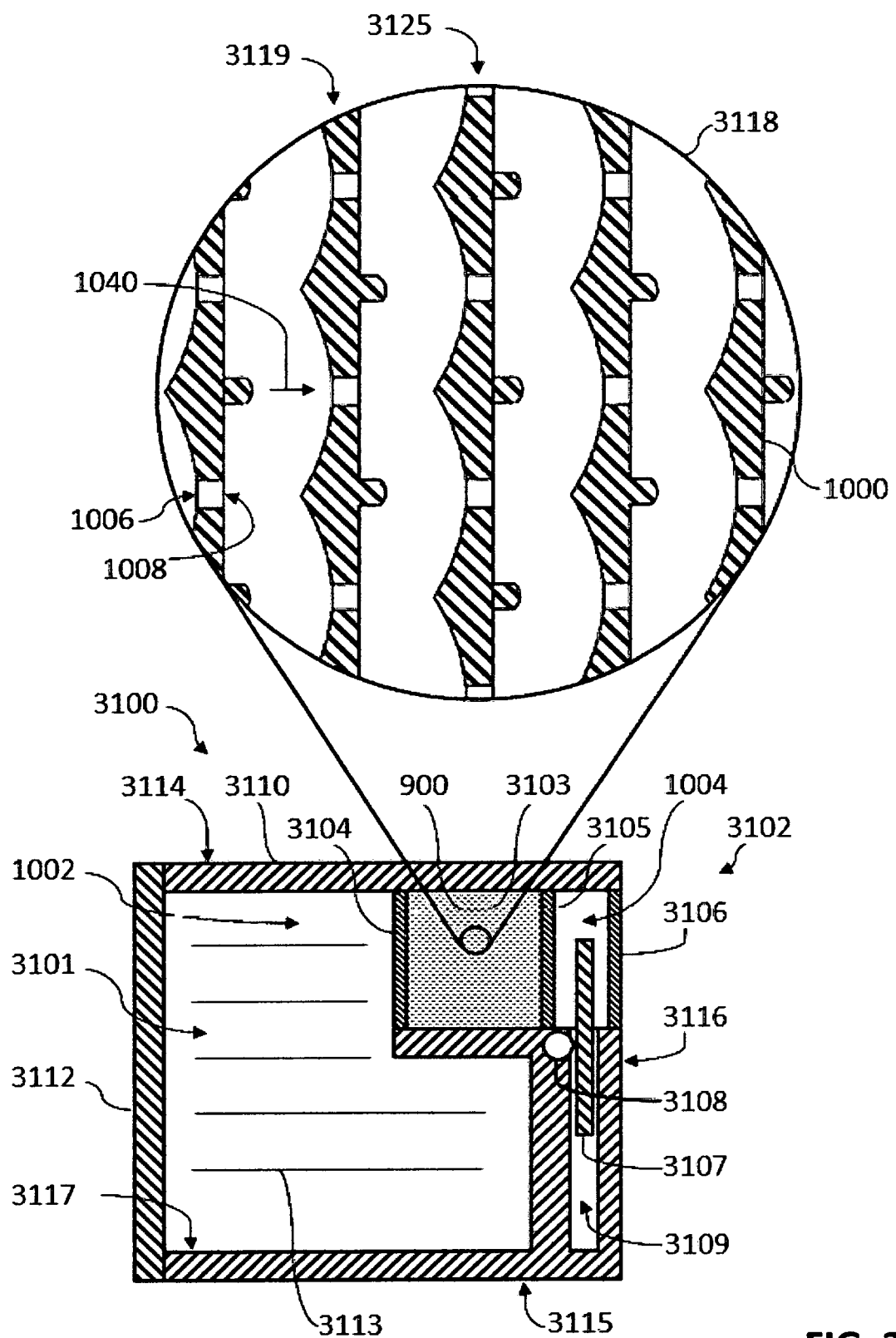
FIG. 21 is a cross-sectional view of an application of an embodiment of the invention in a refrigerator.

FIG. 21 is a cross-sectional view of an application of an embodiment of the invention in a refrigerator.

There is a first reservoir 3101 formed by the refrigeration chamber containing the items to be cooled. There is a second reservoir 3102 formed by the environment in which the refrigerator is located, such as the room or the atmosphere.

A filtering apparatus 3103 is configured to transfer thermal radiation from the first reservoir 3101 into the second reservoir 3102. Metal plates 3104 and 3105 with a high coefficient of thermal conductivity, such as copper or silver, are located on the inlet and outlet side of the filtering apparatus in order to protect the filtering apparatus from contamination by other particles and in order to mitigate photon scattering events with other objects, such as gas molecules, located within the channels and gaps of the filtering apparatus. In some embodiments, the layers of the filtering apparatus are located in a vacuum or a low pressure gas in order to prevent such scattering events. A third metal plate 3106 forms the interface between the filtering apparatus and the outside reservoir. An insulating, sliding door 3107 can be extended and retracted out of and into a slot 3109 by a motor or actuator 3108 a vertical direction in order to regulate the rate of heat flow from the first reservoir 3101 into the second reservoir 3102. The sliding door 3107 has a poor thermal conductivity and a highly reflective surface facing metal plate 3105, such that at portion of the thermal radiation emitted by the first reservoir to plate 3104, and focused by the filtering apparatus 3103 or 900 onto plate 3105 and emitted by plate 3105 is reflected back towards plate 3105 and returned to the first reservoir 3104. The filtering apparatus is configured in a similar fashion as the filtering apparatus in FIG. 7, i.e. it comprises several layers, such as layer 3119 and layer 3125, of filtering apparatuses configured in similar manner as the filtering apparatus in FIG. 3, as shown by enlargement 3118. The net direction of heat flow, or of photon flow, is indicated by arrow 1040.

The refrigerator has an interior surface 3117, a top surface 3114, a rear surface 3116, and a bottom surface 3115. The bulk material 3110 is thermally insulating. A door 3112 allows access to the refrigerating chamber 3101. Slots, such as slot 3113, allow shelves to be placed in the refrigeration chamber, as is common of embodiments in the prior art.

A filtering apparatus configured in a similar manner as the filtering apparatus 3103 in FIG. 21 can also be employed in air conditioning apparatus for heating or cooling a reservoir, such as a room. In the cooling application, first reservoir 3101 can be a room to be cooled and second reservoir 3102 can be the atmosphere or the outside environment. In a heating application the filtering apparatus is reversed, such that the second reservoir 3102 is a room to be heated and the first reservoir 3101 is the atmosphere or the outside environment.

Figure 22:
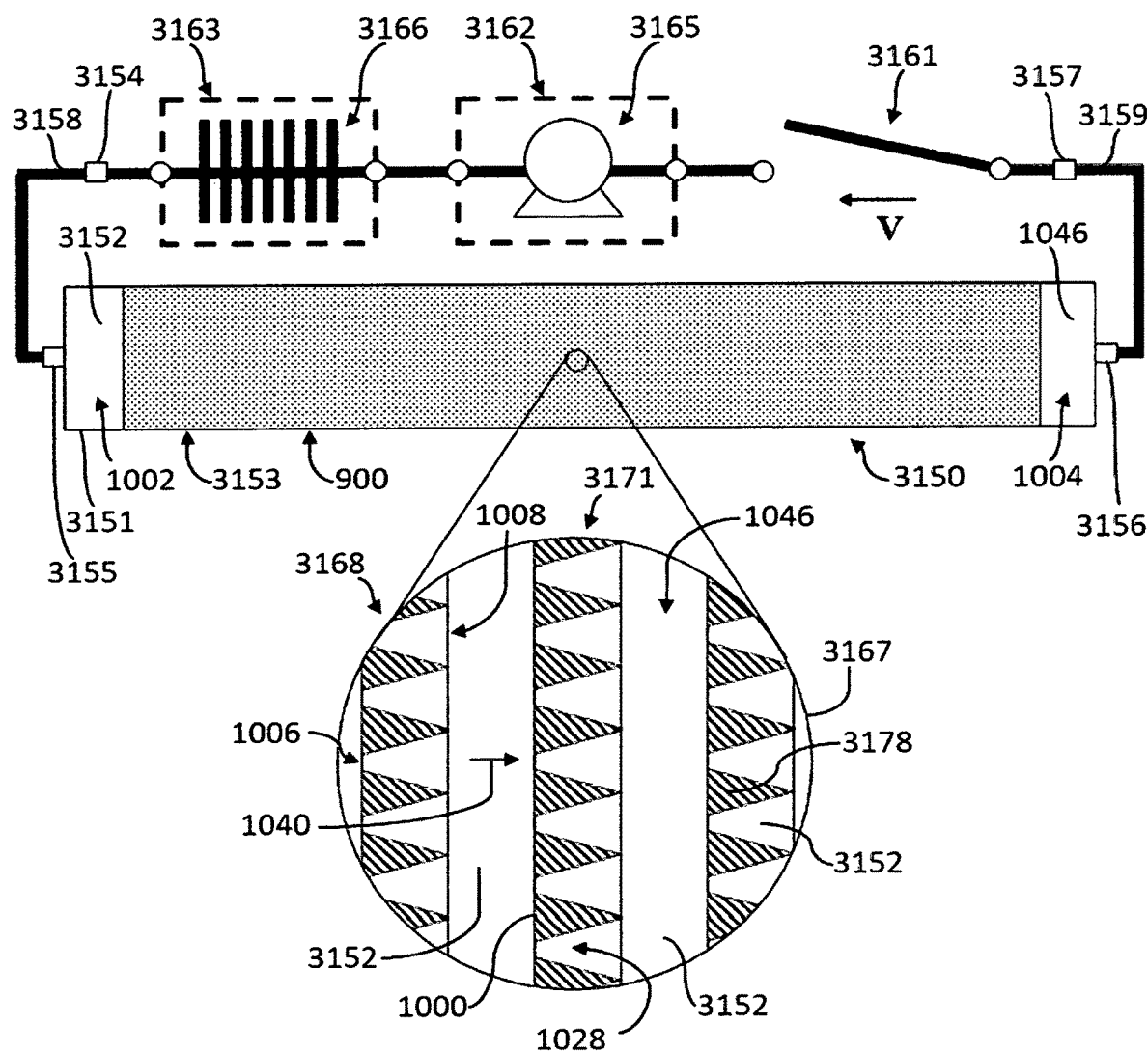
FIG. 22 is a cross-sectional view of an application of an embodiment of the invention in an electrical current source.

FIG. 22 is a cross-sectional view of an application of an embodiment of the invention in an electrical current source.

A filtering apparatus 3153 is embedded within a conductor 3151 and configured to interact with electrons as objects of interest. The bulk material 3178 of the filtering apparatus can be a material with a lower electrical conductivity compared to bulk material 3152 of the conductor 3151, i.e. the medium in which the electrons are moving primarily. As shown by enlargement 3167, the filtering apparatus comprises several layers of filtering apparatuses arranged in series, such as layer 3171 or layer 3168, where each layer comprises a filtering apparatus configured in a similar manner as the filtering apparatus shown in FIG. 14. The direction of bulk flow of electrons is indicated by arrow 1040 for a dynamic boundary condition.

The filtering apparatus 3150 can be considered to be a current source, and electrical contacts 3154 and 3157 can be considered to form the terminals of the current source. The energy for the current source is provided by the thermal energy of the electrons and any material in thermal contact with the electrons, such as bulk material 3152 of conductor 3151. The electrical contacts are connected to the conductor by electrical conductors, such as electrical conductors 3158, 3159, and contacts 3155 and 3156.

In the particular application shown, there is a switch 3161 which can also be used to regulate the current flow of the current source using pulse width modulation, for example.

In some embodiments the switch 3161 comprises transistors or other electronic devices suitable for modulating or regulating current or voltage.

In a static boundary condition, such as when the switch 3161 is in an open position, there is a larger concentration of electrons at contact 3156 than at contact 3155 due to the action of the filtering apparatus. Thus there is a voltage difference "V" across the terminals of the open circuit.

In a dynamic boundary condition, the circuit is closed and electrons are allowed to flow through a load 3162. The load 3162 can be a resistor, for example. In the embodiment shown, the load 3162 is an electric motor 3165 configured to do mechanical work. Since the energy associated with the bulk flow of electrons through the conductors is provided by the thermal energy of the electrons, the thermal energy needs to be replenished for continuous, steady state operation. The replenishment of electron thermal energy can be enhanced by a heat exchanger 3163, which, in the depicted embodiment 3166 comprises several metal plates 3166 configured to extract heat from the environment, such as the atmosphere. In some embodiments, the load 3162 and the heat exchanger 3163 are identical. In some such embodiments, such as embodiments in which all of the energy transferred by the electrons to a load resistor in the form of Joule heating is returned to the electrons via thermal conduction. In such embodiments, the circuit comprising the filtering apparatus 3151 can be considered to be superconducting.

Figure 23:
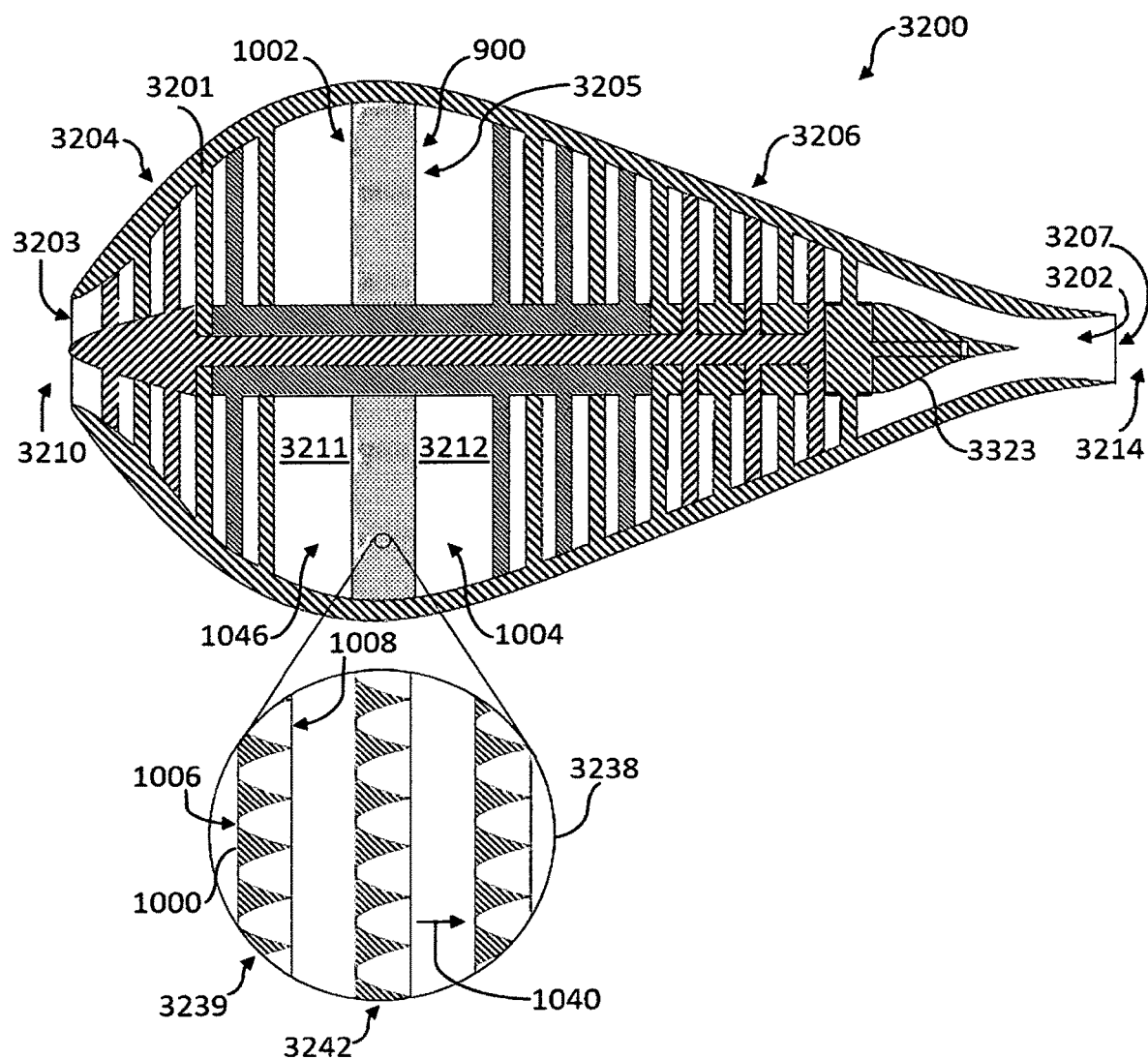
FIG. 23 is a cross-sectional view of an application of an embodiment of the invention in a turboshaft engine.

FIG. 23 is a cross-sectional view of an application of an embodiment of the invention in a turboshaft engine.

The turboshaft engine 3200 is configured to interact with air in this example, although other gases can be used in other embodiments.

Engine 3200 comprises an inlet 3203, a turbine 3204, a filtering apparatus 3205, a compressor 3206, and an outlet 3207.

Station 3210 describes the properties of the gas at free stream conditions. At station 3211 the gas pressure and density are reduced approximately adiabatically by the turbine 3204. At station 3212 the pressure has been increased by the filtering apparatus. In a simplified model, this pressure increase can be considered to be isothermal and adiabatic. At station 3214 the pressure has been increased by the compressor to free stream conditions in order to allow the gas to exit the channel 3202 of the engine 3200. The temperature at station 3214 is lower than at station 3210. Thus, thermal energy of the gas has been converted into mechanical work. The work is available as shaft power of the turboshaft engine. For example an electric generator can be connected to shaft 3222 and employed to convert the shaft work of engine 3200 into electrical work. In another example, a propeller of a helicopter or turboprop can be mechanically coupled to shaft 3222. In another example, the fan of a turbofan engine can be mechanically coupled to shaft 3222. In another embodiment, the engine 3200 can be employed to accelerate the gas flow through the engine 3200 instead of providing shaft power. In such an embodiment engine 3200 can be operated in a similar manner as a turbojet.

As shown by enlargement 3238, the filtering apparatus 3205 comprises several layers connected in series, such as layer 3239 or 3242, where the filtering apparatus in each layer is configured in a similar fashion as filtering apparatus shown in FIG. 16.

The turbine 3204 is of a twin-spool architecture, and comprises a high pressure turbine connected to shaft 3222 and a low pressure turbine connected to shaft 3221. Via shafts or spools 3222 and 3221 a portion of the mechanical work produced by the turbine is transmitted to the compressor 3206 in order to power the compressor 3206. The turbine and compressor comprise several stages, each stage comprising a conventional rotor and stator disc, such as rotor 3225 and stator 3224, or rotor 3226 and stator 3227, or rotor 3228 and stator 3229, or rotor 3230 and stator 3231. The compressor comprises a corresponding low pressure compressor and high pressure compressor. The rotor discs are connected to the low pressure and high pressure shafts 3221 and 3222. Rotor disk 3225 of the high pressure turbine is rigidly connected to hub 3220 of shaft 3221, which in turn is rigidly connected to rotor disc 3230 of the high pressure compressor, for example.

Annular channel 3202 is bounded by an inside exterior surface 3218 and inside interior surface 3219. Bulk material 3201 is also bounded by outside surface 3217.

Figure 24:
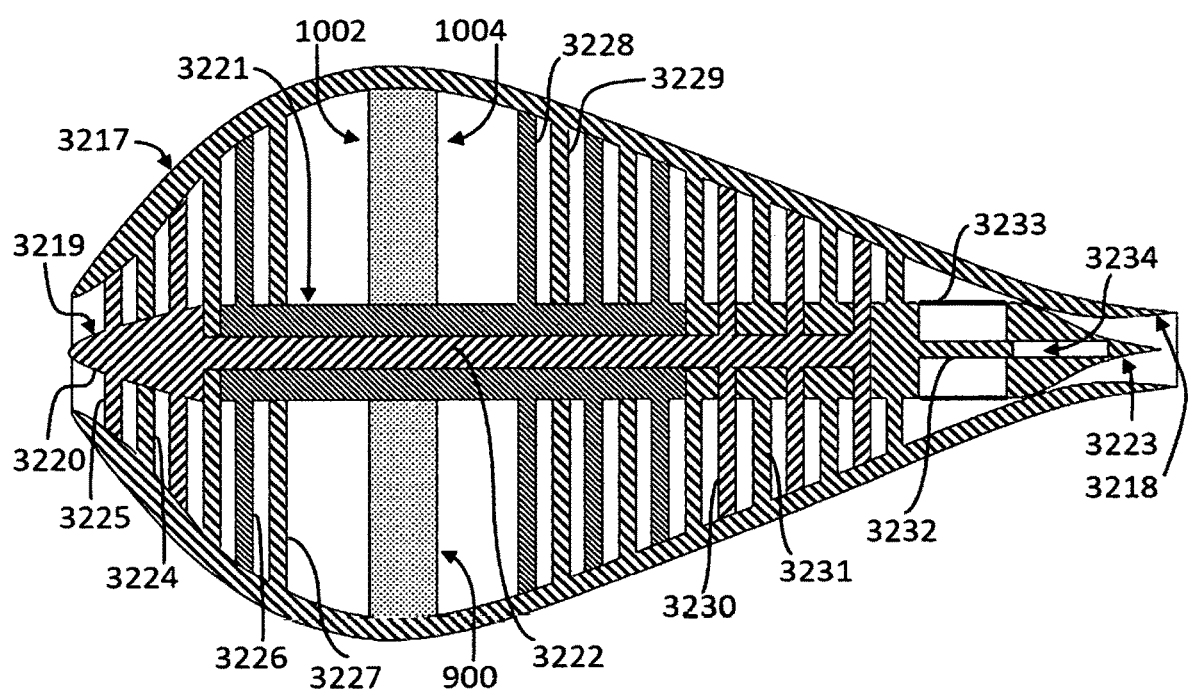
FIG. 24 is a cross-sectional view of the embodiment shown in FIG. 23 in a closed or zero-thrust configuration.

FIG. 24 is a cross-sectional view of the embodiment shown in FIG. 23 in a closed or zero-thrust configuration. As discussed in the context of engine 3000 in FIG. 19, a translating spike 3223 is configured to regulate the flow rate of the gas containing the objects of interest, i.e. the gas molecules, through channel 3202. Thus the amount of power produced by engine 3200, or the amount of thrust produced by engine 3200 can be regulated. The spike 3223 can translate on a support shaft 3252 located within slot 3234 in the direction parallel to the central axis, i.e. the rotational axis of symmetry of channel 3202. A fairing 3237 ensures smooth flow in channel 3202 at all possible positions of translating spike 3223. As before, translating spike 3223 is configured to change the cross-sectional area of channel 3202 to a desired value between a fully open position to a fully closed position in continuous fashion.

Figure 25:
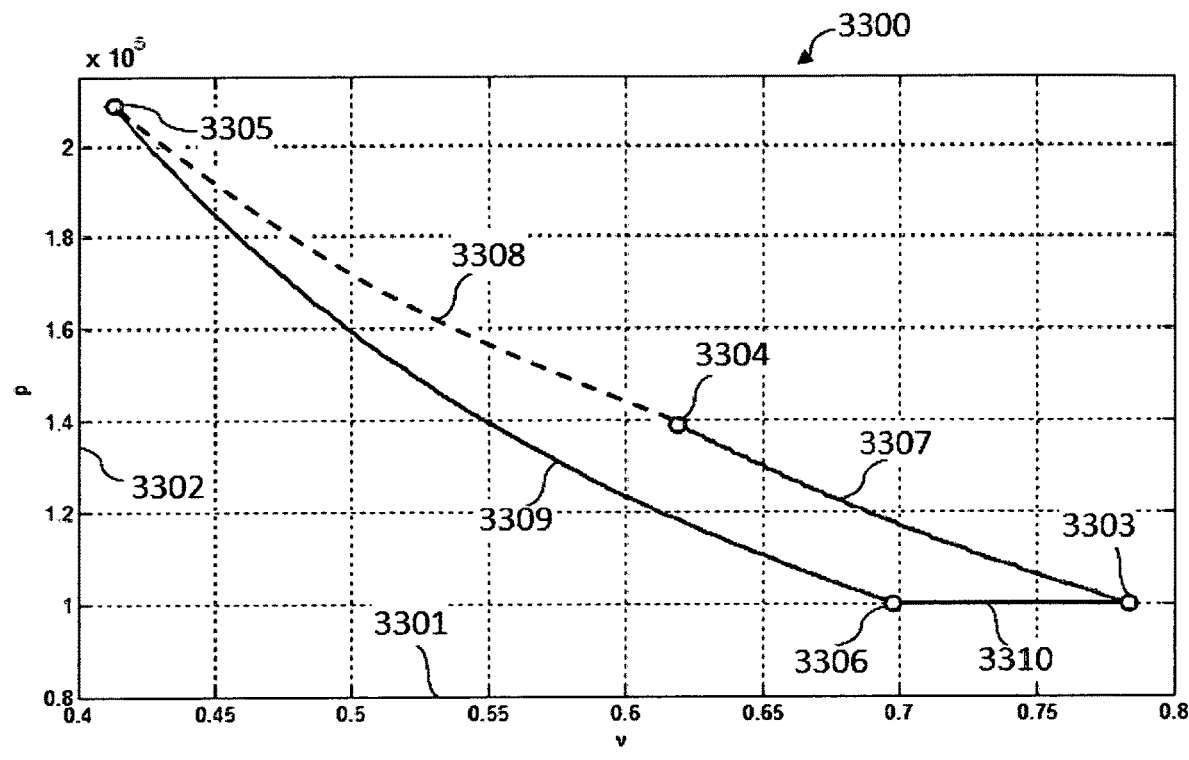
FIG. 25 is a plot of the value of pressure versus specific volume of air which passes through an example embodiment of the invention, such as the example embodiment shown in FIG. 19.

FIG. 25 is a plot of the value of pressure 3302 versus specific volume 3301 of air which passes through an example embodiment of the invention, such as the example embodiment shown in FIG. 19.

The thermodynamic cycle in plot 3300 shows a first point 3303, a second point 3304, a third point 3305, and a fourth point 3306. The fifth point and the first point are coincident. A gas at free stream condition 3303 is compressed adiabatically 3307. During the encounter with a filtering apparatus configured in accordance with the invention, the gas is compressed isothermally and adiabatically, as shown by dashed line 3308. The gas is subsequently expanded adiabatically 3309. At station 3306, the gas is expelled into the free stream at free stream pressure. In the free stream the gas is heated isobarically 3310. The gas at station 3306 is colder than at station 3303, and the net mechanical work produced by the cooling of the gas is the difference in the work of adiabatic expansion 3309 and adiabatic compression 3307.

Stations 3303, 3304, 3305, and 3306 can be considered to correspond to stations 3012, 3014, 3015, and 3017, respectively, in FIG. 19 for a subset of embodiments.

Other thermodynamic cycles, such as closed cycles or cycles involving isochoric or isothermal compression or expansion as opposed to adiabatic compression or expansion, employing filtering apparatuses configured in accordance with the invention can be readily constructed by those skilled in the art. The values of the pressures for this cycle are arbitrary and chosen for illustrative purposes, and are not intended to limit the scope of the invention.

Figure 26:
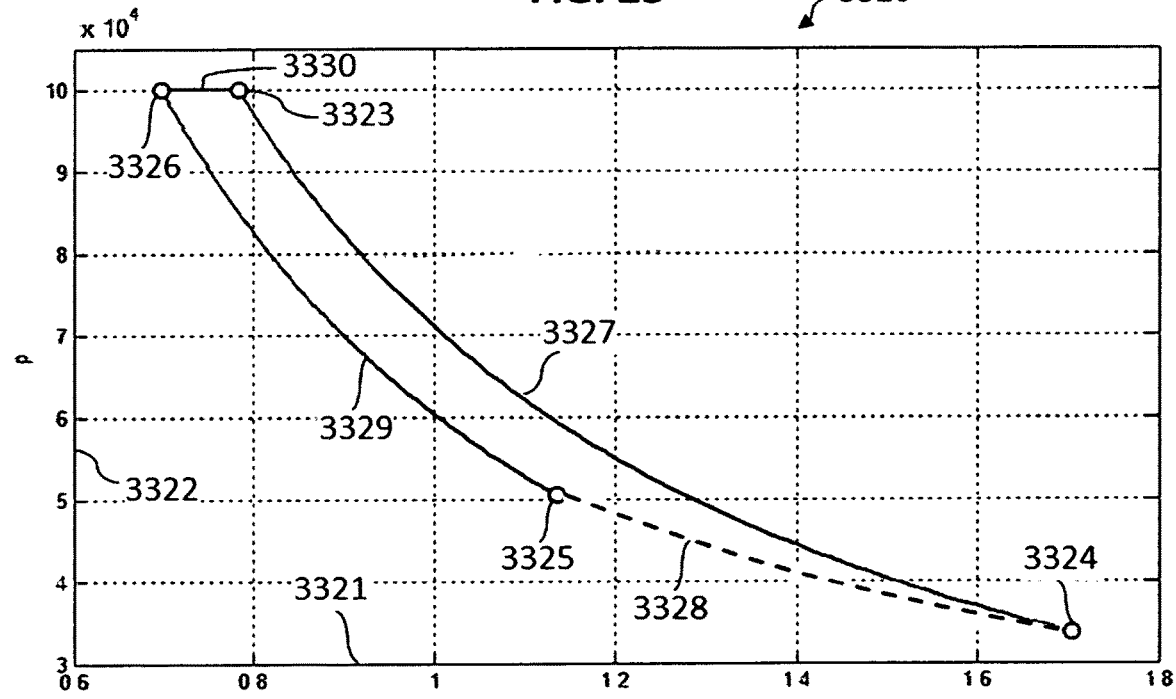
FIG. 26 is a plot of the value of pressure versus specific volume of air which passes through an example embodiment of the invention, such as the example embodiment shown in FIG. 23.

FIG. 26 is a plot of the value of pressure 3322 versus specific volume 3321 of air which passes through an example embodiment of the invention, such as the example embodiment shown in FIG. 23.

The thermodynamic cycle in plot 3320 shows a first point 3323, a second point 3324, a third point 3325, and a fourth point 3326. The fifth point and the first point are coincident. A gas at free stream condition 3323 is expanded adiabatically 3327. During the encounter with a filtering apparatus configured in accordance with the invention, the gas is compressed isothermally and adiabatically, as shown by dashed line 3328. The gas is subsequently compressed adiabatically 3329. At station 3326, the gas is expelled into the free stream at free stream pressure. In the free stream the gas is heated isobarically 3330. The gas at station 3326 is colder than at station 3323, and the net mechanical work produced by the cooling of the gas is the difference in the work of adiabatic expansion 3327 and adiabatic compression 3329.

Stations 3323, 3324, 3325, and 3326 can be considered to correspond to stations 3210, 3211, 3212, and 3214, respectively, in FIG. 23 for a subset of embodiments.

Other thermodynamic cycles, such as closed cycles or cycles involving isochoric or isothermal compression or expansion as opposed to adiabatic compression or expansion, employing filtering apparatuses configured in accordance with the invention can be readily constructed by those skilled in the art. The values of the pressures for this cycle are arbitrary and chosen for illustrative purposes, and are not intended to limit the scope of the invention.

In all of the illustrated examples of a filter plate, each inlet port in one channel system is connected to no more than one outlet port, and channels in each channel system are not connected to channels in any other channel system. A channel system may therefore be identified as all the channels (if more than one) coupled to one outlet port.

Unless specified or clear from context, the term "or" is equivalent to "and/or" throughout this paper.

Unless expressly stated otherwise herein, ordinary terms have their corresponding ordinary meanings within the respective contexts of their presentations, and ordinary terms of art have their corresponding regular meanings.

What is claimed is:
1. An apparatus, comprising:
a plate formed with at least one channel system, each of said at least one channel system including:
a first opening adjacent a first reservoir, the first reservoir located beyond the first opening;
a second opening adjacent a second reservoir, the second reservoir located beyond the second opening;
a channel in said plate, said channel coupled to said first opening and to said second opening, a characteristic length of the channel being less than 1000 times a smallest mean free path of an object of interest at the first opening or at the second opening, a characteristic width of a channel being less than 1000 times the smallest mean free path of the object of interest at the first opening or the second opening, the object of interest being a distinct portion of a medium, the first reservoir and the second reservoir being outside of the channel; and
a centroid extending from the first opening to the second opening, the centroid being a center of a cross-sectional area of the channel when viewed along a length of the channel,
a ratio of a first product to a second product being greater than unity, the first product being a product of a capture area of the first opening and a first transmissivity associated with the first opening, the second product being a product of a capture area of the second opening and a second transmissivity associated with the second opening.

2. The apparatus of claim 1, wherein a cross-sectional area of the channel along the length of the channel is circular, rectangular, polygonal, or elliptical.

3. The apparatus of claim 1, wherein an equivalent radius of a cross-sectional area of the channel increases linearly along the centroid along at least a portion of the length of the channel in a direction from the first opening to the second opening, the equivalent radius being the square root of the cross-sectional area of the channel divided by pi, and the cross-sectional area being measured perpendicularly to the centroid.

4. The apparatus of claim 3, wherein the equivalent radius of the cross-sectional area of the channel increases linearly along the centroid along the entire length of the channel in the direction from the first opening to the second opening.

5. The apparatus of claim 1, wherein an equivalent radius of the cross-sectional area of the channel increases at a decreasing rate along the centroid along at least a portion of the length of the channel in a direction from the first opening to the second opening, the equivalent radius being the square root of the cross-sectional area of the channel divided by pi, and the cross-sectional area being measured perpendicularly to the centroid.

6. The apparatus of claim 5, wherein the equivalent radius of the cross-sectional area of the channel increases at a decreasing rate along the centroid along the entire length of the channel in the direction from the first opening to the second opening.

7. The apparatus of claim 1, wherein an equivalent radius of the cross-sectional area of the channel increases at an increasing rate along the centroid along at least a portion of the length of the channel in a direction from the first opening to the second opening, the equivalent radius being the square root of the cross-sectional area of the channel divided by pi, and the cross-sectional area being measured perpendicularly to the centroid.

8. The apparatus of claim 7, wherein the equivalent radius of the cross-sectional area of the channel increases at an increasing rate along the centroid along the entire length of the channel in the direction from the first opening to the second opening.

9. The apparatus of claim 1, wherein the plate comprises at least two channel systems arranged within the plate in parallel fashion.

10. The apparatus of claim 1, wherein the apparatus comprises at least two plates arranged adjacent to each other in series.

11. The apparatus of claim 1, wherein the channel system comprises a plurality of second openings, the channel system diffusively coupling the first opening to the plurality of second openings.

12. The apparatus of claim 1, wherein the channel system comprises a plurality of first openings, the channel system diffusively coupling the plurality of first openings to the second opening.

13. The apparatus of claim 1, wherein the medium comprises a vacuum, a gas, a liquid, a solid, or a combination thereof.

14. The apparatus of claim 1, wherein the object of interest includes a particle, the particle being at least one of a photon, an electron, an atom, a molecule, a dust particle, an aerosol, a quasiparticle, a hole, or another distinct portion of a medium.

15. The apparatus of claim 1, wherein the object of interest includes a virtual particle, the virtual particle including a virtual photon, virtual electron, virtual positron, or a virtual quark, as described by quantum field theory.

16. The apparatus of claim 1, wherein the object of interest includes a wave, the wave being at least one of an acoustic wave, an ocean wave, a phonon, a photon, or an electron.

17. The apparatus of claim 1, wherein the plate is employed to generate a net difference in concentration of objects of interest in the second reservoir compared to objects of interest the first reservoir.

18. The apparatus of claim 1, wherein the plate is employed to generate a net bulk flow of objects of interest from the first reservoir into the second reservoir.

19. The apparatus of claim 18, wherein a net thrust is acting on the plate during nominal operations.

20. The apparatus of claim 18, further comprising a valve capable of regulating a mass flow rate of objects of interest through the channel of the plate and of regulating associated thrust.

21. The apparatus of claim 20, wherein the valve includes a translating spike valve.

22. The apparatus of claim 18, wherein the objects of interest include photons, and wherein the net bulk flow of photons results in a transfer of heat, wherein the transfer of heat is from one object to a hotter object or to a colder object.

23. The apparatus of claim 1, further comprising a focusing apparatus configured to focus trajectories of objects of interest in a direction from the first opening to the second opening, and wherein at least a portion of a difference in transmissivity of the objects of interest is facilitated by the focusing apparatus.

24. The apparatus of claim 23, wherein the focusing apparatus employs a surface geometry configured to focus the trajectories of the objects of interest.

25. The apparatus of claim 24, wherein the surface geometry comprises a concave surface.

26. The apparatus of claim 24, wherein the focusing apparatus comprises a particular channel of decreasing cross-sectional area along the length of the particular channel.

27. The apparatus of claim 24, wherein the focusing apparatus comprises a particular channel of increasing cross-sectional area along the length of the particular channel.

28. The apparatus of claim 23, wherein the focusing apparatus uses refraction through a lens material.

29. The apparatus of claim 23, wherein the focusing apparatus causes an isothermal and adiabatic increase in the volumetric number density of the objects of interest and a reduction in entropy.

30. The apparatus of claim 1, further comprising a defocusing apparatus configured to defocus trajectories of objects of interest in a direction from the first opening to the second opening, and wherein at least a portion of a difference in transmissivity of the objects of interest is facilitated by the defocusing apparatus.

31. The apparatus of claim 30, wherein the defocusing apparatus employs a surface geometry configured to defocus the trajectories of objects of interest.

32. The apparatus of claim 31, wherein the surface geometry comprises a convex surface.

33. The apparatus of claim 31, wherein the defocusing apparatus comprises a particular channel of decreasing cross-sectional area.

34. The apparatus of claim 31, wherein the defocusing apparatus comprises a particular channel of increasing cross-sectional area.

35. The apparatus of claim 30, wherein the defocusing apparatus uses refraction through a lens material.

36. The apparatus of claim 30, wherein the defocusing apparatus causes an isothermal and adiabatic reduction in volumetric number density of objects of interest and an increase in entropy.

37. The apparatus of claim 1, wherein the channel comprises a first section and a second section, the first and second sections being diffusively coupled to each other, the first section being diffusively coupled to the first opening, the second section being diffusively coupled to the second opening, the first section comprising a region of decreasing cross-sectional area in a direction from the first opening toward the second opening, and the second section comprising a region of increasing cross-sectional area in a direction from the first opening toward the second opening, the change in cross-sectional area being smaller in the second section than in the first section.

\* \* \* \* \*